US 11,407,031 B2

United States Patent
Kotov et al.

(10) Patent No.: US 11,407,031 B2
(45) Date of Patent: Aug. 9, 2022

(54) SELF-ASSEMBLY METHODS FOR FORMING HEDGEHOG-SHAPED PARTICLES

(71) Applicant: THE REGENTS OF THE UNIVERSITY OF MICHIGAN, Ann Arbor, MI (US)

(72) Inventors: Nicholas A. Kotov, Ypsilanti, MI (US); Dawei Deng, Nanjing (CN); Wenfeng Jiang, Shanghai (CN); Douglas Montjoy, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/651,841

(22) PCT Filed: Sep. 27, 2018

(86) PCT No.: PCT/US2018/053147
§ 371 (c)(1),
(2) Date: Mar. 27, 2020

(87) PCT Pub. No.: WO2019/067734
PCT Pub. Date: Apr. 4, 2019

(65) Prior Publication Data
US 2020/0254527 A1 Aug. 13, 2020

Related U.S. Application Data

(60) Provisional application No. 62/563,966, filed on Sep. 27, 2017.

(51) Int. Cl.
*B22F 9/24* (2006.01)
*B82B 1/00* (2006.01)
(Continued)

(52) U.S. Cl.
CPC .............. *B22F 9/24* (2013.01); *B22F 1/054* (2022.01); *B22F 1/07* (2022.01); *B22F 1/16* (2022.01);
(Continued)

(58) Field of Classification Search
CPC ........ B22F 9/24; B22F 1/0018; B22F 1/0044; B22F 1/02; B22F 2001/0037; B82B 1/00;
(Continued)

(56) References Cited

U.S. PATENT DOCUMENTS

| 2003/0039860 A1 | 2/2003 | Cheon et al. |
| 2009/0311556 A1 | 12/2009 | Ganapathiraman et al. |

(Continued)

FOREIGN PATENT DOCUMENTS

| CN | 101468793 A | 7/2009 |
| CN | 105060261 A | 11/2015 |

(Continued)

OTHER PUBLICATIONS

International Search Report and Written Opinion for International Patent Application No. PCT/US2018/053147 dated Dec. 12, 2018 (ISA/US), 11 pages.

(Continued)

*Primary Examiner* — Anthony J Zimmer
(74) *Attorney, Agent, or Firm* — Harness, Dickey & Pierce, P.L.C.

(57) ABSTRACT

Self-assembly methods are provided for making hedgehog-shaped microparticles or nanoparticles. The method may comprise combining a metal-containing (e.g., Fe, Au) precursor, a chalcogen-containing precursor (e.g., Se, S), and a self-assembly additive (e.g., dodecanethiol (DT), oleylamine (OLA), hexadecyltrimethylammonium bromide (CTAB)). At least one hedgehog-shaped nanoscale, mesoscale, or microscale particle is formed that defines a (Continued)

core region formed of a first material and a plurality of needles connected to and substantially orthogonal to a surface of the core region. The needles comprise a second material. At least one of the first or the second material comprises iron or gold and optionally selenium or sulfur, for example, iron diselenide (FeSe2). Hedgehog-shaped microparticles or nanoparticles formed from such self-assembly methods are also provided. The semiconductor nature of FeSe2 hedgehog-shaped particles enables their utilization in biomimetic catalysis, drug delivery, optics, and energy storage, by way of non-limiting example.

23 Claims, 36 Drawing Sheets

(51) Int. Cl.
- B82B 3/00 (2006.01)
- B22F 1/07 (2022.01)
- B22F 1/16 (2022.01)
- B22F 1/054 (2022.01)
- B82Y 30/00 (2011.01)
- B82Y 40/00 (2011.01)

(52) U.S. Cl.
CPC .................. B82B 1/00 (2013.01); B82B 3/00 (2013.01); *B22F 1/0553* (2022.01); *B82Y 30/00* (2013.01); *B82Y 40/00* (2013.01)

(58) Field of Classification Search
CPC ........... B82B 3/00; B82Y 30/00; B82Y 40/00; C01B 19/007
See application file for complete search history.

(56) References Cited

U.S. PATENT DOCUMENTS

| | | | |
|---|---|---|---|
| 2010/0034728 A1 | 2/2010 | Seo et al. | |
| 2010/0116326 A1 | 5/2010 | Gur et al. | |
| 2013/0058870 A1 | 3/2013 | Lacroix et al. | |
| 2013/0095039 A1 | 4/2013 | Lu et al. | |

FOREIGN PATENT DOCUMENTS

| | | |
|---|---|---|
| CN | 106853523 A | 6/2017 |
| CN | 111315682 A | 6/2020 |
| WO | WO-2016-192001 A1 | 12/2016 |
| WO | WO-2016190818 A1 | 12/2016 |

OTHER PUBLICATIONS

Briñas, Raymond P. et al., "Gold Nanoparticle Size Controlled by Polymeric Au(I) Thiolate Precursor Size," J. Am. Chem. Soc. (2008) 130(3), pp. 975-982; (Published Jan. 23, 2008); DOI: 10.1021/ja076333e.
Deng, Dawei et al., "Template-Free Hierarchical Self-Assembly of Iron Diselenide Nanoparticles into Mesoscale Hedgehogs," J. Am. Chem. Soc. (2017) 139, pp. 16630-16639; (Published Oct. 10, 2017) DOI: 10.1021/iacs.7b07838.
Fu, Tingling et al., "Facile preparation of uniform FeS2 nanoparticles for PA/MR dual-modal imaging and photothermal cancer therapy," Nanoscale (2015) 7, pp. 20757-20768; (Published Nov. 12, 2015) DOI: 10.1039c5nr06840a.
Huang, Shoushuang et al., "3D hierarchical FeSe2 microspheres: Controlled synthesis and applicatiosn in dye-sensitized solar cells," Nano Energy (2015) 15, pp. 205-215; (Published online: May 5, 2015) DOI: 10.1016/j.nanoen.2015.04.027.
Mashayakhi, Parivash et al., "Structural and Optical Behavior of Cu Doped Au Nanoparticles Synthesized by Wet-Chemical Method," Int. J. Bio-Inorg. Hybd. Nanomat. (2013) 2, 2, pp. 379-384.
Panchakarla, Leela S. et al., "Nanotubes from Misfit Layered Compounds: A New Family of Materials with Low Dimensionality," J. Phys. Chem. Lett. (2014) 5, pp. 3724-3736; DOI: 10.1021.jz50168451.
Pizzini, Sergio, "Towards solar grade silicon: Challenges and benefits for low cose photovoltaics," Solar Energy Mateirsl & Solar Cells (2010) 94, pp. 1528-1533; (Published online Mar. 11, 2010) DOI: 10.1016/j.solmat.2010.01.016.
Qin, Z. et al., "Flower-like pyrite FeSe2 nanoparticles with enhanced optial properties by hot-injection," Vacuum (2015) 111, pp. 157-159; (Published online: Oct. 16, 2014) DOI: 10.1016/j.vacuum.2014.10.005.
Zhang, Zhian et al., "Nanooctahedra Particles Assembled FeSe2 Microspheres Embedded into Sulfur-Doped Reduced Graphene Oxide Sheets As a Promisin Anode for Sodium Ion Batteries," ACS Appl. Mater. Interfaces (2016) 8, pp. 13849-13856; (Published May 24, 2016) DOI: 10.1021/asami.5b12148.
Yu, Jing et al., "HF-assisted one-step synthesis of pompon-llke/chip-llke FeSe2 particles and their superamphiphoblc/antireflective property," RSC Advances (2014) 4, pp. 24163-24169; (Published May 13, 2014) DOI: 10.1039/c4ra01350f.
Montjoy, Douglas G. et al. "Omnidispersible Hedgehog Particles with Multilayer Coatings for Multiplexed Biosensing," Journal of the American Chemical Society (2018) 140, 25, pp. 7835-7845.
Bahng, Joong Hwan et al., "Anomalous dispersions of 'hedgehog' particles," Nature (2015) 517, pp. 596-599; DOI: 10.1038/nature14092.
Extended European Search Report issued by European Patent Office dated Jun. 29, 2021, in corresponding European Application No. 18860789.9.
Yuan Binxia et al: "One-step synthesis of cubic $FeS_2$ and flower-like $FeSe_2$ particles by a solvothermal reduction process", Dalton Transactions, vol. 41, No. 3, pp. 772-776, (Nov. 9, 2011) XP055815985, Cambridge ISSN: 1477-9226, D0I: 10.1039/C1DT11176K.
Kord Mohsen et al: "Green synthesis and characterization of flower-like PbS and metal-doped nanostructures via hydrothermal method", Main Group Metal Chemistry, vol. 40, No. 1-2, pp. 35-40 (Apr. 29, 2017), XP055815977, DE ISSN: 0792-1241, D0I: 10.1515/mgmc-2016-0046.
Xingtian Yin et al: "Ag nanoparticle/ZnO nanorods nanocomposites derived by a seed-mediated method and their photocatalytic properties", Journal of Alloys and Compounds, Elsevier Sequoia, Lausanne, CH, vol. 524, pp. 13-21 (Feb. 6, 2012), XP028475203, ISSN: 0925-8388, D0I: 10.1016/J.JALLC0M.2012.02.052 [retrieved on Feb. 16, 2012].
Yu Jing et al: "Superamphiphobic, light-trapping FeSe particles with a micro-nano hierarchical structure obtained by an improved solvothermal method", Chinese Physics B, Chinese Physics B, Bristol GB, vol. 23, No. 1, p. 16803 (Jan. 28, 2014), XP020256220, ISSN: 1674-1056, D0I: 10.1088/1674-1056/23/1/016803 [retrieved on Jan. 28, 2014].
First Office Action for Chinese Patent Application No. 201880070212.3 dated Oct. 26, 2021 with English language translation; 22 pages.
Chinese Office Action regarding Application No. 201880010212.3, dated Apr. 6, 2022.
Korean Office Action regarding Patent Application No. 1020207011929, dated Apr. 19, 2022.
Japanese Office Action regarding Application No. 2020-517876, dated May 6, 2022.

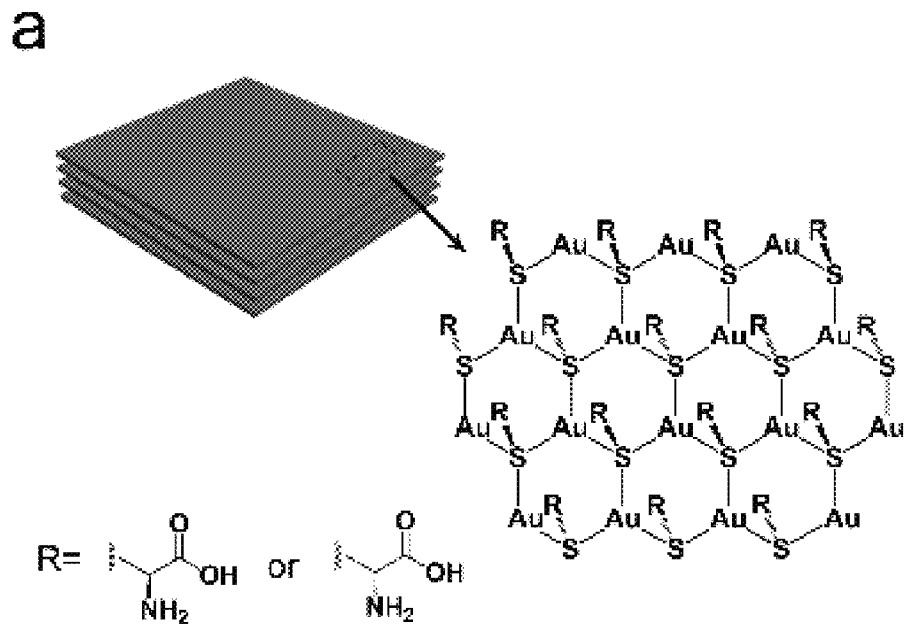
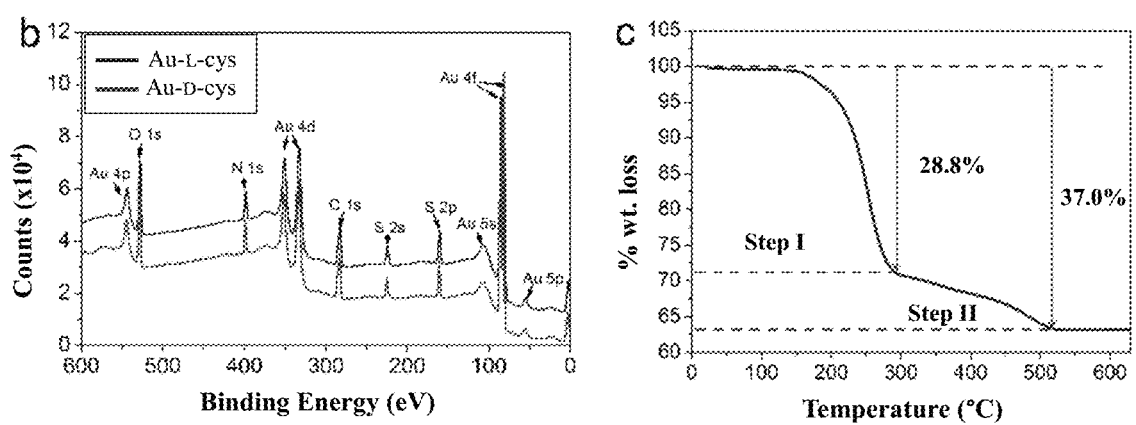
Figures 34A–34C

SELF-ASSEMBLY METHODS FOR FORMING HEDGEHOG-SHAPED PARTICLES

CROSS-REFERENCE TO RELATED APPLICATIONS

This application is the U.S. National Phase Application under 35 U.S.C. 371 of International Application No. PCT/US2018/053147 filed on Sep. 27, 2018, which claims the benefit of U.S. Provisional Application No. 62/563,966 filed on Sep. 27, 2017. The entire disclosures of the above applications are incorporated herein by reference.

GOVERNMENT SUPPORT

This invention was made with government support under CMMI-1463474 awarded by the National Science Foundation. The government has certain rights in the invention.

FIELD

The present disclosure relates to a method of bulk synthesis of microscale, mesoscale, and nanoscale hedgehog-shaped particles by self-assembly of nanoparticles and more particularly to hedgehog-shaped particles from metal-containing chalcogenide materials formed therefrom.

BACKGROUND

This section provides background information related to the present disclosure which is not necessarily prior art.

Nanostructures with complex geometries expand the chemical, optical, electrical, mechanical, and biological functionalities of nanomaterials beyond quantum confinement and plasmonic effects associated with their base inorganic material. To name a few examples, in the realm of chemistry, the strong effect of nanoscale geometry is known for solvent dispersability, gas absorption, and catalysis. Intricate nano- and mesoscale shapes are essential for functions of enzymes, protein complexes, viral capsids, load-bearing protein fibers, and many other components of biological systems. Notably, the complex geometries are hierarchical and their formation is the product of simpler building blocks. Should a certain degree of anisotropy and dynamic structural reconfiguration be present, similar levels of complexity and hierarchy are potentially possible for non-biological building blocks. A spectrum of studies over the past two decades on self-organized structures with gradually increasing degrees of complexity indicates feasibility of this vision.

Semiconductor or inorganic nanoparticles (NPs) are known to self-assemble. For example, inorganic NPs can self-assemble into chains and nanowires, nanorods, nanosheets, twisted ribbons, nanorod pairs, checks- and X-marks, supraparticles, as well as enantio-specific helicoids. A library of NPs with different shapes serves as building blocks. While the interactions between NPs leading to such superstructures are being deciphered with greater degree of clarity, the limits of complexity of superstructures formed from seemingly unsophisticated polydispersed NPs serving as building blocks pose a number of fundamental questions. The limits of the geometrical and functional complexity for the self-assembled nanostructures made from fairly simple building blocks is still an ongoing area of research to try to gain a better understanding of the limitations. For example, whether polydispersity helps or impedes complexity of the self-assembled superstructures, whether anisotropy of the building blocks relates to the complexity of the resulting assembly, and how the charge transport abilities of the inorganic materials and sophistication of geometric forms of self-assembled superstructures can be used are not well understood. Among other factors, these questions deserve attention because self-organization processes can bridge nanoscale materials and well-established microscale technologies. Furthermore, they can pave the way for imparting inorganic assemblies with a wide variety of biomimetic functions to replace environmentally sensitive peptides that are subject to enzymatic hydrolysis.

For example, complex hedgehog-shaped particles have various desirable properties and reveal unusual colloidal properties. The materials that form the needles/spikes or cores can display both excitonic and plasmonic properties when formed of semi-conductor materials and can serve as essential components for optical and catalytic systems. They also reveal unusual colloidal dispersibility, which had been observed for microscale particles synthesized in a complex process with several consecutive stages.

Thus, it would be desirable to find new methods to make certain complex nanoscale, mesoscale, or microscale particles with distinct spikes, such as hedgehog-shaped particles, via self-organization routes and methods.

SUMMARY

This section provides a general summary of the disclosure, and is not a comprehensive disclosure of its full scope or all of its features.

A self-assembly method for making a hedgehog-shaped nanoscale, mesoscale, or microscale particle is provided. The method comprises combining a metal-containing precursor, a chalcogen-containing precursor, and a self-assembly additive. At least one type of hedgehog-shaped particle is formed via self-assembly to define a core region formed of a first material and a plurality of needles connected to and substantially orthogonal to a surface of the core region. The plurality of needles (also referred to herein as spikes) comprises a second material. At least one of the first material or the second material comprises a metal and a chalcogen.

In one aspect, the forming the at least one hedgehog-shaped particle via self-assembly further comprises first forming a plurality of platelet-like nanoparticles that assemble together into a nanosheet. The nanosheet rolls into a hollow structure that defines a needle to form one of the plurality of needles.

In one further aspect, the nanosheet comprises a single crystal morphology.

In one aspect, the combining further comprises forming a first liquid by combining the metal-containing precursor with a first portion of the additive and heating the first liquid. The method also comprises forming a second liquid comprising the chalcogen-containing precursor and a second portion of the additive. The second liquid is injected into the first liquid to form the at least one hedgehog-shaped particle.

In one aspect, the first liquid is heated to greater than or equal to about 175° C.

In one aspect, the metal-containing precursor is an iron-containing precursor or a gold-containing precursor.

In one aspect, the iron-containing precursor comprises iron chloride ($FeCl_3$) and the chalcogen-containing precursor comprises selenium (Se).

In one aspect, the gold-containing precursor comprises gold hydrochloride ($HAuCl_4$) and the chalcogen-containing precursor comprises sulfur (S).

In one aspect, at least one of the first material or the second material comprises iron diselenide ($FeSe_2$).

In one aspect, at least one of the first material or the second material comprises a gold thiolate.

In one aspect, the self-assembly additive is selected from the group consisting of: dodecanethiol (DT), oleylamine (OLA), hexadecyltrimethylammonium bromide (CTAB), and combinations thereof.

In one aspect, the combining further comprises a metal dopant.

Hedgehog-shaped nanoscale, mesoscale, or microscale particles are also provided that comprises a core region and a plurality of needles (spikes) connected to and substantially orthogonal to a surface of the core region. At least one of the core region or the plurality of needles comprise a metal-chalcogenide material.

In one aspect, the metal-chalcogenide comprises a metal selected from the group consisting of: iron (Fe), gold (Au), nickel (Ni), molybdenum (Mo), niobium (Nb), technetium (Tc), tungsten (W), tantalum (Ta), chromium (Cr), manganese (Mn), copper (Cu), vanadium (V), titanium (Ti), zirconium (Zr), hafnium (Hf), ruthenium (Ru), osmium (Os), zinc (Zn), rhenium (Re), and combinations thereof and combinations thereof. The metal-chalcogenide also comprises a chalcogen selected from the group selenium, sulfur, and combinations thereof.

In one aspect, the metal chalcogenide comprises a material selected from the group consisting of: iron diselenide ($FeSe_2$), gold thiolate, and combinations thereof.

In one aspect, the hedgehog-shaped particle further comprises a dopant, such as a metal dopant.

Hedgehog-shaped nanoscale, mesoscale, or microscale particles are also provided that comprises a core region comprising a first material and a plurality of needles connected to and substantially orthogonal to a surface of the core region. The plurality of needles comprises a second material. At least one of the first material or the second material comprises either (i) iron and selenium or (ii) gold and sulfur.

In one aspect, the first material and the second material each comprises iron diselenide ($FeSe_2$) or gold thiolate.

In one aspect, the hedgehog-shaped particles have an average particle size diameter of greater than or equal to about 50 nm to less or equal to about 15 μm.

In one aspect, an average length of a respective needle of the plurality of needles is greater than or equal to about 5 nm to less or equal to about 5 μm. An average diameter of the respective needle of the plurality of needles is greater than or equal to about greater than or equal to about 1 nm to less or equal to about 500 nm. An average wall thickness of the respective needle of the plurality of needles is greater than or equal to about 0.5 nm and less than or equal to about 100 nm.

In one aspect, an average diameter of the core region is greater than or equal to about 30 nm to less or equal to about 10 μm.

In one aspect, the hedgehog-shaped nanoscale, mesoscale, or microscale particles further comprise a metal dopant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1F. SEM images of the as-prepared $FeSe_2$ NPs for different amounts of DT in solution A—in FIG. 1A: 0.1 mL, FIG. 1B: 0.6 mL, FIG. 1C: 1.0 mL, FIG. 1D: 2.0 mL, and FIG. 1E: 4.0 mL, in which the amount of OLA is fixed at 2 mL (the volume of ODE is adjusted to keep the total volume of solution A constant at about 6 mL). FIG. 1F shows absorption spectra of the nanostructures obtained for different concentrations of DT.

FIGS. 2A-2C. FIG. 2A is a top view and FIG. 2B is a side view of SEM images of $FeSe_2$ nanosheets. FIG. 2C is a 3D AFM image of a nanosheet (Additional images are shown in FIGS. 18A-18C).

FIGS. 3A-3C. FIG. 3A shows a TEM image, FIG. 3B shows a high-resolution HR-TEM image and FIG. 3C shows a powder XRD pattern of $FeSe_2$ nanosheets. Insets in FIG. 3A are the corresponding fast Fourier transform (FFT) and selected area electron diffraction (SAED) patterns. The three d-spacings in FIG. 3B are 3.65, 3.1, and 2.85 Å, corresponding to the (110), (011), and (101) lattice planes of orthorhombic $FeSe_2$, respectively.

FIGS. 4A-4F. TEM images of reaction aliquots—FIG. 4A: 30 seconds, FIG. 4B: 1 minute, and FIG. 4C: 3 minutes. FIG. 4D shows an HR-TEM image of an early planar aggregate. FIG. 4E shows an HR-TEM image of the intermediate nanosheet with visible crystallites corresponding to primary nanoparticles (NPs). FIG. 4F shows XRD patterns of the intermediate samples.

FIGS. 5A-5B. FIG. 5A shows an atomic model (top-view) of the orthorhombic $FeSe_2$ nanosheet viewed from its [11-1] axis. The upper-right inset: single-crystal diffraction pattern; the lower-right inset: unit cell structure of an orthorhombic ($FeSe_2$) lattice viewed from the [11-1] axis. FIG. 5B shows a schematic illustration of the assembly of the primary NPs into the nanosheets.

FIGS. 6A-6F. FIGS. 6A-6B show SEM and FIGS. 6D-6F show TEM images with increased magnification. FIG. 6C shows a TEM tomography image of the assembled nanoscroll marked by an arrow in a mesoscale hedgehog particle.

FIGS. 7A-7C. FIG. 7A shows a TEM image and FIG. 7B shows a HR-TEM image (inset: the corresponding FFT pattern) of $FeSe_2$ nanoscrolls in one assembled hedgehog particle (the upper inset of FIG. 7A). The SAED pattern (inset of FIG. 7A) is consistent with the FFT pattern. FIG. 7C show a corresponding powder XRD pattern.

FIGS. 8A-8I. FIGS. 8A (including 8A(i) and 8A(ii)), 8C (including 8C(i) and 8C(ii)), 8E (including 8E(i) and 8E(ii)), and 8G (including 8G(i) and 8G(ii)) show TEM images and FIGS. 8B, 8D, 8F, and 8H show HRTEM images of reaction aliquots prepared at 175° C. (for hedgehog particles). FIGS. 8A and 8B show 40 seconds, FIGS. 8C and 8D show 1 minute, FIGS. 8E and 8F show 3 minutes, and FIGS. 8G and 8H show 5 minutes. FIG. 8I shows XRD patterns of the intermediate samples.

FIGS. 9A-9D. FIG. 9A shows a schematic illustration of the periodic Se-rich and Fe-rich stripes on both basal planes of a 2 nm-thickness nanosheet (namely, the unrolled structure of the nanoscroll on hedgehog), viewed from the axis that is perpendicular to [11-1] and parallel to (011). FIG. 9B shows the slight rotation of the atomic schematics of the nanosheet in the panel in FIG. 9A showing the periodic Se-rich and Fe-rich stripes on top basal plane. FIG. 9C shows the top view of the corresponding nanosheet depicted in the panel in FIG. 9A. FIG. 9D shows an HRTEM image of the scrolling nanosheet in initial $FeSe_2$ hedgehog particles formed at the early stage (FIG. 33), in which the atomic arrangements are coincident with those in FIG. 9D.

FIGS. 10A-10C. FIG. 10A shows schematics of the primary FeSe$_2$ nanoparticles (NPs) viewed from the [11-1] axis. FIG. 10B shows an initial self-assembly (SA) of NPs and concomitant scrolling (the 3D image presents the asymmetric distribution of organic ligands on the basal planes for initial aggregates of four primary NPs). FIG. 10C shows a schematic illustration of multistage assembly and recrystallization of primary NPs into a mesoscale hedgehog.

FIG. 11 shows molecular dynamic simulation of individual primary FeSe$_2$ nanoparticle.

FIGS. 12A-12D. SEM images of FeSe$_2$ nanocrystals prepared at 175° C. in the presence of various volume of OLA in solution A: FIG. 12A shows 0 mL, FIG. 12B shows 0.5 mL, FIG. 12C shows 2 mL, FIG. 12D shows 5 milliliters. Scale bars are 3 μm. The volume of DT in solution A is fixed at 0.1 mL (the volumes of DT and OLA used in solution B are fixed at 0.3 mL and 0.7 mL; the procedure for solution B is same for all following preparations). These data indicate that oleylamine (OLA) also plays a positive role in promoting the growth of FeSe$_2$ mesoscale hedgehogs, similar to that of DT.

FIG. 13 is an SEM image of FeSe$_2$ nanosheets prepared at 175° C. in the absence of DT in solution A. Here, the volume of OLA in solution A in is set to 2 milliliters.

FIGS. 14A-14C. SEM images of FeSe$_2$ nanosheets prepared at different reaction temperature: FIG. 14A) 150° C., FIG. 14B) 175° C., FIG. 14C) 200° C., in which the volumes of DT and OLA used in solution A are fixed at 0.1 mL and 2 mL, respectively.

FIGS. 15A-15C. SEM images of FeSe$_2$ hedgehogs prepared at different reaction temperature: FIG. 15A) 150° C., FIG. 15B) 175° C., FIG. 15C) 200° C., in which the volumes of DT and OLA used in solution A are fixed at 1 mL and 2 mL, respectively.

FIGS. 16A-16D. SEM images of FeSe$_2$ superstructures of different geometries prepared at 175° C. in the presence of various volume of OLA in solution A: FIG. 16A) 0 mL, FIG. 16B) 1 mL, FIG. 16C) 2 mL, and FIG. 16D) 5 ml. Here, the volume of DT in solution A is fixed at 1 ml.

FIGS. 17A-17B. FIG. 17A shows an SEM image of the as-prepared FeSe$_2$ nanosheets. Note the tendency to curl. FIG. 17B show a corresponding EDX spectrum.

FIGS. 18A-18C. AFM images and corresponding topography cross sections of a nanosheet on a silicon wafer.

FIG. 19 is a TEM image of the FeSe$_2$ nanosheets. Note the tendency to assemble into nanosheet clusters.

FIGS. 20A-20C. FIG. 20A is a TEM image and FIGS. 20B and 20C are HR-TEM images of FeSe$_2$ nanosheets.

FIGS. 21A-21B show absorption and photoluminescence (PL) spectra of the FeSe$_2$ nanosheets, respectively.

FIGS. 22A-22B. FIG. 22A shows a TEM image and FIG. 22B shows a HR-TEM image of FeSe$_2$ NPs formed at the initial stage of the assembly into nanosheets.

FIGS. 23A-23B. FIG. 23A show an HR-TEM image and FIG. 23B shows a higher HR-TEM image of one planar aggregate. FIG. 23B corresponds to the area marked by rectangle in FIG. 23A.

FIGS. 24A-24B. FIG. 24A shows a TEM image and FIG. 24B shows a HR-TEM image of an intermediate stage of assembly of FeSe$_2$ nanosheets from primary NPs.

FIGS. 25A-25F show SEM images of intermediate stages of FeSe$_2$ NP assembly at 175° C. FIG. 25A shows 0.5 minutes, FIG. 25B shows 1 minute, FIG. 25C shows 3 minutes, and FIG. 25D shows 5 minutes, in which volumes of DT and OLA used in 'solution A' are set to 0.1 mL and 2 mL, respectively. FIGS. 25E and 25F show absorption and photoluminescence spectra (PL) of the FeSe$_2$ nanostructures for different reaction times.

FIGS. 26A-26B. FIG. 26A is a SEM image of the as-prepared FeSe$_2$ hedgehog mesoscale particles. Uniformity of their diameters is notable; no size selection or purification steps are applied. FIG. 26B shows a corresponding EDX spectrum.

Figures 29A, 29B, 29C, 29D:
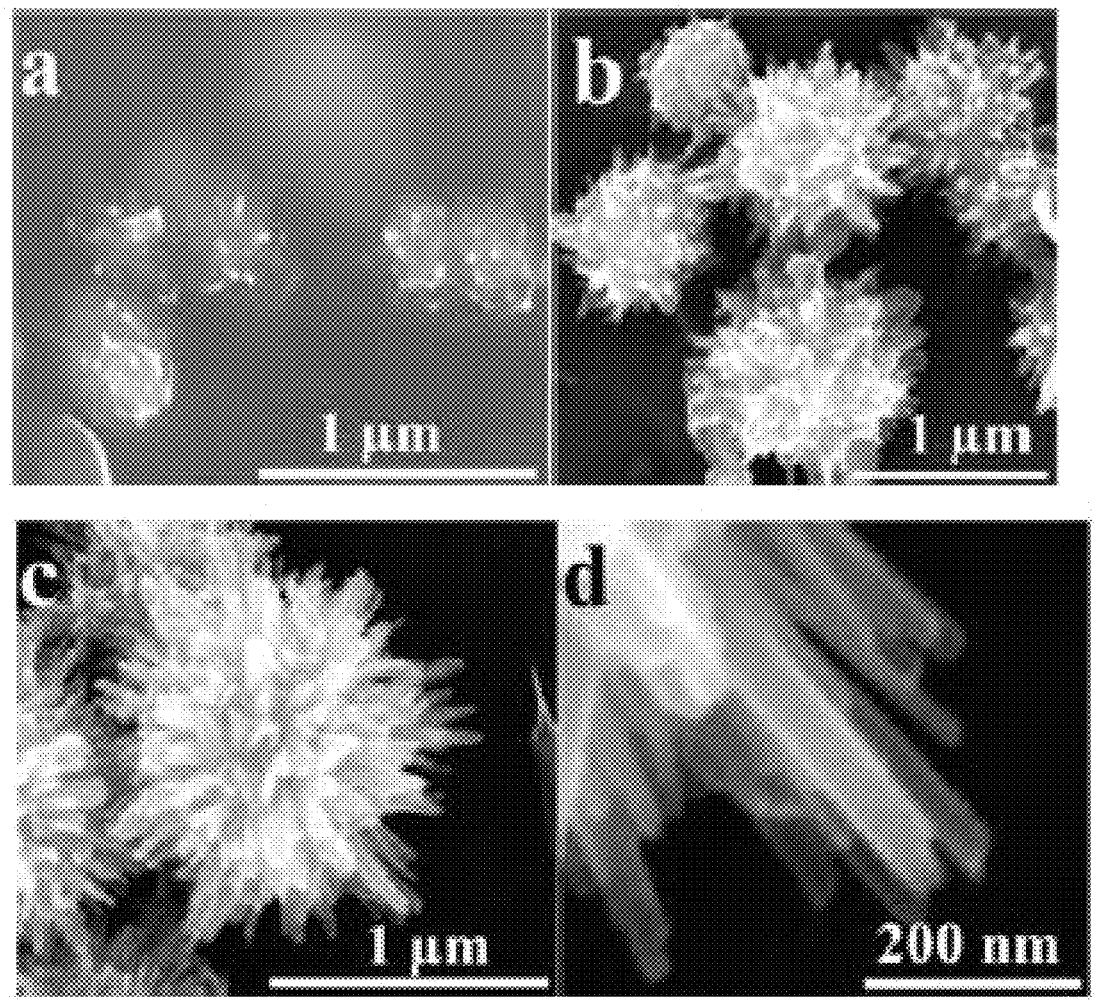
Figure 29E:
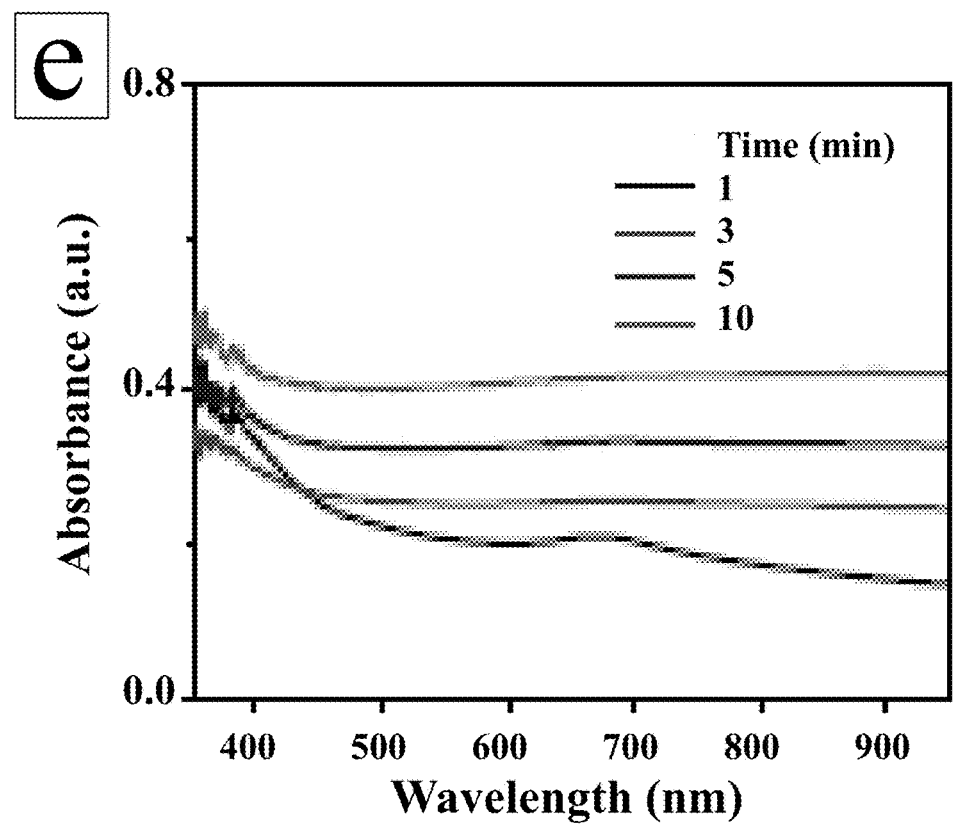
Figure 29F:
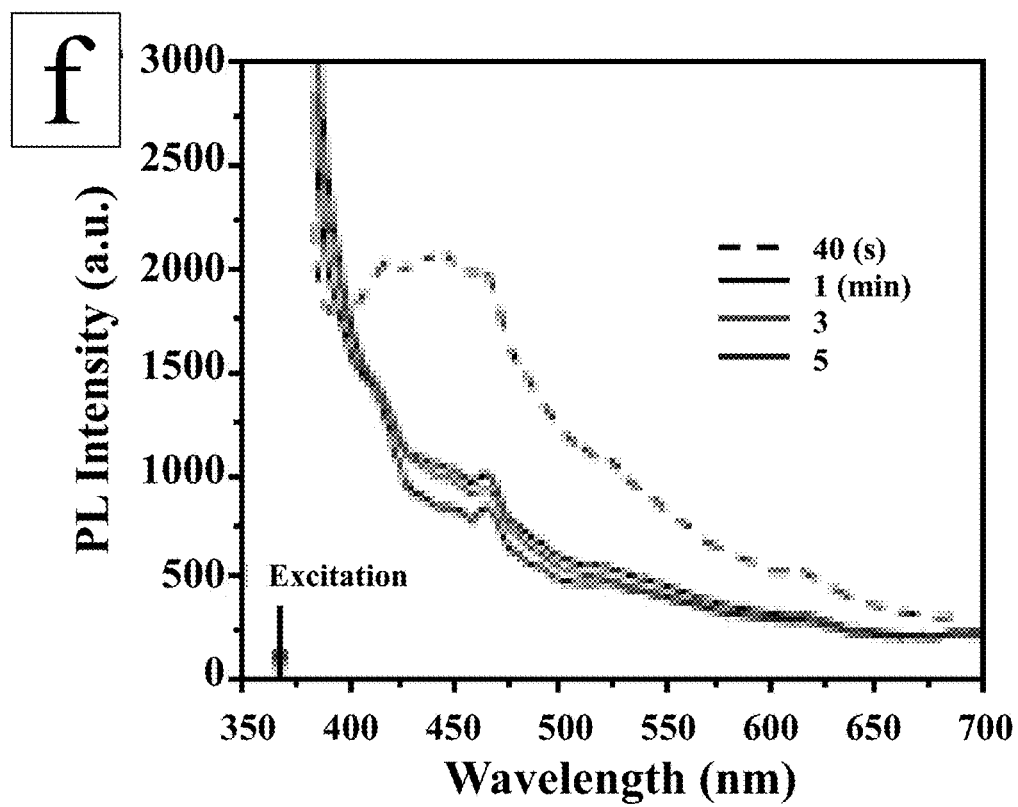

FIGS. 29A-29F. SEM images of the intermediate stages of primary FeSe$_2$ NP assembly at 175° C.: FIG. 29A) 1 min., FIG. 29B) 3 min., FIG. 29C) and FIG. 29D) 5 min., in which the volumes of DT and OLA used in solution A are set to 1 mL and 2 mL, respectively. FIGS. 29E and 29F show absorption and photoluminescence (PL) spectra of the FeSe$_2$ nanoscale dispersions for different reaction times.

Figures 30A, 30B, 30C, 30D, 30E, 30F, 30G:
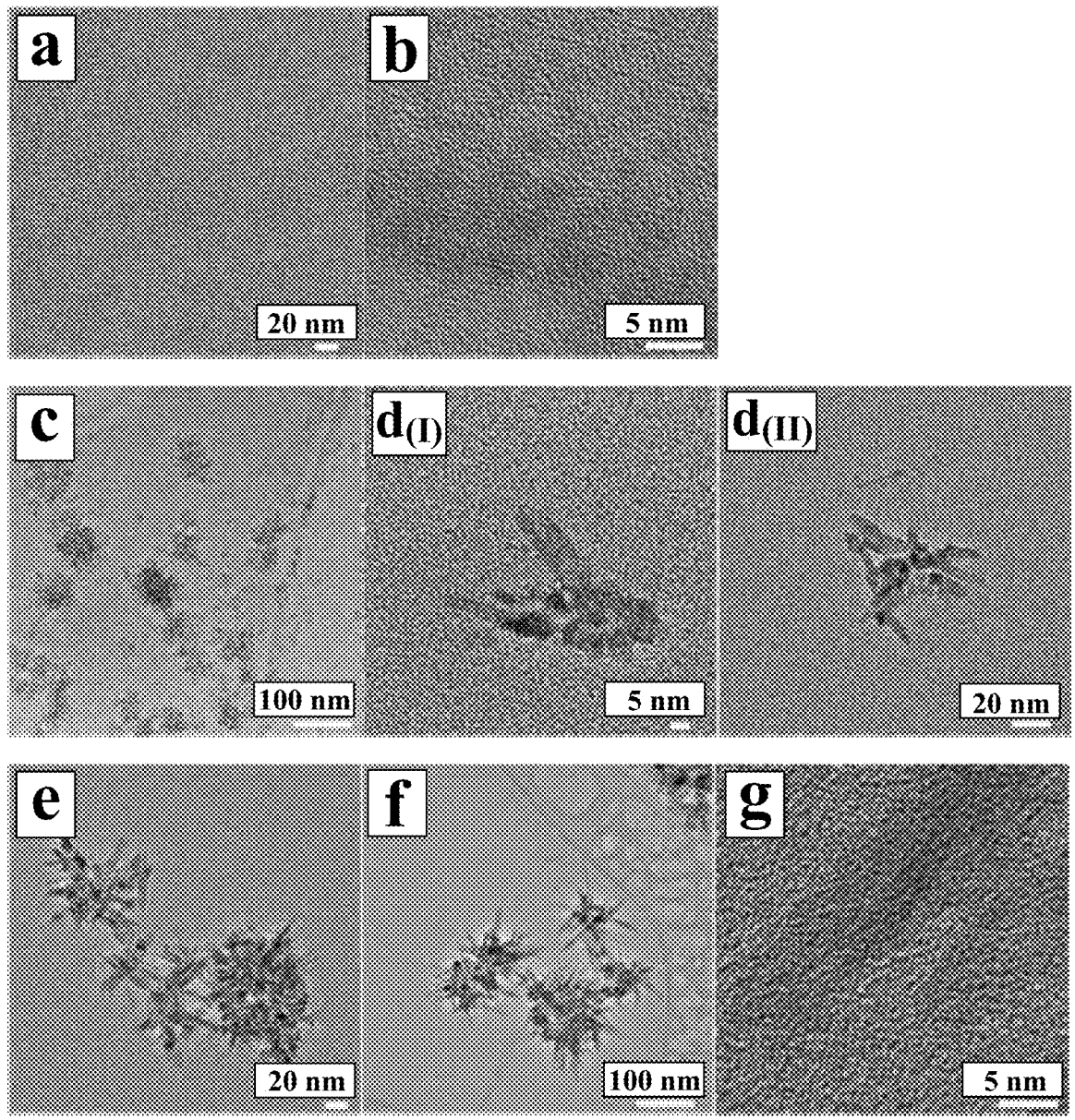

FIGS. 30A-30G show TEM and HRTEM images of reaction aliquots for mesoscale hedgehog particles prepared at 150° C.: FIG. 30A and FIG. 30B: 2 minutes, FIGS. 30C and 30D (including 30D(i) and 30D(ii)) 3 minutes, FIG. 30E: 4 minutes, and FIGS. 30F and 30G: 5.5 minutes.

Figures 31A, 31B:
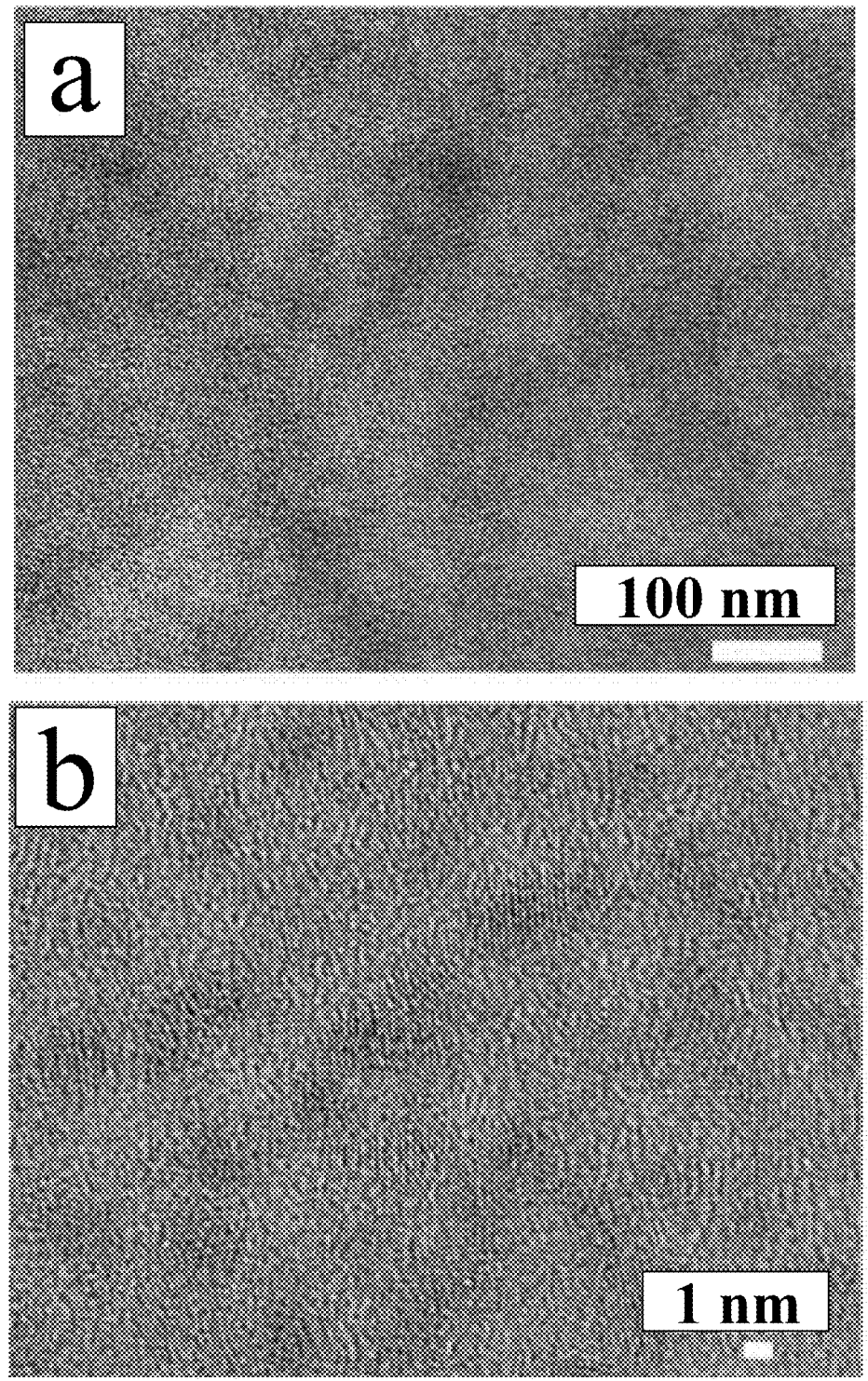

FIGS. 31A-31B. FIG. 31A shows a TEM image and FIG. 31B shows a HR-TEM image of FeSe$_2$ NPs formed at the initial stage of the mesoscale hedgehog assembly at 175° C.

Figure 32:
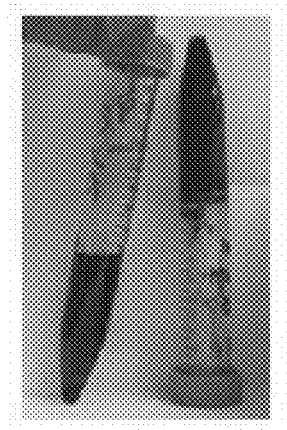

FIG. 32 is a photograph of the resulting FeSe$_2$ nanoscale dispersions: left, nanosheets; right, mesoscale hedgehog particles.

Figure 33:
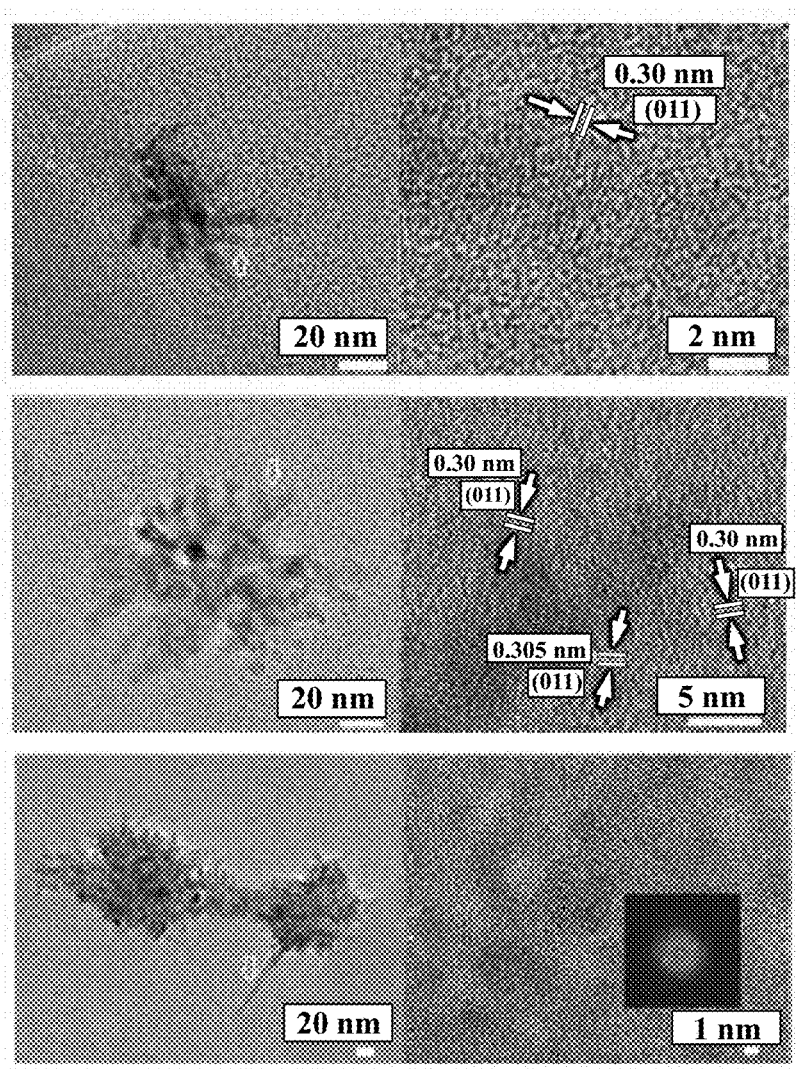

FIG. 33 shows TEM (left) and HRTEM (right) images of the FeSe$_2$ assemblies formed at the early stage (≤1 minute at 175° C.) of mesoscale hedgehog particles formation. The HRTEM image is taken at the area marked by white arrow in corresponding left panel. The nanosheets in the right column can be compared to those schematically depicted in FIGS. 9A-9D.

Figures 34D, 34E, 34F, 34G:
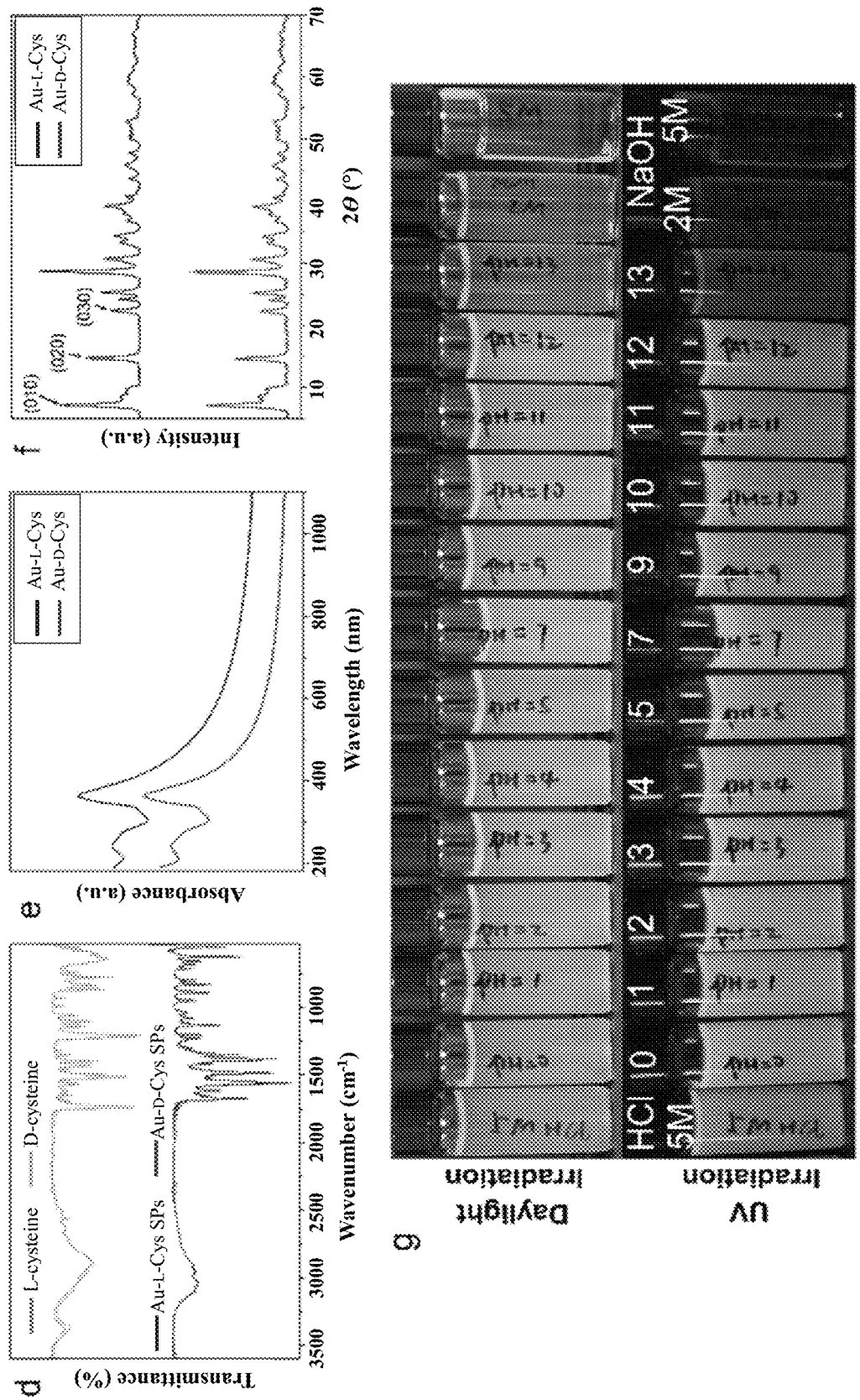

FIGS. 34A-34G. FIG. 34A is a schematic illustration of platelets of Au-Cys (gold-thiolates). FIGS. 34B-34F show spectral analyses of Au-L-Cys (upper blue line) and Au-D-Cys (lower red line) by XPS (FIG. 34B), TGA (FIG. 34C), FTIR (FIG. 34D), UV-vis (FIG. 34E) and XRD (FIG. 34F). FTIR spectra of references of L-cysteine (light blue in upper region) and D-cysteine (light red in upper region) are shown in FIG. 34 D, as well. FIG. 34G shows a stability study of Au-L-Cys dispersions with different pH values or concentrations of HCl or NaOH after 12 hours. The top photo is taken under daylight illumination and bottom photo is taken under UV light (wavelength: 365 nm) irradiation.

Figures 35A, 35B, 35C, 35D, 35E, 35F, 35G, 35H, 35I:
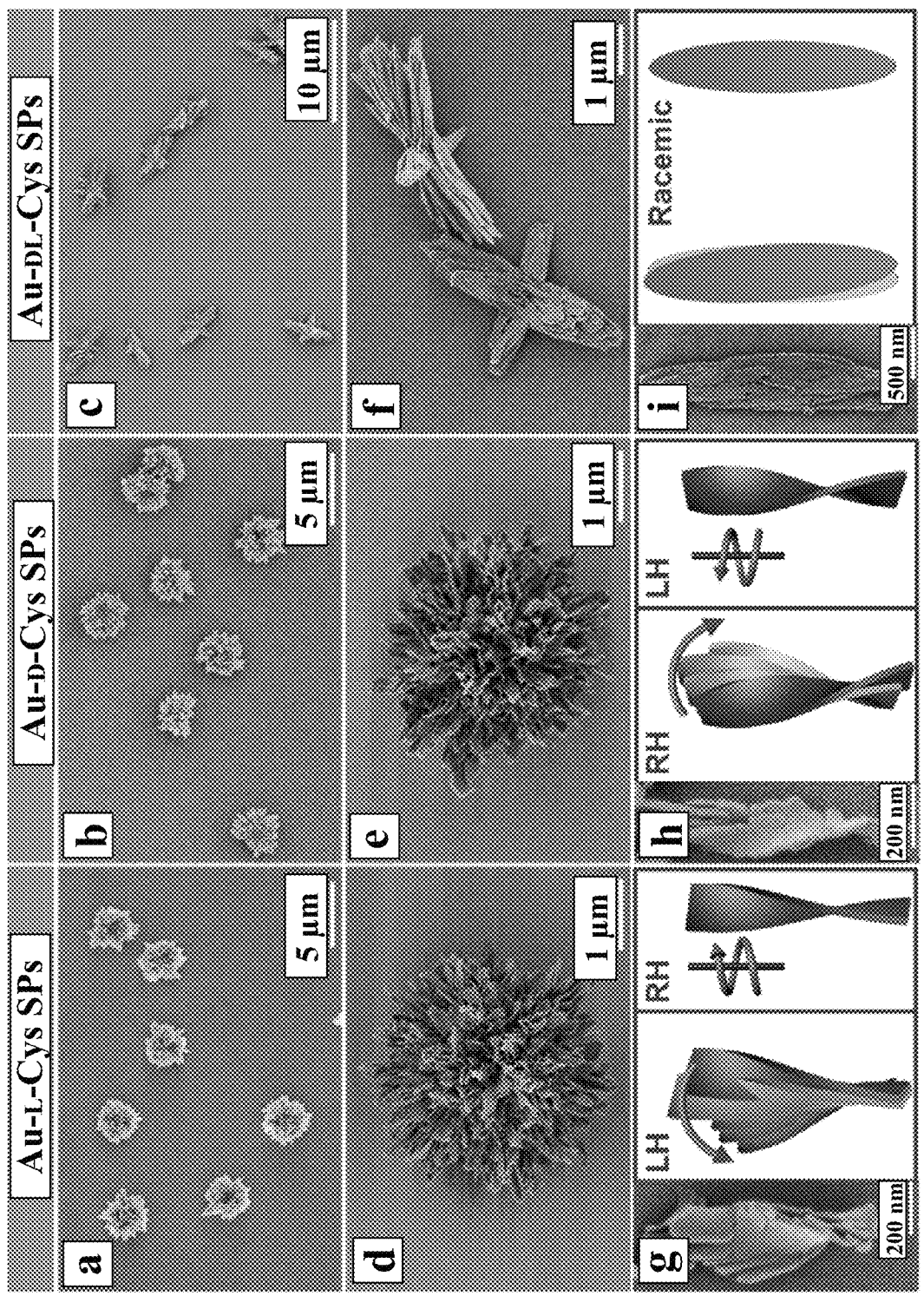

FIGS. 35A-35I are morphologies of gold thiolate (Au-Cys) supraparticles (SPs). FIGS. 35A-35C show SEM images of Au-L-Cys (FIG. 35A), Au-D-Cys (FIG. 35B) and Au-DL-Cys (FIG. 35C) SPs with a low magnification. FIGS. 35D-35F show enlarged SEM images of Au-L-Cys (FIG. 35D), Au-D-Cys (FIG. 35E) and Au-DL-Cys (FIG. 35F) SPs. FIGS. 35G-35I show SEM images and corresponding schematic illustrations showing chiral behavior of segments of Au-L-Cys (FIG. 35G), Au-D-Cys (FIG. 35H) and Au-DL-Cys (FIG. 35I) SPs after a short time of sonication.

Figures 36A, 36B, 36C, 36D, 36E, 36F, 36G:
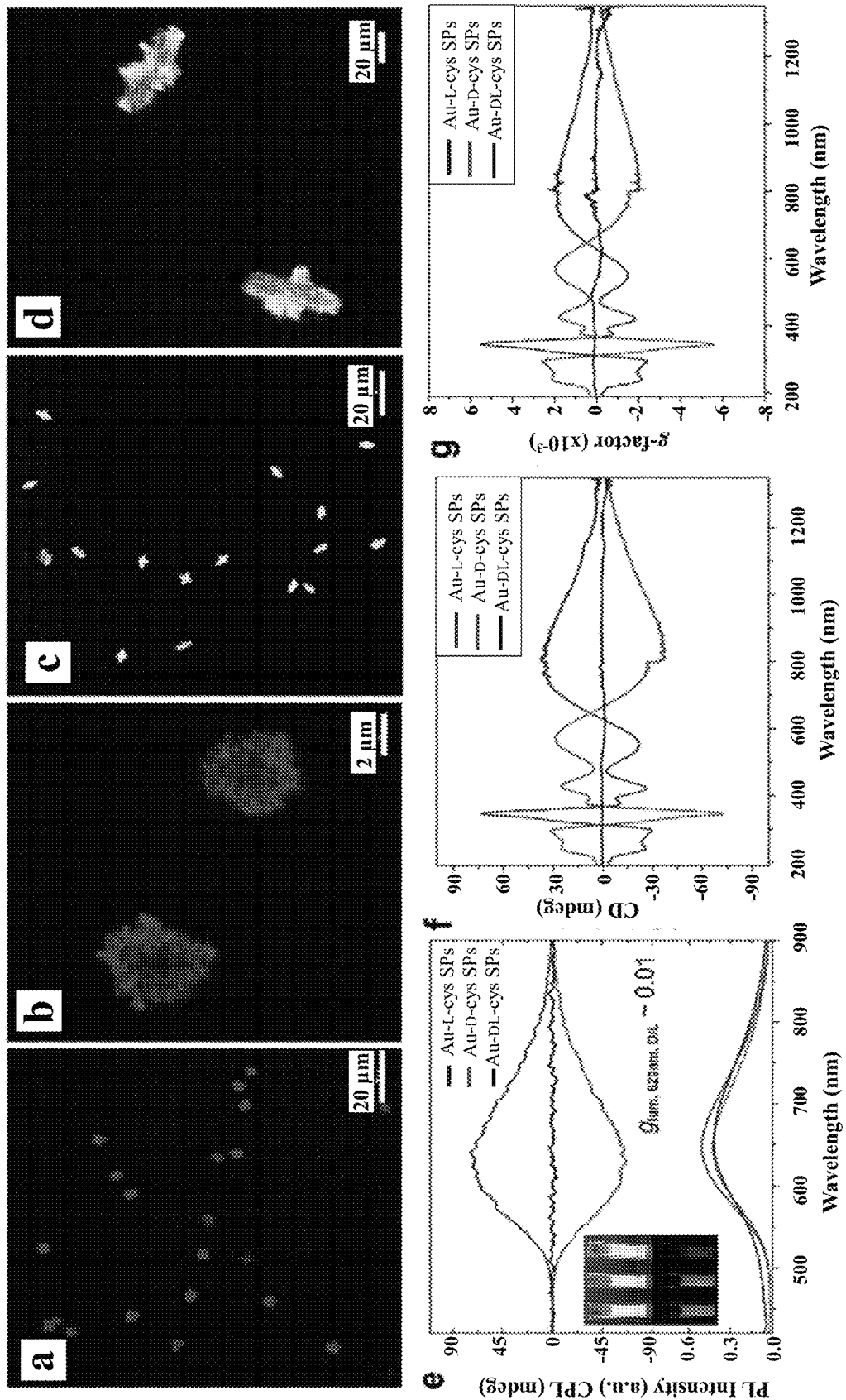
Figures 36H, 36I, 36J:
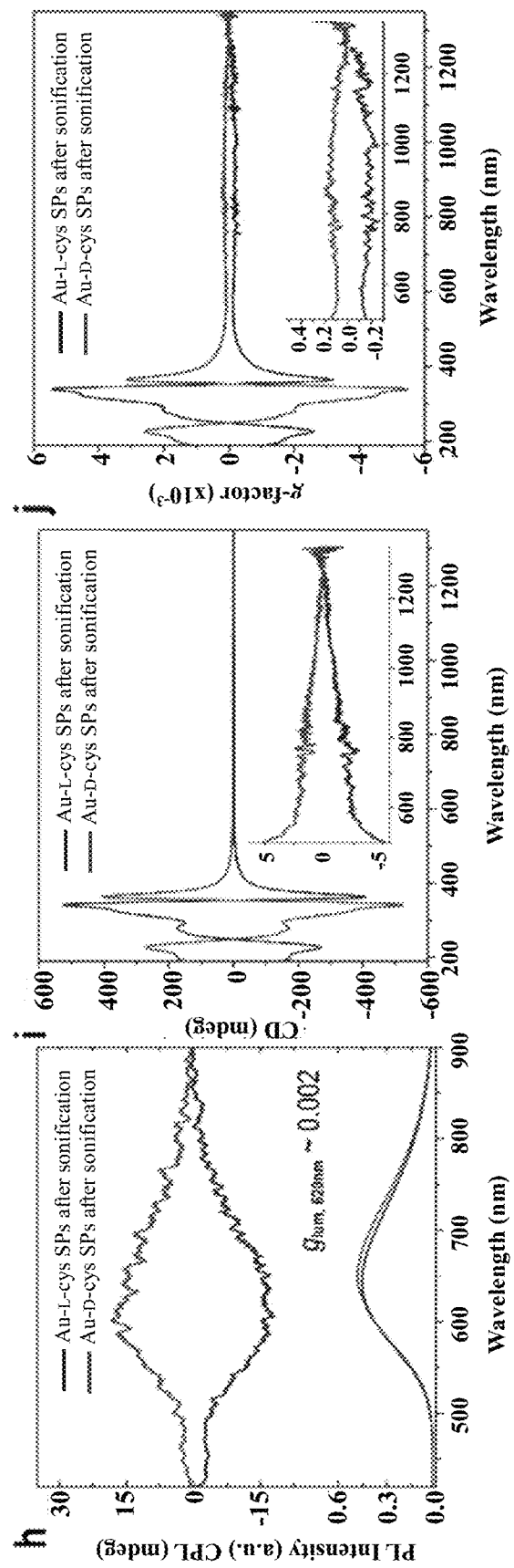

FIGS. 36A-36J are graphs of optical properties of gold thiolate/Au-Cys supraparticles (SPs). FIGS. 36A-36D show confocal microscopy images of Au-L-Cys (FIGS. 36A-36B), and Au-DL-Cys (FIGS. 36C-36D) SPs. FIGS. 36E-36G show CPL (FIG. 36E), CD (FIG. 36F) and anisotropy g factor of absorbance (FIG. 36G) spectra of Au-L-Cys (blue), Au-D-Cys (red) and Au-DL-Cys (black) SPs. Inset in FIG. 36E shows photos of Au-L-Cys, Au-D-Cys and Au-DL-Cys SP dispersions under daylight and UV light illumination. FIG. 36H shows CPL, FIG. 36I shows CD, and FIG. 36J shows g factor of absorbance spectra of Au-L-Cys (blue), Au-D-Cys (red) after sonication. Insets in FIGS. 36I and 36J show enlarged spectra with wavelength range from 500 nm to 1350 nm.

Figures 37A, 37B, 37C, 37D, 37E, 37F:
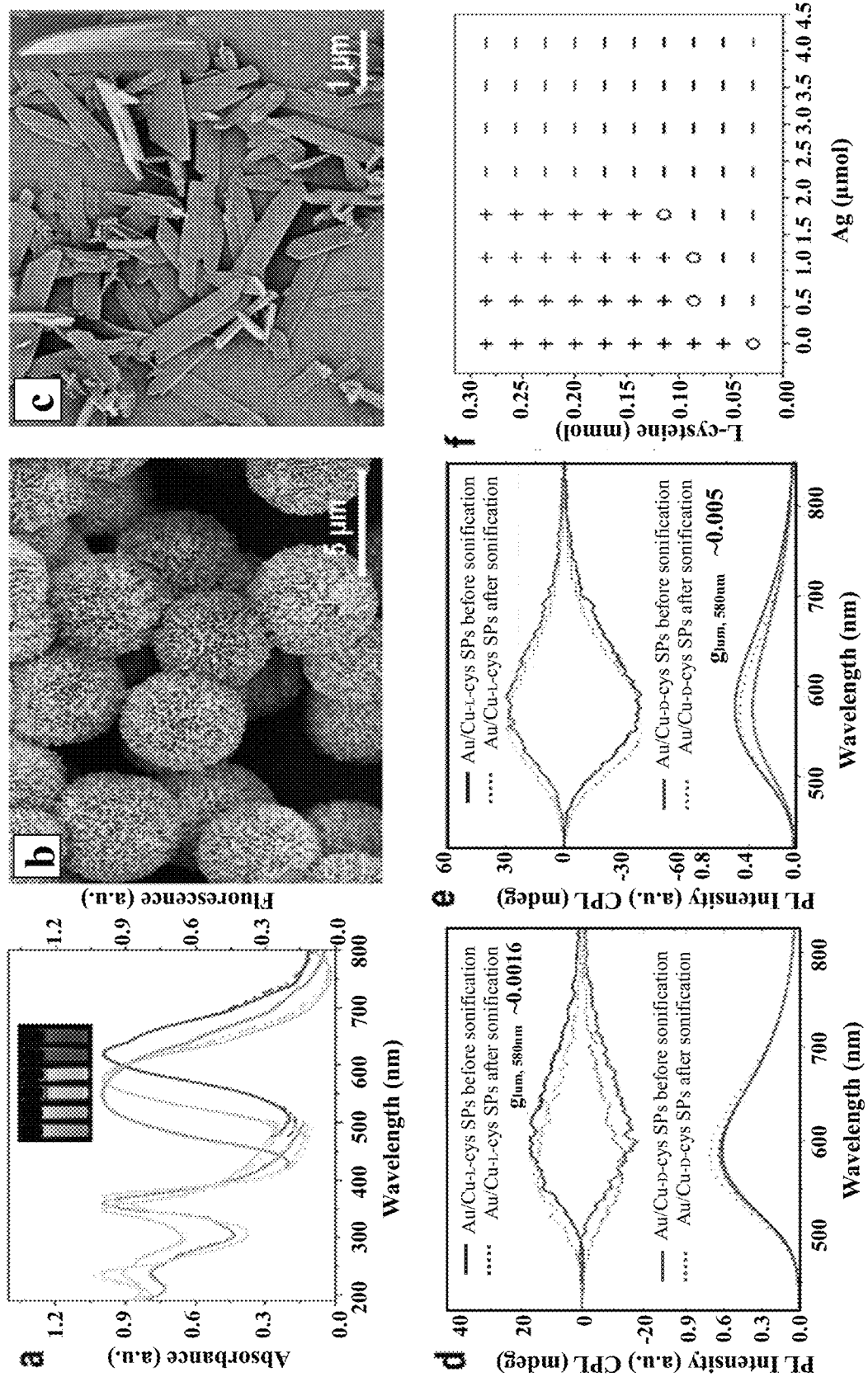
Figures 37G, 37H:
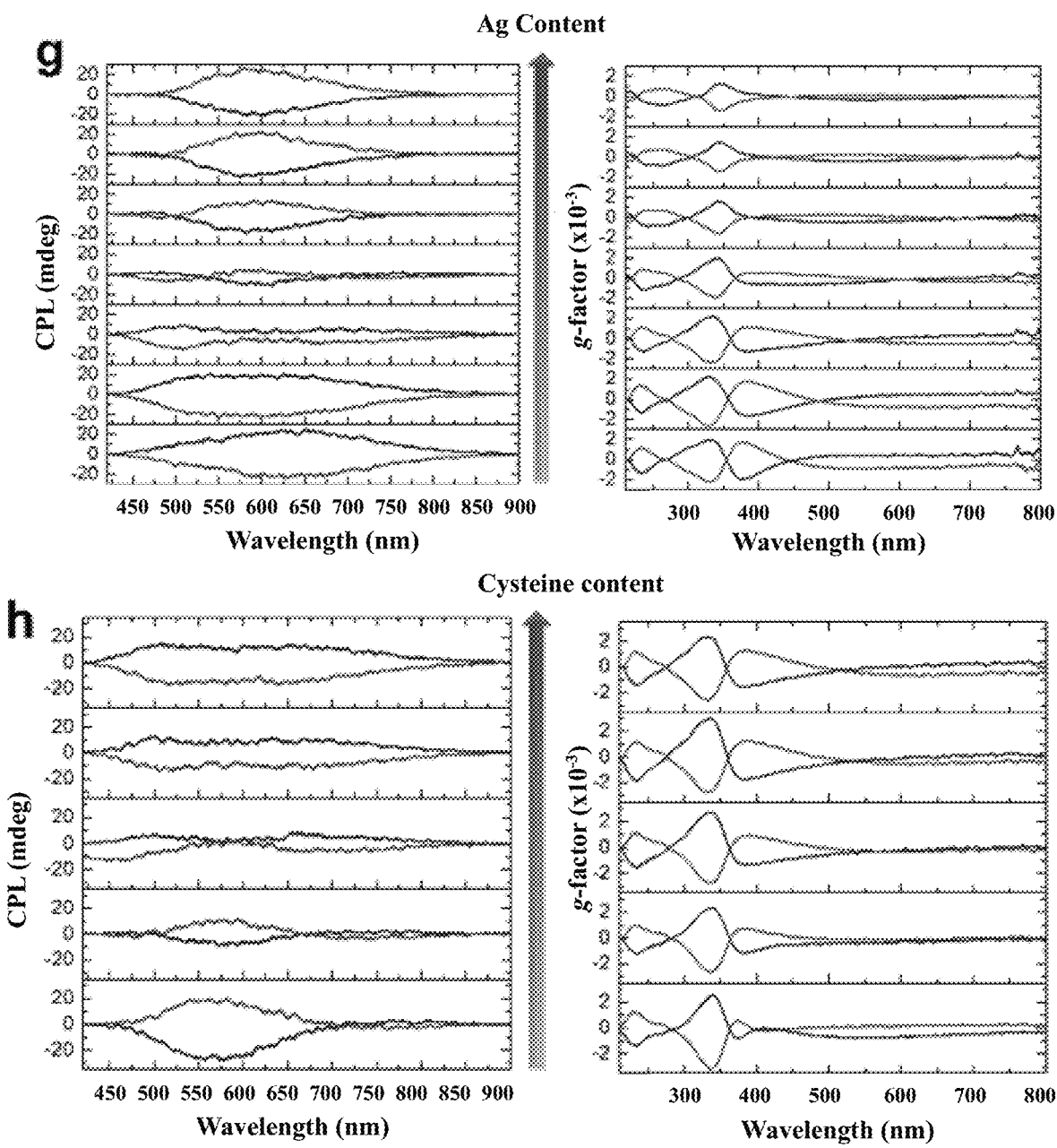

FIGS. 37A-37H are graphs of morphology and optical activities of Au/Cu-Cys and Au/Ag-Cys superstructures, which are hedgehog-shaped particles. FIG. 37A shows UV-vis and PL spectra of Au-Cys (red), Au/Cu-Cys (orange) and Au/Ag-Cys (green) samples. Solid line shows superstructures obtained from L-cysteine; the dashed line shows superstructures obtained from D-cysteine. Inset: photos of Au-Cys, Au/Cu-Cys and Au/Ag-Cys samples (right to left) under UV light. FIGS. 37B-37C show SEM images of Au/Cu-D-Cys SPs (FIG. 37B) and Au/Ag-D-Cys nanoflakes (NFs) (FIG. 37C). FIGS. 37D-37E show CPL spectra of Au/Cu-Cys (FIG. 37D) and Au/Ag-Cys (FIG. 37E) superstructures. Solid line shows the sample before sonication; the dotted line shows the sample after sonication. FIG. 37F show dependence of CPL sign of Au/Ag-L-Cys on the amount of silver and cysteine added to 17 µmol $HAuCl_4$. CPL sign: positive (+), negative (−) and neutral (o). FIGS. 37G-37H show CPL (left) and CD (right) spectra of Au/Ag-Cys superstructures with different amount of silver (FIG. 37G) or cysteine (FIG. 37H). Blue lines in FIGS. 37D, 37E, 37G, and 37H correspond to superstructures obtained from L-cysteine, while red lines correspond to ones from D-cysteine.

Figure 38:
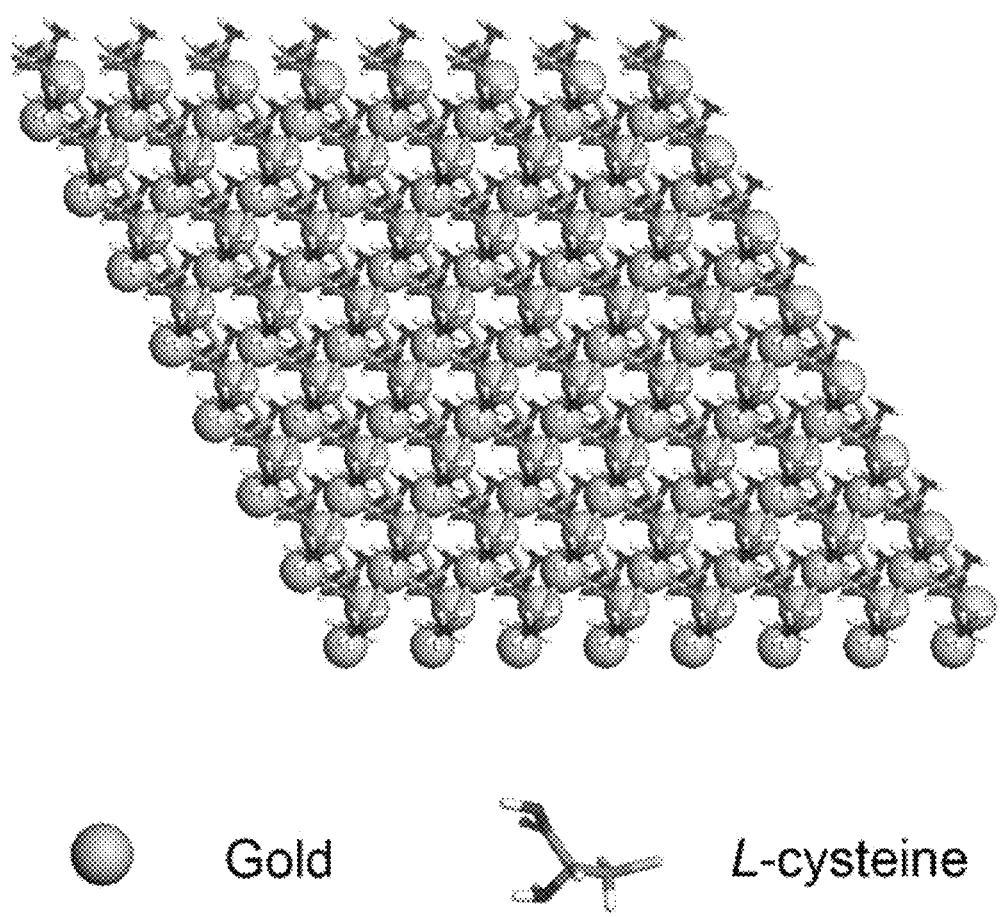

FIG. 38 shows a schematic of a structural illustration of a gold-cysteine system.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

Example embodiments will now be described more fully with reference to the accompanying drawings.

In various aspects, the present disclosure provides methods of making hedgehog-shaped particles. Hedgehog particles may be microparticles or nanoparticles that generally emulate the shape of a hedgehog animal in that the particles have spikes protruding from a central core region. Accordingly, hedgehog particles are multi-component particles with binary size regimes that comprise a micron-scale core on which needles or spikes are oriented orthogonal to the core surface. Hedgehog particles thus provide a new class of rough particles.

A "microparticle" as used herein encompasses "nanoparticles" and "mesoparticles," as discussed below. In certain variations of the present teachings, a microparticle component has at least one spatial dimension that is less than about 1,000 μm (i.e., 1 mm), optionally less than or equal to about 100 μm (i.e., 100,000 nm). The term "micro-sized" or "micrometer-sized" as used herein is generally understood by those of skill in the art to mean less than about 500 μm (i.e., 0.5 mm). As used herein, a microparticle has at least one spatial dimension that is less than about 10 μm (i.e., 10,000 nm), optionally less than about 5 μm (i.e., 5,000 nm), optionally less than about 1 μm (i.e., 1,000 nm), optionally less than about 0.5 μm (i.e., 500 nm), and in certain aspects less than or equal to about 0.1 μm (i.e., 100 nm).

The hedgehog particles may be "mesoscale," which generally refers to particles having a diameter of greater than or equal to about 100 nm to less than or equal to about one micrometer (1 μm).

The hedgehog particles can also be "nano-sized" or "nanometer-sized" and have at least one spatial dimension that is less than about 1 μm (i.e., 1,000 nm), optionally less than about 0.5 μm (i.e., 500 nm), optionally less than about 0.4 μm (i.e., 400 nm), optionally less than about 0.3 μm (i.e., 300 nm), optionally less than about 0.2 μm (i.e., 200 nm), and in certain variations, optionally less than about 0.1 μm (i.e., 100 nm). Notably, nanoscale particles may have a size that is also encompassed by a mesoscale size. Accordingly, a nanoparticle may have at least one spatial dimension that is greater than about 1 nm and less than about 1,000 nm (1 μm). In certain variations, a nanoparticle may have at least one spatial dimension of about 5 nm to about 500 nm. It should be noted that so long as at least one dimension of the nanoparticle falls within the above-described nano-sized scale (for example, diameter), one or more other axes may well exceed the nano-size (for example, length and/or width).

Hedgehog particles have a core region formed of a first material and a plurality of spikes or needles formed of a second material. The first material and the second material may be formed of distinct material compositions or may be the same material composition. In certain variations of the present disclosure, the first and second materials are formed of the same inorganic metal-containing material composition, such as a metal chalcogenide, like an iron chalcogenide material. Hedgehog particles can self-assemble from nanoparticles so that the same material forms the core and the spikes or needles, such as a metal-containing chalcogenide material. In certain variations, hedgehog-shaped particles may comprise an iron-containing chalcogenide material. In certain other variations, the hedgehog-shaped particles may comprise a gold-containing chalcogenide material.

Chalcogenides typically comprise an element from Group 16 of the Periodic Table, such as selenium, sulfur, tellurium, and the like. In certain variations, metal selenium chalcogenides and metal sulfur chalcogenides may be formed. In one variation, the iron chalcogenide may comprise selenium and be iron diselenide ($FeSe_2$) or a compound with a stoichiometry similar to iron diselenide, which will be referred to herein as iron diselenide ($FeSe_2$). In certain other variations, a gold chalcogenide formed may comprise sulfur and be an iron thiolate (AuRS, where R is a hydrocarbon radical, such as an alkyl group, aryl group, and the like). In certain variations, the hydrocarbon radical R may be a portion of a sulfur-containing amino acid, such as those amino acids containing thiol groups, like cysteine, homocysteine, penicillamine, methionine, and/or combinations thereof or of different amino acids. Other chiral and achiral ligands containing chalcogens, as well as ligands that similarly strongly bind to the metal-containing sheets can be utilized in the processes described in the context of the present disclosure. In addition to iron (Fe) and gold (Au), other metals that may form chalcogenides and thus form hedgehog particles by self-assembly include, but are not limited to, transition metals such as nickel (Ni), molybdenum (Mo), niobium (Nb), technetium (Tc), tungsten (W), tantalum (Ta), chromium (Cr), manganese (Mn), copper (Cu), vanadium (V), titanium (Ti), zirconium (Zr), hafnium (Hf), ruthenium (Ru), osmium (Os), zinc (Zn), rhenium (Re), and combinations thereof. The hedgehog-shaped particles may also be made of metals including mixtures of transition and non-transition metals, for example, exemplified by Fe—Na—Zn material.

The spikes or needles may have an axial geometry and are anisotropic with an evident elongated longitudinal axis, which is longer than the other dimensions (e.g., diameter or width). Generally, an aspect ratio (AR) for cylindrical shapes (e.g., needle, spike, pillar, etc.) is defined as AR=L/D, where L is the length of the longest axis (here the major longitudinal axis) and D is the diameter of the needle or pillar. Suitable spikes or needles for use in the present technology generally have high aspect ratios, for example, ranging from at least about 100 to in excess of 1,000, for example. In yet other aspects, such needles may have an aspect ratio of 5,000.

The needles are connected to a surface of the core region. In various aspects, the needles may be substantially orthogonal to a surface of the core region. By "substantially orthogonal," it is meant that a longitudinal axis of the needle may form an angle with respect to the core surface (where the needle is connected) having an angle of about 90° or another angle that slightly deviates from 90°, deviating up to about 15° (from about 75° to about 105°).

Certain hedgehog-shaped particles reveal unusual colloidal properties. In past methods, hedgehog particles could be made by growing specific semiconductor (e.g., ZnO) nanowires on a microscale polymeric (e.g., polystyrene) core in a multistage process, for example, as described in J. H. Bahng, et al. "Anomalous Dispersions of Hedgehog Particles," *Nature*, 517, 596-599 (2015) and D. C. Montjoy et al. "Omnidispersible Hedgehog Particles with Multilayer Coatings for Multiplexed Biosensing," *J. Am. Chem. Soc.*, 140 (25), 7835-7845 (2018), the relevant portions of each of which are incorporated herein by reference. The semiconductor "needles" in these structures can display both excitonic and plasmonic properties and serve as components in optical and catalytic systems. However, alternative self-organization routes for formation of hedgehogs can be preferential due to their simplicity, although prior to the inventive activities, it seemed highly unlikely to be possible to make hedgehog-shaped particles via self-assembly or self-organization methods.

In certain aspects, the present disclosure provides self-assembly of hedgehog-shaped particles from a new classes of materials, for example, from iron chalcogenides or gold thiolates. An important member of the iron chalcogenide family of materials, iron diselenide, $FeSe_2$, is a p-type semiconductor with a 1.0 eV band gap and an absorption coefficient of $5\times10^5$ cm$^{-1}$ ($\lambda$<800 nm), which makes it promising as an efficient light absorber, electrode material, and photocatalyst. $FeSe_2$ nano- and mesoscale structures are technologically important and can be made in geometrically complex forms including corrugated structures. Likewise, gold thiolates possess optical properties determined by the electronic structure of the gold-sulfur sheets formed under certain conditions from gold thiolates. Laminated gold thiolates (FIGS. 34A and 38) form atomically thin sheets that display interesting optical and electrical properties related to aurophilic bonds. Early results obtained for silver thiolate indicate that chiral amino acid may induce twists in these two-dimensional materials. Further, gold thiolates exhibit strong luminescence related to the formation of the aurophilic bonds that is typically located in the yellow-to red part of the visible spectrum between 550 nm to 800 nm.

In certain aspects, methods of making hedgehog particles from a metal-containing material, such as a metal chalcogenide material, are provided herein. First, a metal-containing precursor is provided in a liquid carrier. In some embodiments, the metal-containing precursor may be an iron-containing precursor, such as iron chloride ($FeCl_3$), or a gold-containing precursor, such as gold hydrochloride ($HAuCl_4$). However, the metal containing precursor may contain any of those metals described previously above. A chalcogen-containing precursor may also be added to the liquid carrier. The liquid carrier may also comprise a self-assembly additive, which will be described in greater detail below. The metal-containing precursor forms a metal-containing nanoparticle, such as metal chalcogenide nanoparticles having platelet-like shapes, which can then transform into single-crystal sheets, such as nanosheets. In one variation, iron selenide ($FeSe_2$) nanoparticles having platelet-like shapes can then transform into single-crystal nanosheets. A platelet-like shape is typically flattened, for example, a plate that may have an oval (e.g., disc), polygonal (e.g., trapezoidal or rectangular), or irregular shape. As used herein, platelet and flake are used interchangeably. In certain variations, the platelet-shaped nanoparticle may have an average particle size diameter of greater than or equal to about 1 nm to less than or equal to about 10 nm, optionally of greater than or equal to about 2 nm to less than or equal to about 4 nm, prior to formation of a nanosheet. In this aspect, the aspect ratio (AR) may be as defined as AR=L/H, where L is the length of the longest axis (here the major lateral axis) and H is height. A platelet generally defines a nanoscale particle with AR of greater than or equal to about 3 to less than or equal to about 10.

A sheet is a laminar continuous structure, for example a layer or film, that has a substantially greater lateral dimension (width or length) than a height and in the context of the present disclosure, may include multiple platelet-like particles consolidated together to form a single crystal monolithic sheet body. A micro- or nanosheet has at least one dimension in the micro or nanoscale described above. In certain aspects, the sheets have a laminar geometry with an evident elongated lateral axis, which is greater than the other dimensions (e.g., height). Suitable nanosheets for use in the present technology generally have high aspect ratios, for example, ranging from at least about 100 to in excess of 1,000, for example. In one variation, a nanosheet may have an aspect ratio of greater than or equal to about 100 to less than or equal to about 200.

In the method, as discussed above, the platelet-shaped nanoparticles may be formed in a liquid (e.g., formed as a dispersion in a slurry). The self-assembly additive is one that facilitates organization of platelet-shaped nanoparticles into the hedgehog shaped particles via self-assembly. Suitable self-assembly additives include dodecanethiol (DT), oleylamine (OLA), and/or hexadecyltrimethyl ammonium bromide (CTAB), and combinations thereof. In certain aspects, both DT and OLA are added to the precursors of the nanoparticles to form platelet-shaped nanoparticles. In certain aspects, a ratio of OLA to DT may range from about 10:1 to about 1:10, optionally about 5:1 to about 1:5, and in certain variations, optionally about 4:1 to about 1:4.

Other surface or self-assembly additives that can lead to formation of platelets from metal-containing chalcogenides include structures with general composition R—SH, R—OH, R—COOH, R—NH$_2$, R$^1$R$^2$NH, R$^1$N, R$^2$N, R$^3$N, R$^4$N$^+$ in ionized or non-ionized form where R, R$^1$, R$^2$, R$^3$, R$^4$ are organic residues. For example, an organic residue R may be an alkyl group, including substituted and unsubstituted saturated and unsaturated groups, such as aryl and cyclic alkyl groups, including for example, olefins, alkenes, and aromatic compounds. Thus, such compounds may be with or without additional functional groups, such as, —NH$_2$, —OH, —COOH, —COH, —C$_6$H$_5$, —N$_2$, and the like.

The presence of the self-assembly additives can facilitate transformation from the platelet-shaped nanoparticle to a rolled nanosheet. One or more platelet-shaped nanoparticles may associate to form a core region, while the self-assembly additive, like DT and/or OLA, can form ligands on the surface of the nanosheet and/or core region facilitating the formation of rolled nanosheets and an attachment in a predetermined orientation to the surface of the core region. In certain variations, DT may be present in the liquid at 0.1 mL and OLA at 2 mL to facilitate formation of the nanosheets. Synthesis of FeSe$_2$ NPs thus can take place in a mixture of DT and OLA. Besides coordinating the NP surface, this liquid media also reduces Fe$^{3+}$ into Fe$^{2+}$. As the nanosheets form, they spontaneously rolled into scroll-like shapes. The scrolls are subsequently assembled around the common iron-containing (e.g., $FeSe_2$) core made from multiple primary NPs.

In certain aspects, a self-assembly method for making a hedgehog-shaped nanoscale, mesoscale, or microscale particles are provided. The method optionally comprises combining a metal-containing precursor, a chalcogen-containing precursor and a self-assembly additive. The chalcogen-containing precursor may be a selenium-containing precursor or a sulfur-containing precursor. A self-assembly additive may be selected from the group consisting of: dodecanethiol (DT), oleylamine (OLA), hexadecyltrimethyl ammonium bromide (CTAS), and combinations thereof. In certain variations, the metal-containing precursor may be selected from the group consisting of: iron (Fe), gold (Au), nickel (Ni), molybdenum (Mo), niobium (Nb), technetium (Tc), tungsten (W), tantalum (Ta), chromium (Cr), manganese (Mn), copper (Cu), vanadium (V), titanium (Ti), zirconium (Zr), hafnium (Hf), ruthenium (Ru), osmium (Os), zinc (Zn), rhenium (Re), and combinations thereof. In certain variations, the metal-containing precursor is an iron-containing precursor. One such example is iron chloride ($FeCl_3$). In other variations, the metal-containing precursor is a gold-containing precursor. One such example is gold hydrochloride ($HAuCl_4$).

A metal dopant may also be combined with the precursors. Suitable metal dopants include copper (Cu), silver (Ag), and the like.

In certain variations, where an iron-containing precursor and a selenium-containing precursor are used, the self-assembly additive includes dodecanethiol (DT), oleylamine (OLA) or both dodecanethiol (DT), oleylamine (OLA). In other variations, where a gold-containing precursor and a sulfur-containing precursor are used, the self-assembly additive includes hexadecyltrimethyl ammonium bromide (CTAB).

In certain variations, the combining forms a liquid admixture that comprises greater than or equal to about 10 wt. % to less than or equal to about 60 wt. % of the metal-containing precursor, greater than or equal to about 20 wt. % to less than or equal to about 60 wt. % of the chalcogen-containing precursor, and optionally greater than or equal to about 0.01 wt. % to less than or equal to about 50 wt. % of the self-assembly additive. The metal dopant may be added at greater than or equal to about 0.01 wt. % to less than or equal to about 10 wt. % of the liquid admixture.

In one embodiment, the combining forms an admixture that comprises greater than or equal to about 10 wt. % to less than or equal to about 60 wt. % of an iron-containing precursor, greater than or equal to about 20 wt. % to less than or equal to about 60 wt. % of a selenium-containing precursor, greater than or equal to about 0.01 wt. % to less than or equal to about 15 wt. % of dodecanethiol (DT), and greater than or equal to about 0.1 wt. % to less than or equal to about 50 wt. % of oleylamine (OLA). In one variation, the admixture comprises greater than or equal to about 45 wt. % to less than or equal to about 50 wt. % of an iron-containing precursor, for example, about 47 wt. %, optionally greater than or equal to about 45 wt. % to less than or equal to about 50 wt. % of a selenium-containing precursor, for example, about 46 wt. %, optionally greater than or equal to about 1.5 wt. % to less than or equal to about 2 wt. % of dodecanethiol (DT), for example, about 1.7 wt. %, and greater than or equal to about 2.4 wt. % to less than or equal to about 2.9 wt. % of oleylamine (OLA), for example, about 2.6 wt. %.

The admixture may comprise dodecanethiol (DT) at a concentration of greater than or equal to about 10 mmol/L to less than or equal to about 1,000 mmol/L and oleylamine (OLA) at greater than or equal to about 0.1% by mass concentration to less than or equal to about 50% by mass concentration.

The method includes forming at least one hedgehog-shaped nanoscale, mesoscale, or microscale particle that defines a core region formed of a first material and a plurality of needles connected to and substantially orthogonal to a surface of the core region. The plurality of needles comprises a second material. In one variation, at least one of the first material or the second material comprises iron and selenium. In another variation, at least one of the first material or the second material comprises gold and sulfur.

In certain aspects, prior to the forming at least one hedgehog-shaped nanoscale, mesoscale, or microscale particle, the combining further comprises forming a plurality of platelet-like nanoparticles that assemble together into a nanosheet. In certain variations, the nanosheet then rolls into a hollow structure that defines a needle to form one of the plurality of needles. In other variations, the nanosheet may either twist or twist-and-stack into the needles/spikes. In certain variations, the nanosheet comprises a single crystal morphology.

In certain aspects, the combining further comprises forming a first liquid by combining the iron-containing precursor with a first portion of the self-assembly additive and heating the first liquid. The first liquid may also be stirred. Then, a second liquid is formed comprising the selenium-containing precursor and a second portion of the self-assembly additive. The second liquid may be introduced or injected into the first liquid to form the at least one nanoparticle. In certain variations, the first liquid is heated to a temperature of greater than or equal to about 175° C. For example, the first liquid reaction mixture may be slowly heated to 175° C. (for example, within 30 minutes) under a nitrogen atmosphere. During this heating process, $Fe^{3+}$ cations are reduced by the additive (e.g., the mixed system of OLA and DT) to form the $Fe^{2+}$ precursor. The combined first and second liquids may be maintained at a temperature of greater than or equal to about 175° C. for a time period sufficient to facilitate assembly of a plurality of platelet-like nanoparticles together into a nanosheet, for example, for greater than or equal to about 30 minutes. Then, the combined mixture may be rapidly cooled to room temperature.

In certain variations, the iron-containing precursor comprises iron chloride ($FeCl_3$) and the selenium-containing precursor comprises selenium (Se), such as elemental selenium powder. At least one of the first material or the second material comprises iron diselenide ($FeSe_2$).

In certain other aspects, the combining may comprise creating a liquid (e.g., liquid solution) of the various precursors, including the gold-containing precursor, the chalcogen-containing precursor, and the self-assembly additive, for example. In another variation, the combination may include forming a first liquid by combining the gold-containing precursor with a first portion of the self-assembly additive and heating the first liquid. The first liquid may also be stirred. Then, a second liquid is formed comprising the sulfur-containing precursor and a second portion of the self-assembly additive. The second liquid may be introduced or injected into the first liquid to form the at least one nanoparticle. In certain variations, the liquid may be heated to a temperature of greater than or equal to about 175° C. For example, the first liquid reaction mixture may be slowly heated to 175° C. (for example, within 30 minutes) under a nitrogen atmosphere. During this heating process, gold cations are reduced by the self-assembly additive (e.g., the hexadecyltrimethyl ammonium bromide (CTAB)) to form the gold precursor. The combined first and second liquids may be maintained at a temperature of greater than or equal to about 175° C. for a time period sufficient to facilitate assembly of a plurality of platelet-like nanoparticles together into a nanosheet, for example, for greater than or equal to about 30 minutes. Then, the combined mixture may be rapidly cooled to room temperature.

In certain variations, the gold-containing precursor comprises gold hydrochloride ($AuHCl_4$) and the sulfur-containing precursor comprises a sulfur-containing amino acid, such as cysteine, homocysteine, methionine, penicillamine, and the like. At least one of the first material or the second material comprises a gold thiolate (AuRS). The self-assembly additive may be hexadecyltrimethyl ammonium bromide (CTAB).

In certain variations, the resulting mesoscale hedgehogs formed from such a method (including the core and spikes) may have an average diameter of greater than or equal to about 50 nm to less or equal to about 15 µm. The core of the mesoscale hedgehog particle may have an average diameter of greater than or equal to about 30 nm to less or equal to about 10 µm. The spikes on the mesoscale hedgehog particle may have an average length of greater than or equal to about 5 nm to less or equal to about 5 µm, an average diameter of greater than or equal to about greater than or equal to about 1 nm to less or equal to about 500 nm. An average wall thickness of a respective spike may be greater than or equal to about 0.5 nm and less than or equal to about 100 nm.

In one variation, $FeSe_2$ nanoparticles (NPs) with platelet-like shapes have an average particle size of about 2 nm to 4 nm that are formed into single-crystal nanosheets having lateral dimensions of greater than or equal to about 600 to less than or equal to about 1000 nm with a thickness of about 5.5 nm. Unexpectedly, the scrolls attach to the core by one end with a preferential radial orientation. In one variation, the resulting mesoscale hedgehogs formed from such a method are about 550 nm in average diameter with the spikes having an average length of about 250 nm, an average diameter of greater than or equal to about 10 nm to less than or equal to about 15 nm in diameter, and an average wall thickness of about 2 nm. Size uniformity of the mesoscale hedgehogs appears to be indicative of self-limited mechanism of the assembly. Atomistic molecular dynamics simulations indicate that the primary $FeSe_2$ nanoplatelets have mobile edge atoms, which is important to understanding their recrystallization into single crystal sheets. Furthermore, the simulations also show asymmetric basal surfaces originating from the size constraints of the primary NPs and periodicity of orthorhombic $FeSe_2$ crystal lattice. While not limiting the present disclosure to any particular theory, asymmetry during the intermediate steps for formation of mesoscale hedgehogs appears to be important for the sophistication of resulting superstructures formed. These results demonstrate that self-assembly of NPs with non-biological surface ligands can produce inorganic superstructures with complexity comparable to that of hierarchically organized biological assemblies. Furthermore, the semiconductor nature of $FeSe_2$ hedgehogs enables their utilization in biomimetic catalysis, drug delivery, optics, and energy storage, by way of non-limiting example. Similarly, gold thiolates have chiroptical and other beneficial properties.

Based on $FeSe_2$ and $FeS_2$ nanochemistry, in the presence of both dodecanethiol (DT) and oleylamine (OLA), $FeSe_2$ NPs assembled into single-crystal nanosheets. For example, increasing the amount of DT or OLA leads to assembly of the $FeSe_2$ NPs into mesoscale hedgehog particles having a uniform size distribution. Considering that each needle or spike of these hedgehog particles is a scroll of the nanosheet and each of them stem from the self-limited supraparticular spheroid, such complexity in self-assembled structures of NPs is remarkable. Similarly, AuS nanochemistry in the presence of hexadecyltrimethyl ammonium bromide (CTAS) appears to facilitate formation of hedgehog particles by imparting strong electrostatic repulsion to the single sheets that self-assemble into hedgehog shaped particles. Electrostatic or similar frustrating and limiting effect forces restricting the assembly of nanoparticles, which is required for the formation of the spikes.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested. Features discussed in the context of one embodiment are intended to be applicable to other embodiments, unless otherwise indicated.

Example 1

Synthesis of $FeSe_2$ NPs takes place in a mixture of DT and OLA. Besides coordinating the NP surface, this media also reduces $Fe^{3+}$ into $Fe^{2+}$.

The chemicals used in this example are as follows. Anhydrous $FeCl_3$ (≥98%, Aldrich), Se powder (100 mesh, 99.5%, Alfa Aesar), 1-dodecanethiol (DT, ≥97%, Fluka), oleylamine (OLA, C18-content 80-90%, Acros), 1-octadecene (ODE, 90%, Aldrich), oleic acid (OA, 99%, Fluka), chloroform (>99.9%, Aldrich). All chemicals are used as received.

Synthesis of $FeSe_2$ Nanosheets. For a typical synthetic reaction, anhydrous $FeCl_3$ (0.25 mmol) is first mixed with 3 mL of octadecene (ODE), 2 mL of OLA, 0.1 mL of DT, and 50 µL of oleic acid (OA) in a 50 mL three-neck flask. Under mild stirring, the reaction mixture is slowly heated to 175° C. within 30 min under nitrogen atmosphere until a clear light brown solution is obtained. During this heating process, $Fe^{3+}$ cations are reduced by the mixed system of OLA and DT to form the $Fe^{2+}$ precursor, hereafter named as "solution A." At the same time, the Se precursor solution (i.e., OLA-Se complexes) is prepared by reducing 0.5 mmol of Se powder with the mixture of OLA (0.7 mL) and DT (0.3 mL) at room temperature (m OLA+n Se+HS—$C_{12}H_{25}$→(OLA)$_m$Se$_n$+H$_{25}$C$_{12}$—S—S—C$_{12}$H$_{25}$ (m≤n)), hereafter termed "solution B." When the temperature of solution A reaches 175° C., solution B is swiftly injected (about 1 s) with a syringe. The solution immediately turns dark, indicating the formation of $FeSe_2$ NPs. Subsequently, the reaction temperature is kept at 175° C. for 30 minutes to allow the growth of $FeSe_2$ nanosheets. After that, the flask is rapidly cooled to room temperature to harvest the nanosheets products (black precipitate) via centrifugation and then washing three times with chloroform.

Synthesis of $FeSe_2$ Mesoscale Hedgehog Particles. In general, the synthetic procedure of $FeSe_2$ mesoscale hedgehog particles is similar to that for nanosheets, except that the volume of DT used is increased to 1 ml from 0.1 ml. In this example, the influence of different parameters on the growth of $FeSe_2$ nanostructures is explored.

The volumes of components used to form HPs are converted to mass % in Table 1.

TABLE 1

|  | Amount (mg) | Mass % (by wt. %) |
| --- | --- | --- |
| Sol A (Ingredient) | | |
| DT | 1.1 | 1.6 |
| OLA | 1.63 | 2.5 |
| ODE | 2.77 | 3.2 |
| OA | 0.045 | 0.05 |
| FeCl$_3$ | 40.6 | 46.9 |
| Sol B (Ingredient) | | |
| Se | 39.5 | 45.7 |
| OLA | 0.57 | 0.7 |
| DT | 0.25 | 0.3 |

The volumes of components for forming nanosheets are converted to mass % in Table 2.

TABLE 2

| (Ingredient) | Mass % (by wt. %) |
| --- | --- |
| DT | 0.39 |
| OLA | 2.57 |
| ODE | 2.78 |
| OA | 0.05 |
| FeCl$_3$ | 47.6 |
| Se | 46.3 |

Characterization. Scanning electron microscopy (SEM) images and energy-dispersive X-ray (EDX) spectroscopy data are acquired by a FEI Nova 200 Nanolab Dualbeam FIB system. (High-resolution) Transmission electron microscopy (TEM) images are obtained using a JEOL JEM-3011 microscope operating at 300 kV to further elucidate the size, shape, and crystal structure of the FeSe$_2$ nanocrystals. The geometric morphology of the 3D nanoscroll mesoscale hedgehog particles is characterized by a FEI 300 kV Titan Krios Cryo electron microscope equipped with a Gatan Ultrascan 4000 (model 895) 16-megapixel charge-coupled device (CCD). Atomic force microscopy (AFM) images are obtained using a Veeco Dimension Icon AFM (Bruker), operating in the ScanAsyst-air-mode. Powder X-ray diffraction (XRD) experiments are performed on a Rigaku Rotating Anode X-ray Diffractometer using Cu Kα radiation (1.54 Å) to determine the crystal structure of the nanocrystals. In addition, absorption and (photoluminescence) PL emission spectra are measured at room temperature using an Agilent 8453 UV-Vis spectrophotometer and a Jobin Yvon Fluoro Max-3 spectrofluorometer, respectively.

Figures 1A, 1B, 1C, 1D, 1E:
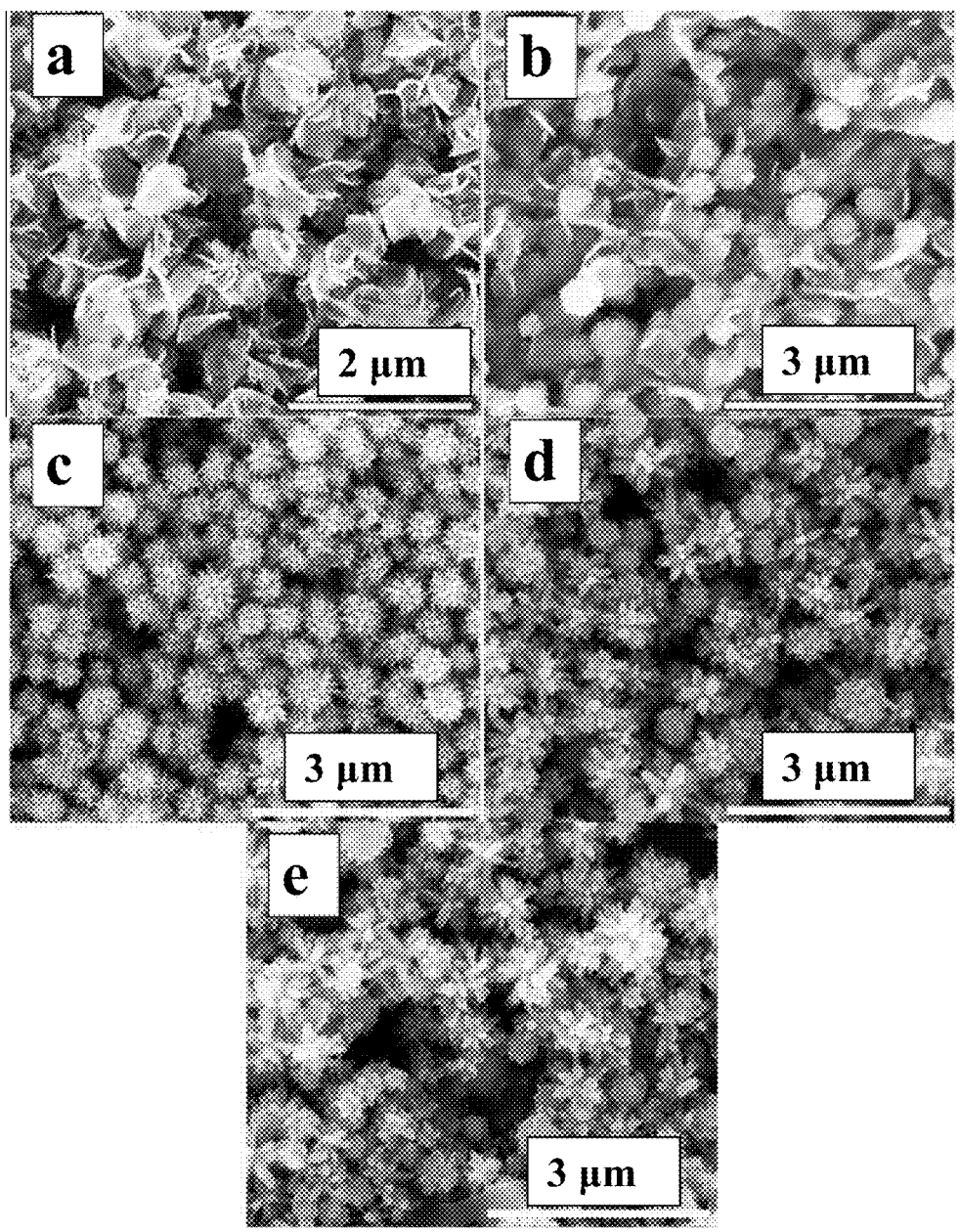

FIGS. 1A-1E show SEM images of the as-prepared FeSe$_2$ NPs for different amounts of DT in Solution A, namely FIG. 1A shows 0.1 mL, FIG. 1B shows 0.6 mL, FIG. 1C shows 1.0 mL, FIG. 1D shows 2.0 mL, and FIG. 1E shows 4.0 mL. The total volume for the solutions is fixed at about 6 mL and volumetric amounts of DT are provided in Table 3.

TABLE 3

| Amount (mL) | Volume % |
| --- | --- |
| 0.1 | 1.7 |
| 0.6 | 10 |
| 1 | 16.7 |
| 2 | 33.3 |
| 4 | 66.1 |

When the amount of DT used is relatively low, that is, 0.1 mL in Solution A, FeSe$_2$ nanosheets are formed (FIG. 1A). When the amount of DT increases, the formation of FeSe$_2$ NPs with more complex structures is observed (FIG. 1B). When the amount of DT is increased to 1 mL in Solution A, mesoscale hedgehog particles approximately 550 nm in diameter are produced. Besides the analogy with microscale hedgehog particles based on ZnO nanowires reported earlier, they are analogous with a variety of star-like particles, with exception that the aspect ratio of the needles or spikes is greater. They reveal notable size-uniformity (approximately 10%) (FIG. 1C) that is indicative of self-limitation mechanism of their formation.

Figure 1F:
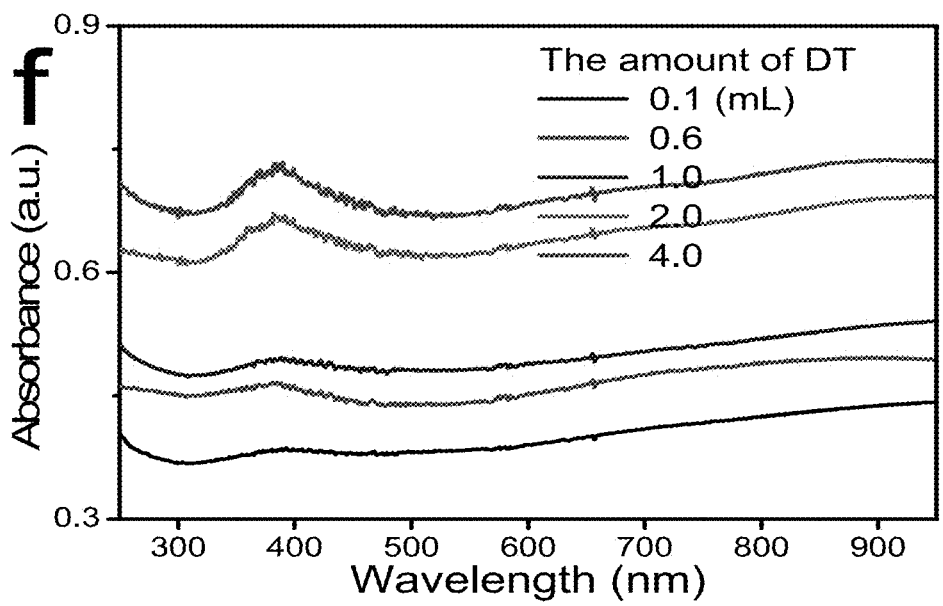
Figures 2A, 2B, 2C:
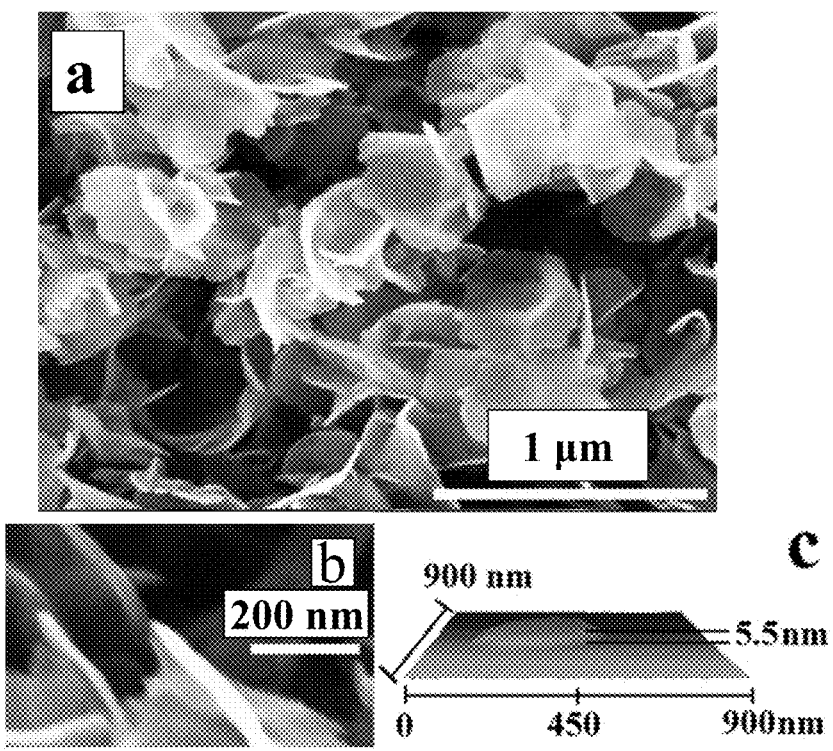

Mesoscale hedgehogs exhibit absorption and scattering in a wide spectral region ranging from visible to near-infrared (FIG. 1F) that is similar to extinction spectra of microscale hedgehogs, and do not have observable fluorescence at room temperature. Note that fluorescence in FeSe$_x$ nanostructures can be obtained in compact phase-pure NPs of nearly spherical shape. Hedgehog geometry of the metal chalcogenide nanostructures leads to remarkably new phenomena in light scattering and catalysis. In catalysis, the hedgehog-shaped particles resist agglomeration and can be used as catalysts in both organic and aqueous media. In light scattering, the hedgehog geometry of the particles results in the formation of new sharp bands in infrared region from about 600 nm to about 6000 nm.

Exploring further the reaction parameter space, in certain variations and for certain conditions, optimal amounts of DT and OLA for formation of nanosheets are 0.1 and 2 mL. The optimal amounts of DT and OLA for formation of mesoscale hedgehogs are 1 mL and 2 mL, respectively (see, FIGS. 12A-12D, 13, 14A-14C, 15A-15C, and 16A-16D). The temperature used is about 130° C. to about 200° C. The high temperature stability of complex assemblies is notable. It can be contrasted with the fragility of the protein complexes or star-like polymer assemblies at high temperature.

Figures 3A, 3B, 3C:
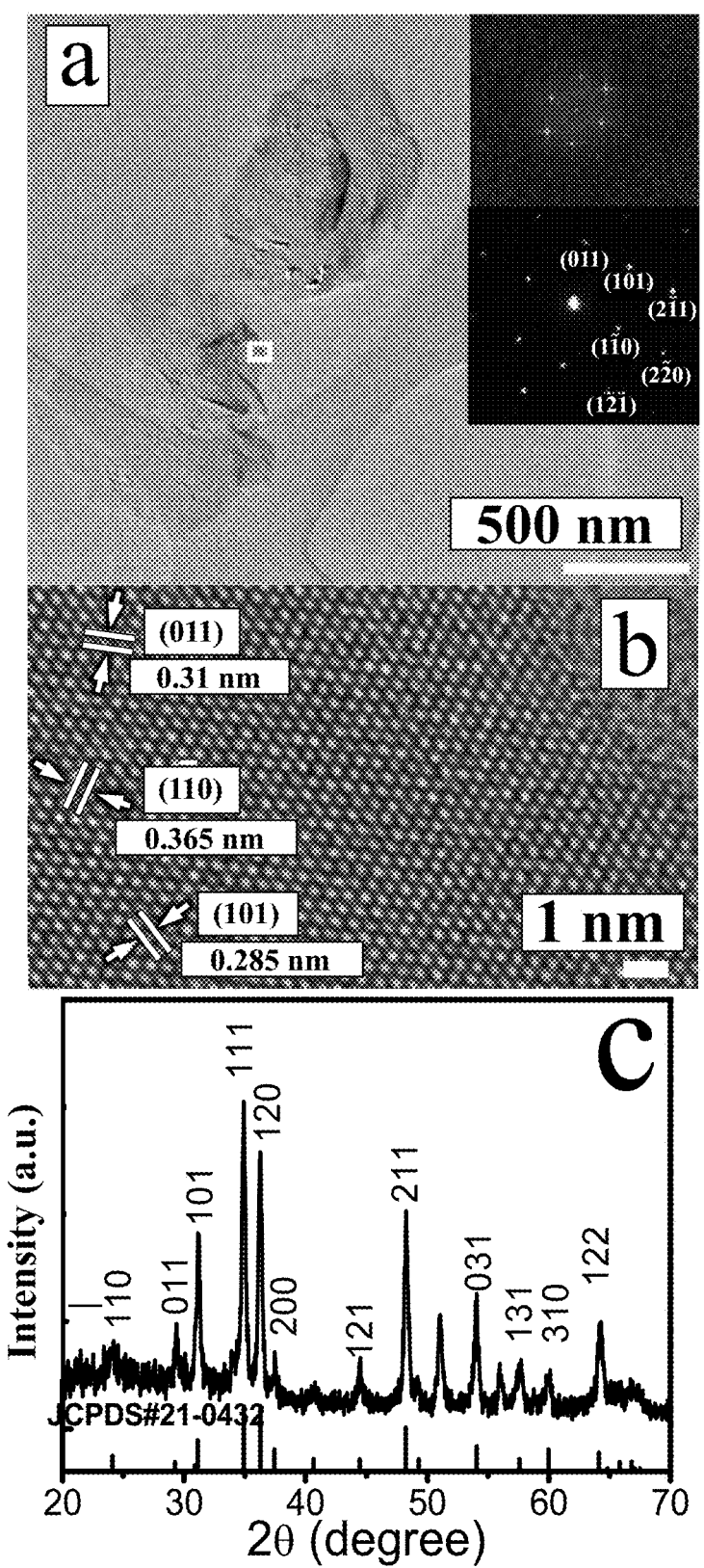
Figures 4A, 4B, 4C, 4D, 4E, 4F:
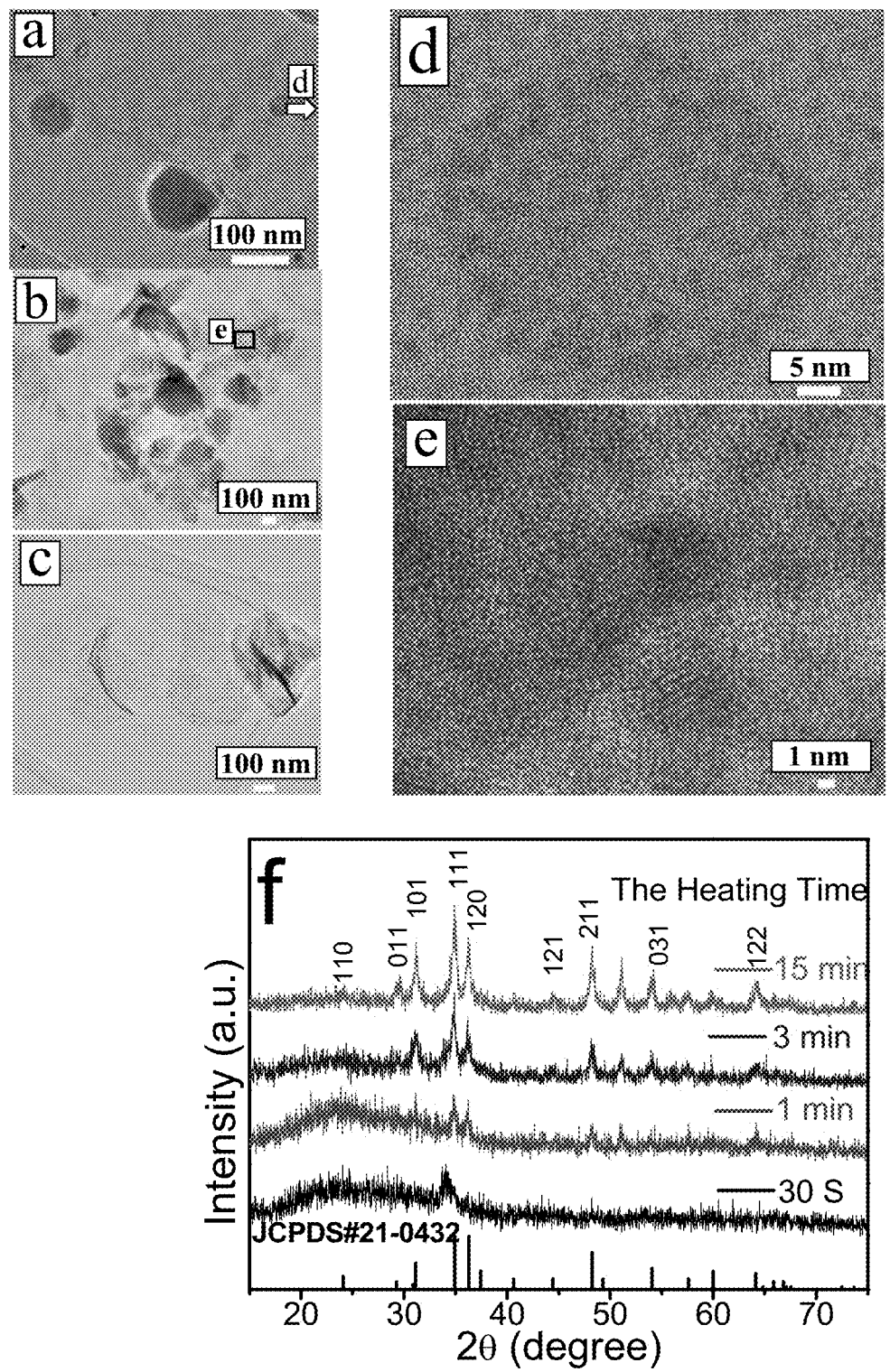
Figure 17A:
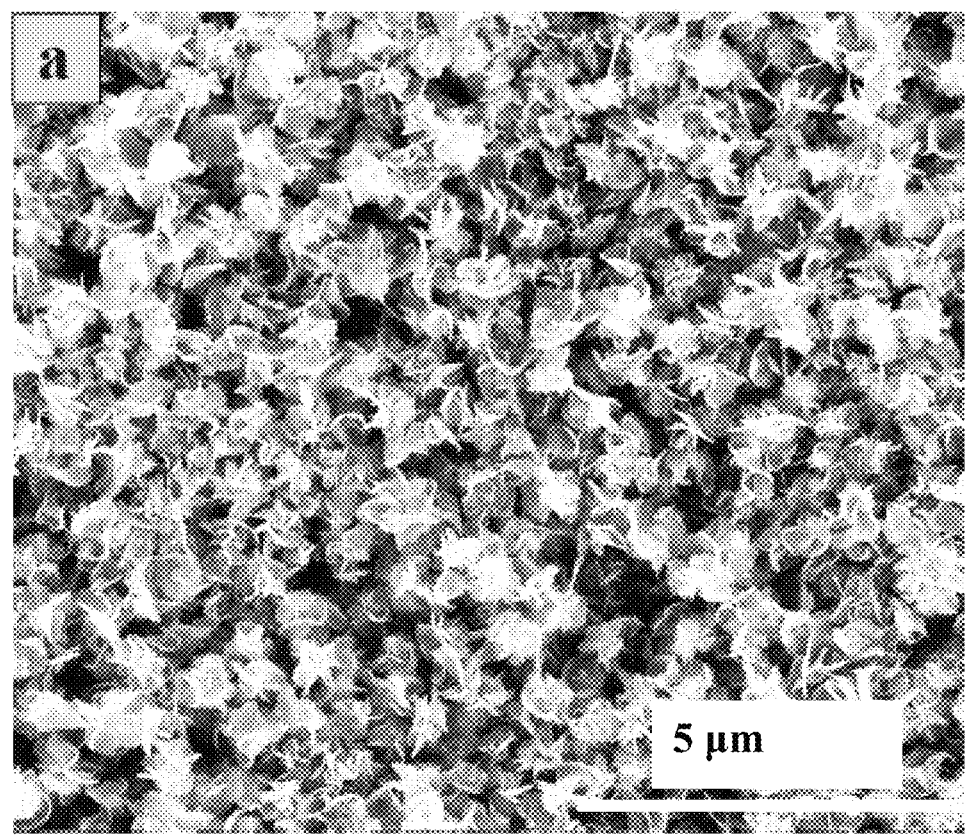
Figure 17B:
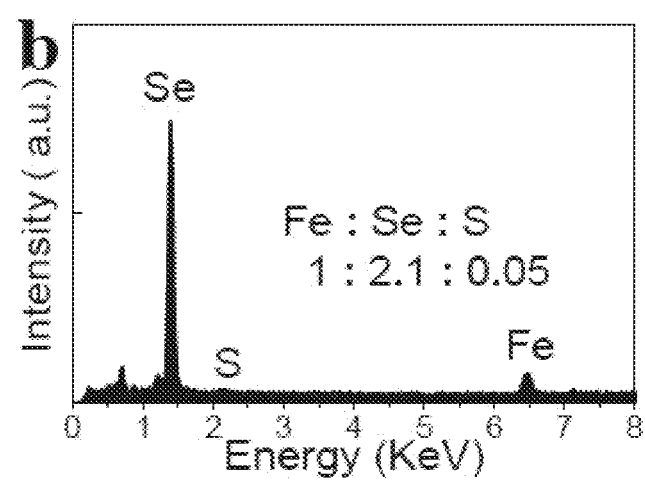
Figures 18A, 18B, 18C:
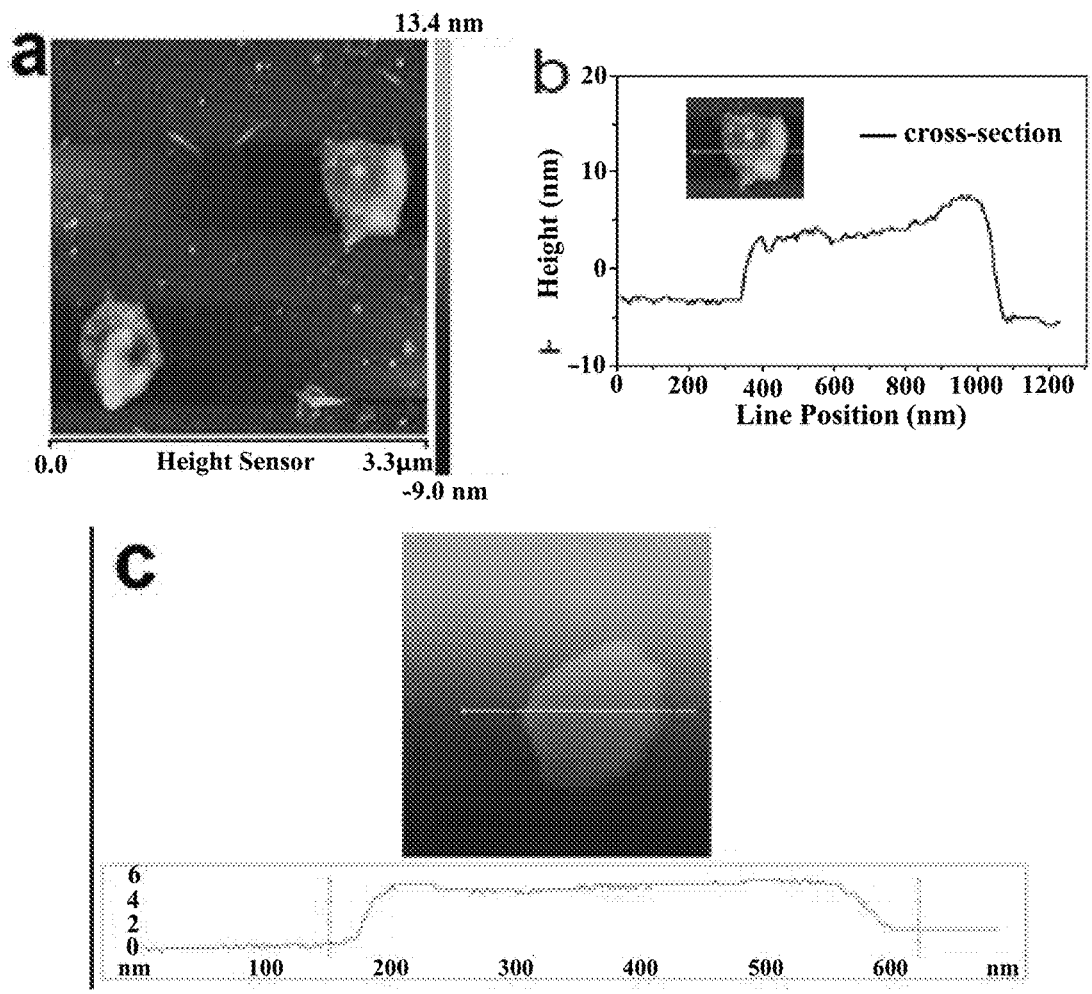
Figure 19:
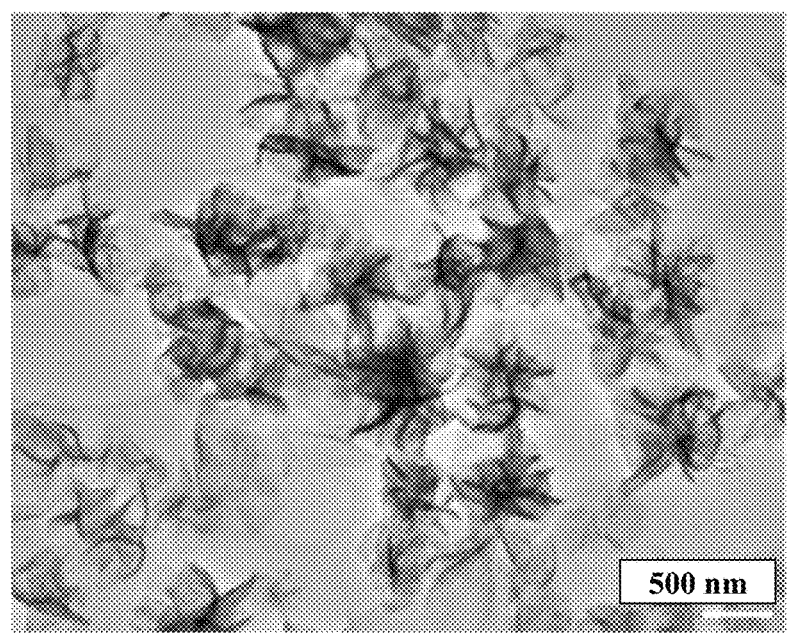
Figures 20A, 20B, 20C:
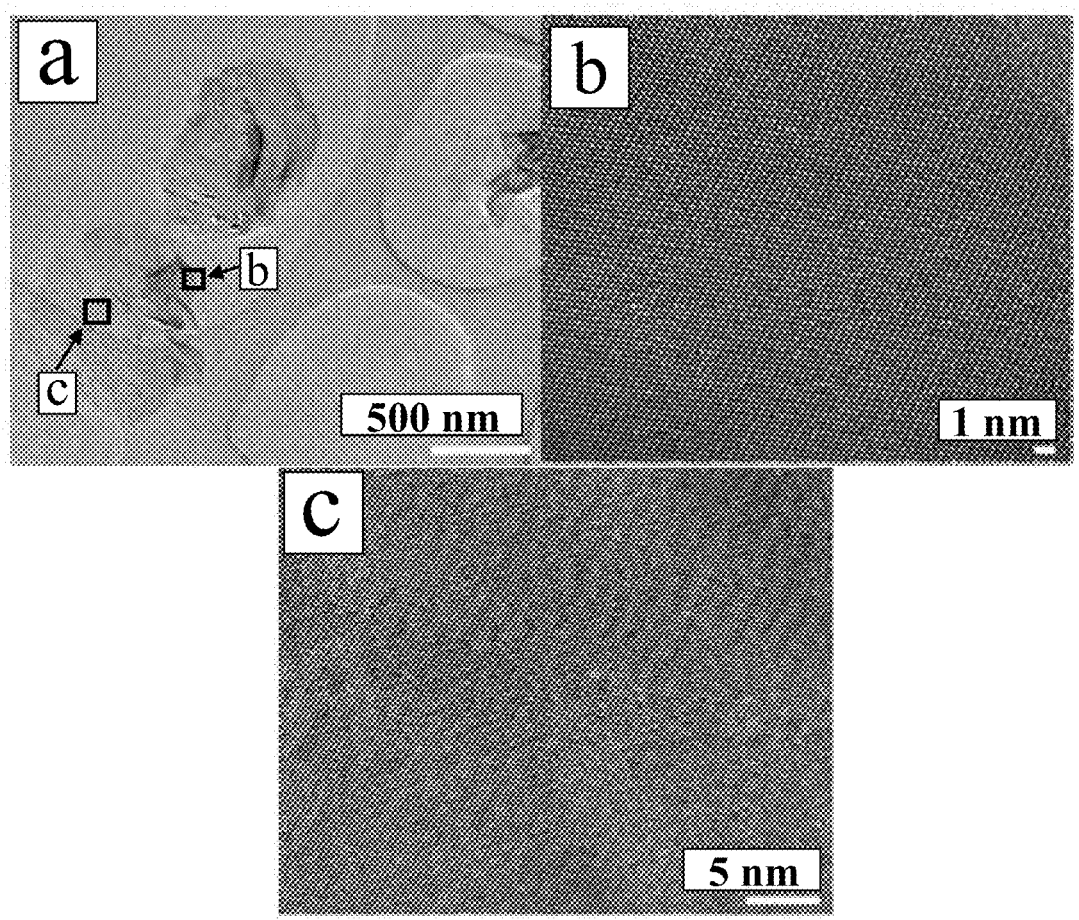
Figures 21A, 21B:
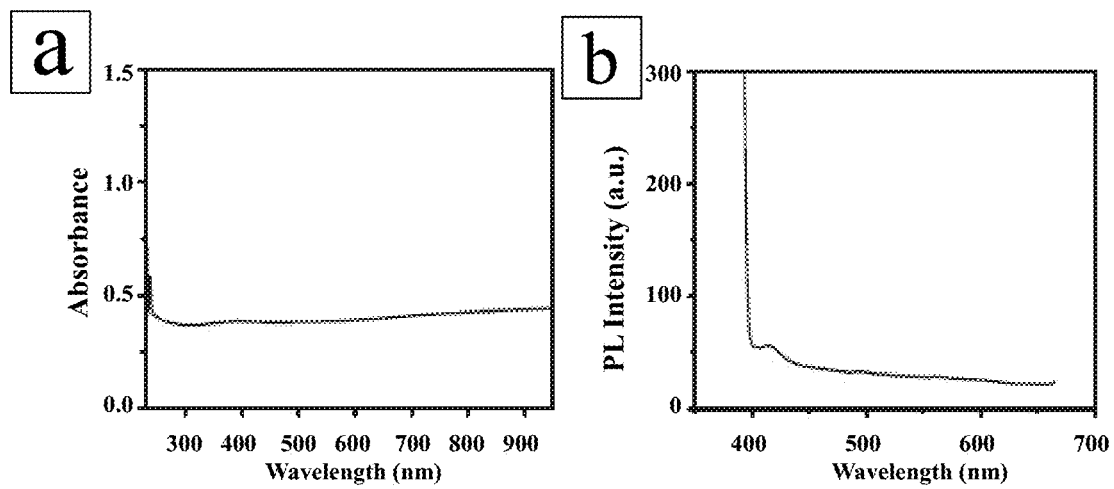

Self-Assembly of Primary FeSe$_2$ NP into Nanosheets: The atomic ratio of metal-to-chalcogen in a perfect lattice of FeSe$_2$ is 1:2 while that in CdSe or CdTe NPs is 1:1, which results in the sparser coating of the NP surface with OLA and DT ligands. Furthermore, DT and OLA surface ligands on NPs are expected to be labile and, given sufficient thermal activation, they are likely to go on and off NP surface. With temperatures (175-200° C.) and within a few minutes of reaction times, the formation of FeSe$_2$ nanosheets is observed that has a lateral size of about 600-1000 nm and thickness of about 5.5 nm (FIGS. 2, 17A and 18A-18C). Some nanosheets are curled that could be observed both in SEM (FIG. 2) and TEM (FIGS. 3, 19) images. The EDX spectrum in FIG. 17B gives the elemental composition of resulting nanosheets as Fe:Se:S=1:2.1:0.05. Note the deviation from FeSe$_2$ stoichiometry here, which appears to be non-accidental and representative of the contribution of both the core and surface ligands to the chalcogenide lattice of these nanostructures. The attribution of FeSe$_2$ cumulative chemical formula to these nanostructures, therefore needs to be taken as approximation of the atomic variability and complexity of these nanomaterials. Nevertheless, the resulting nanosheets are monocrystalline (FIGS. 3 and 20A-20C) with atomic packing corresponding to orthorhombic phase of $FeSe_2$ (JCPDS No. 21-0432). Based on the observed electron diffraction patterns, the vector of the incident electron beam is aligned with [11-1] axis in $FeSe_2$ lattice. Hence, the three preferential growth directions are the (011), (101) and (1-10) planes $FeSe_2$ nanosheets (FIGS. 4C, 4E, 4F). As expected, the nanosheets reveal broadband extinction spectrum with no discernible fluorescence (FIGS. 21A-21B).

Figures 22A, 22B:
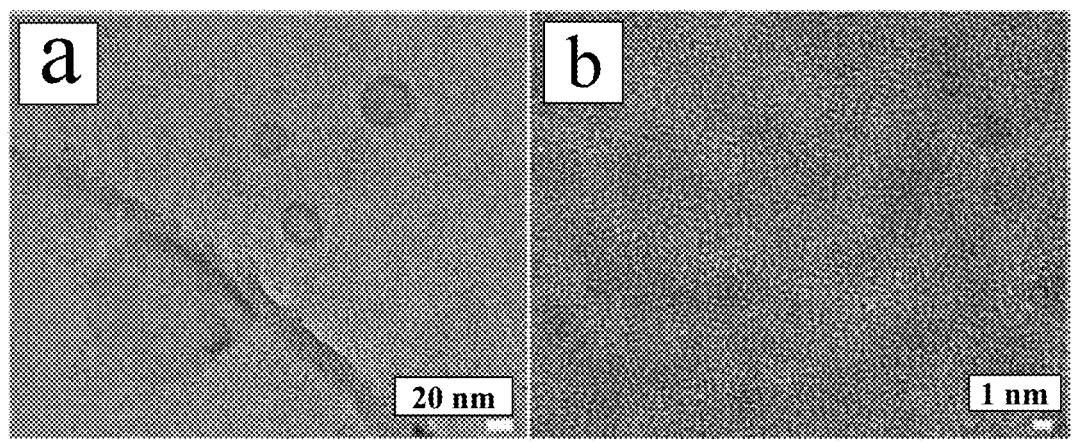
Figures 23A, 23B:
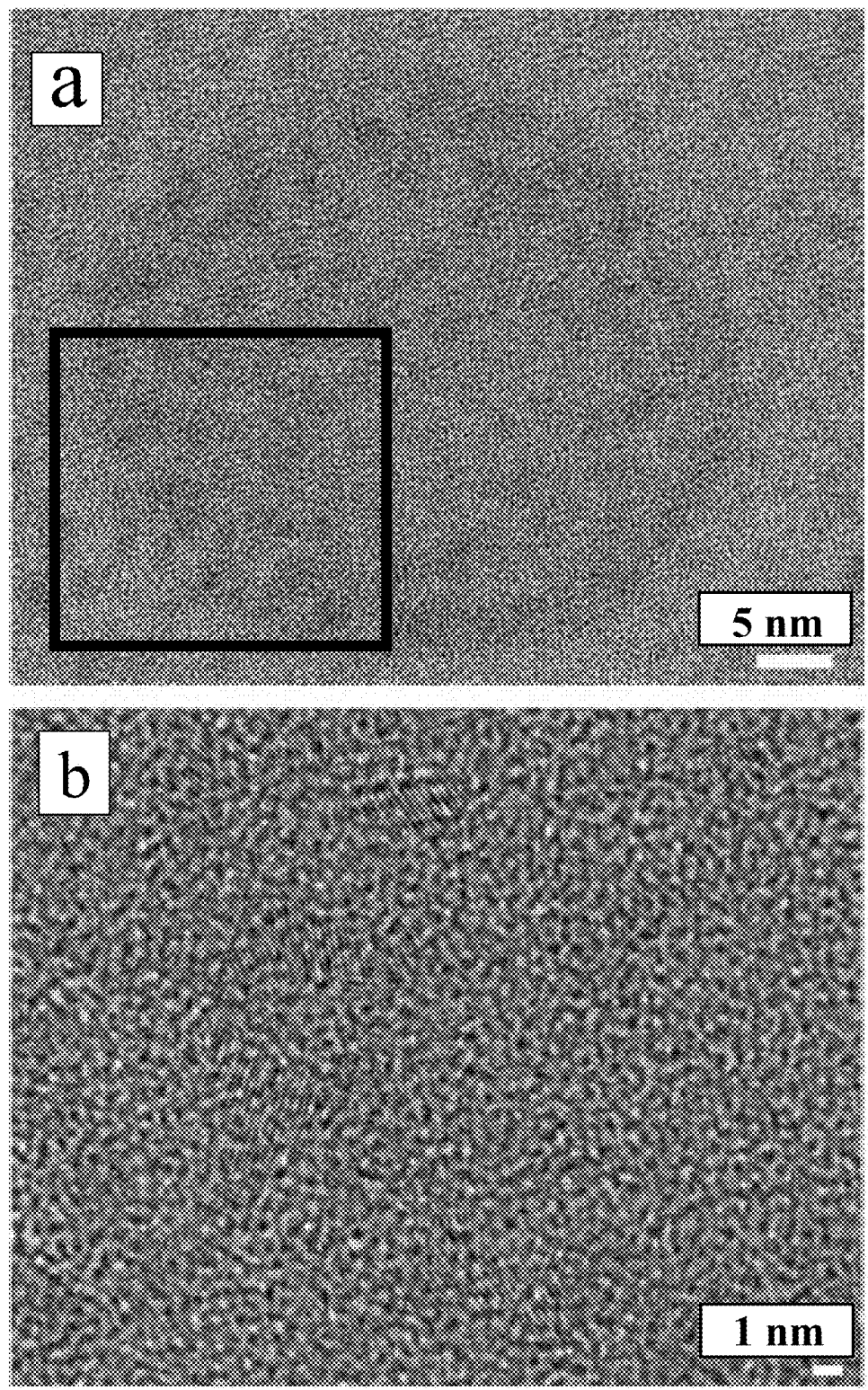
Figures 24A, 24B:
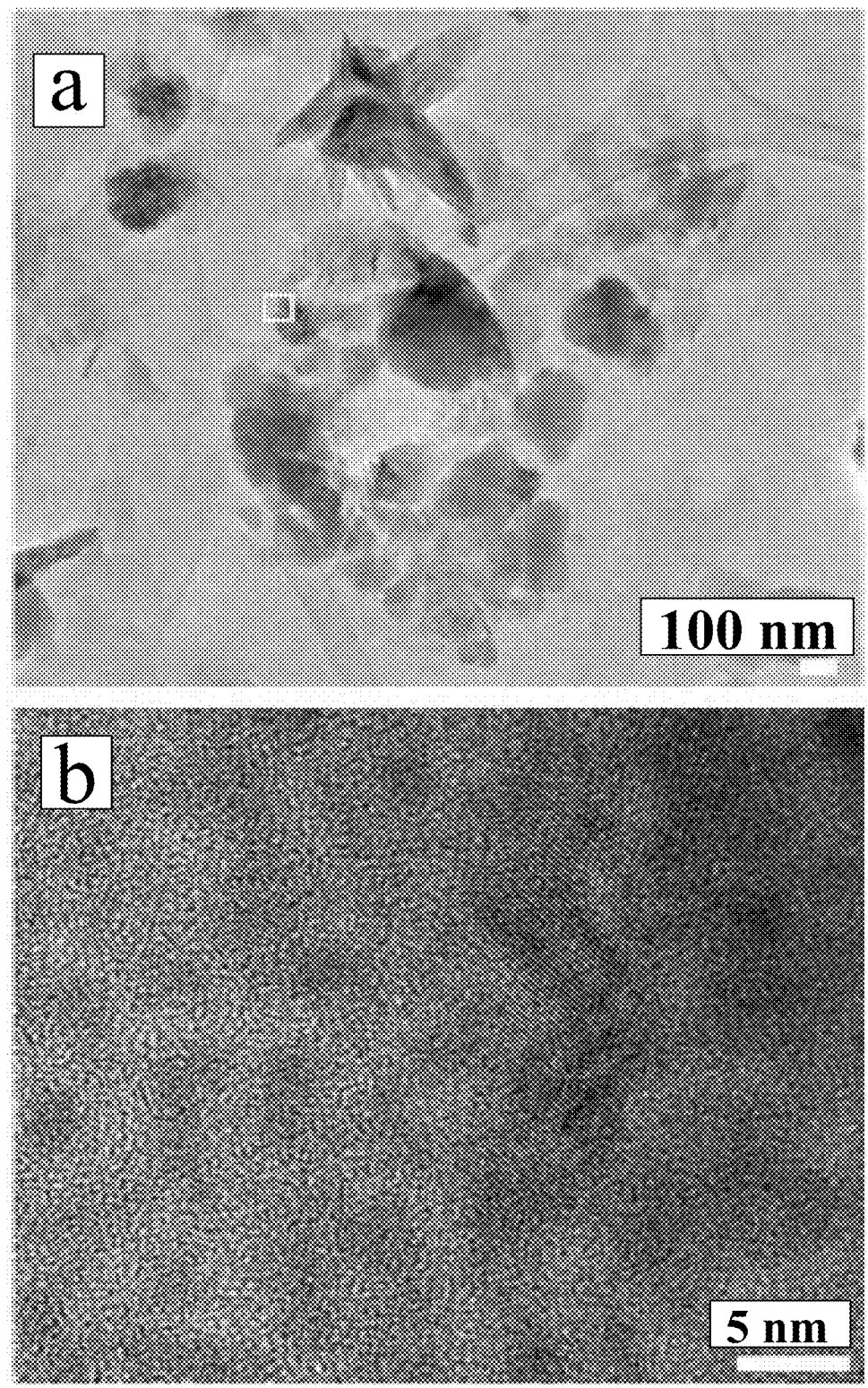
Figures 25A, 25B, 25C, 25D, 25E, 25F:
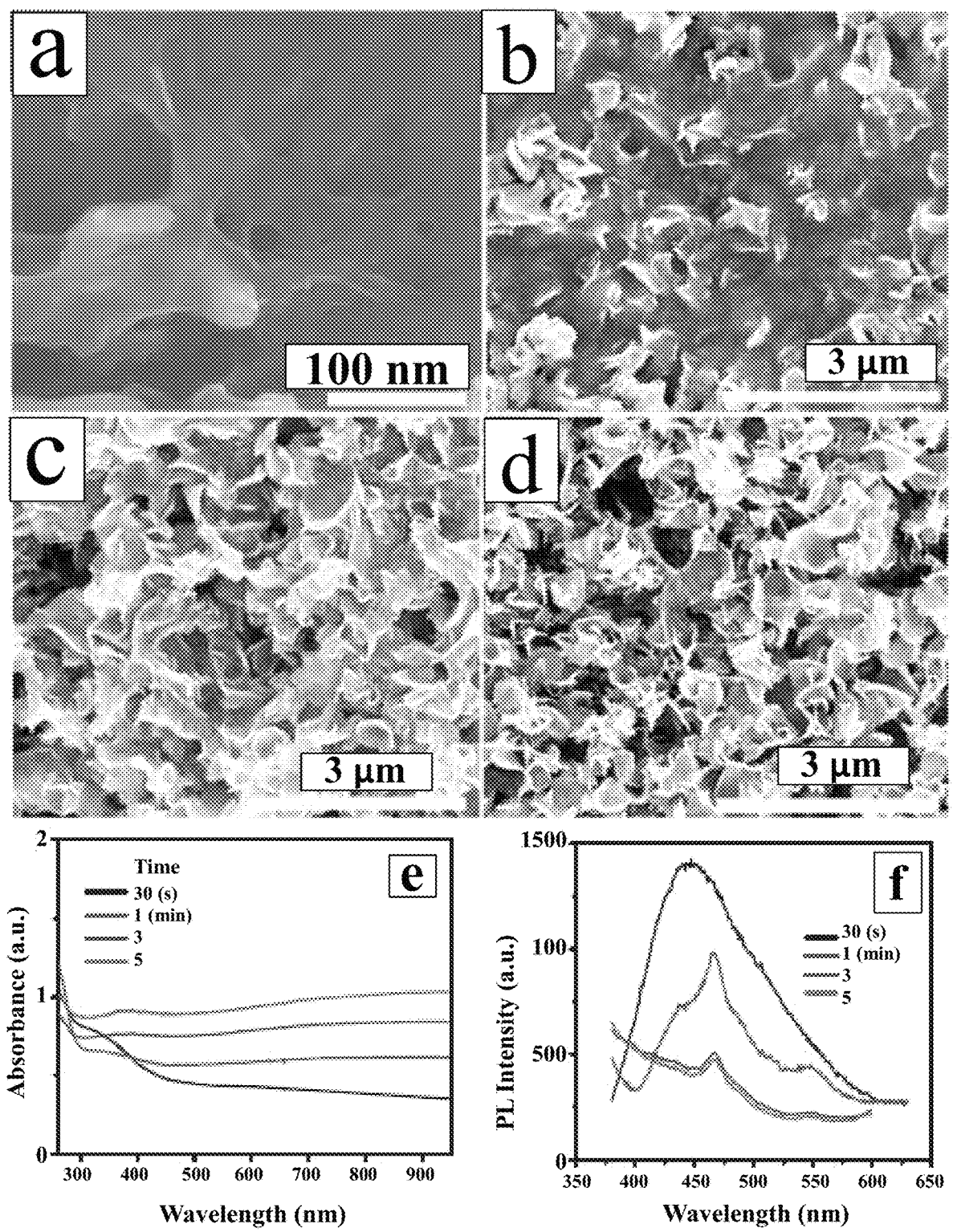

To learn more about the growth mechanism and to identify the primary NPs, the intermediate stages of nanosheet formation are observed as shown in FIG. 22A shows a TEM image and FIG. 22B shows a HR-TEM image of $FeSe_2$ NPs formed at the initial stage of the assembly into nanosheets. FIG. 23A show an HR-TEM image and FIG. 23B shows a higher HR-TEM image of one planar aggregate. FIG. 23B corresponds to the area marked by rectangle in FIG. 23A. FIG. 24A shows a TEM image and FIG. 24B shows a HR-TEM image of an intermediate stage of assembly of $FeSe_2$ nanosheets from primary NPs. FIGS. 25A-25F show SEM images of intermediate stages of $FeSe_2$ NP assembly at 175° C. FIG. 25A shows 0.5 minutes, FIG. 25B shows 1 minute, FIG. 25C shows 3 minutes, and FIG. 25D shows 5 minutes, in which the volumes of DT and OLA used in 'solution A' are set to 0.1 mL and 2 mL, respectively. FIGS. 25E and 25F show absorption and photoluminescence spectra (PL) of the $FeSe_2$ nanostructures for different reaction times. Note gradual quenching and red-shift of the broad emission band at approximately 440 nm as the assembly proceeds, which correspond to larger nanostructures with greater delocalization of the excitons. The broad-band emission band matches with spectral position of the absorption peak at approximately 400 nm.

The growth pattern presented in FIGS. 4A-4E is similar to that of previous $FeSe_2$ nanosheets formed in DMSO. At the earliest time point after the injection of Se precursor (30 s), the primary NPs are formed. They are small and rapidly assemble into planar aggregates approximately 30-100 nm (FIG. 4A). The approximate lateral size the primary NPs is about 2-4 nm based on the individual crystallites seen soon after injection of the Se precursor and the dimensions of crystalline domains in the early nanosheets (FIGS. 4A-4F). At the latter stages, the planar agglomerates become larger in lateral dimensions reaching approximately 150-300 nm in diameter (FIG. 4B) but not in thickness. Based on AFM images, the thickness of the nanosheets is approximately 5.5 nm throughout the assembly process indicating preferential edge-to-edge attachment of the platelet-like NPs. Because AFM height measurements also include the surface ligands, this thickness is consistent with the dimensions of single primary NPs and particle-by-particle assembly.

Figures 5A, 5B:
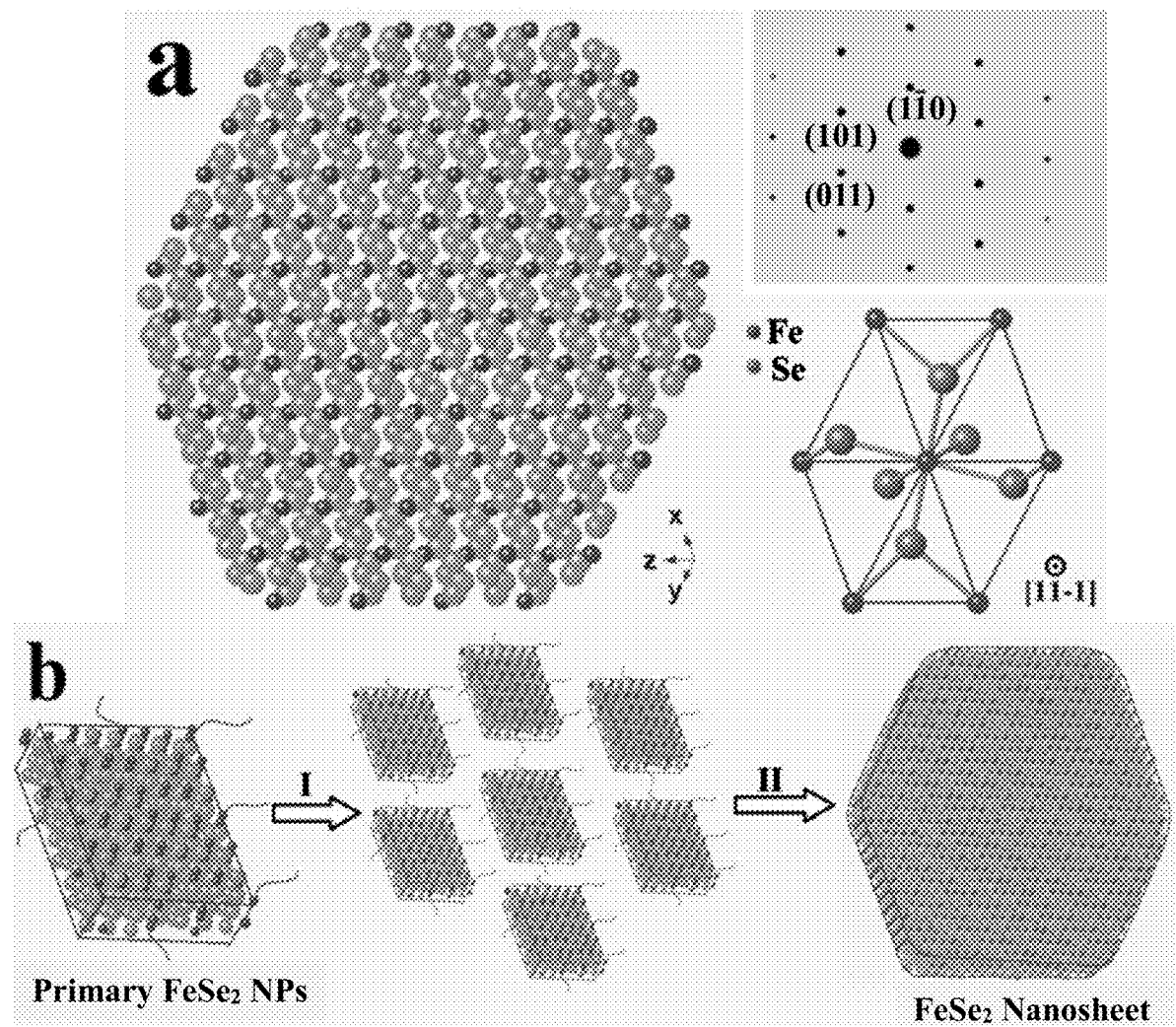

Cumulatively, the schematics of the assembly of primary NPs into nanosheets are given in FIGS. 5A-5B. The nanoparticles have an average diameter of from 0.3 nm to 100 nm and due to anisotropy of interparticle interactions, spontaneously self-assemble into these structures driven by the inter-nanoparticle forces. Initially, a supraparticle core is formed. Subsequently, the core reorganizes and starts attracting more nanoparticles that self-assemble into the spiky superstructure due to self-limited (frustrated) nature of the nanoscale assemblies, exemplified by the core and the spikes, as well as the entire supraparticles.

The atomic model of single-crystal orthorhombic $FeSe_2$ layer has [11-1] axis normal to the nanosheet and nanoplate surface (FIG. 5A), which is consistent with the data in FIG. 3. The coalescence of primary NPs occurs via the fusion of the (011), (101) and/or (1-10) facets. One cannot expect that the primary NPs have perfect geometrical match to each other or very uniform in lateral size. Considering the monocrystallinity of the resulting sheets, there must be some atomic-scale reorganization at the edges of the NPs as they self-assemble, which is an essential difference with the current understanding of oriented attachment of NPs.

Figures 6A, 6B, 6C, 6D, 6E, 6F:
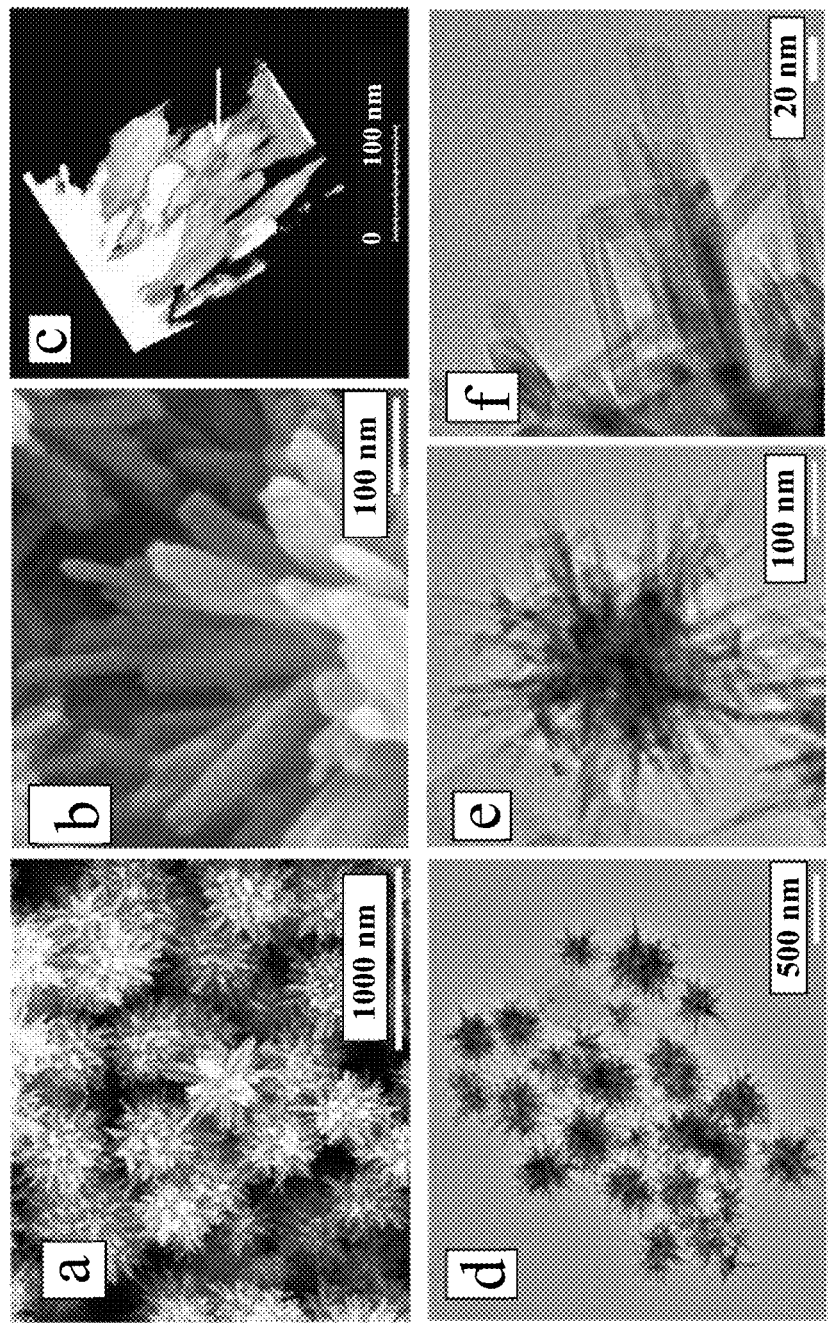
Figure 26A:
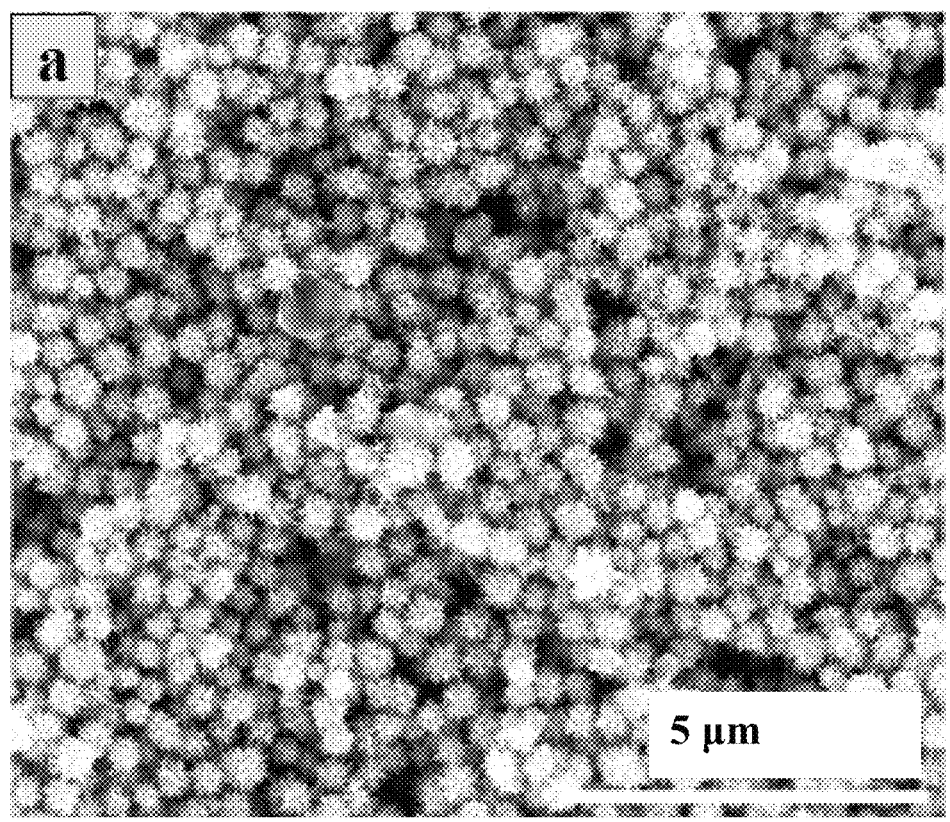
Figure 26B:
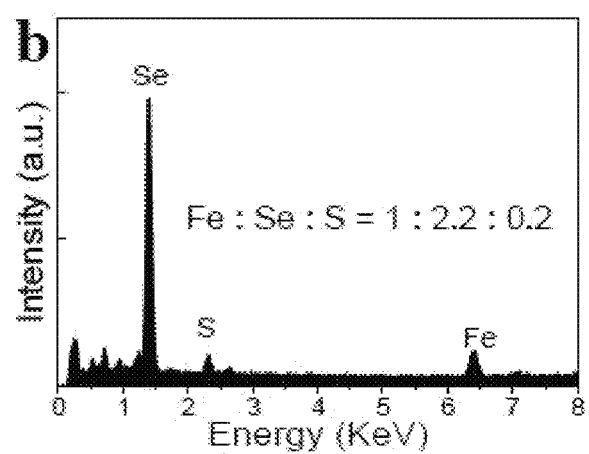
Figure 27:
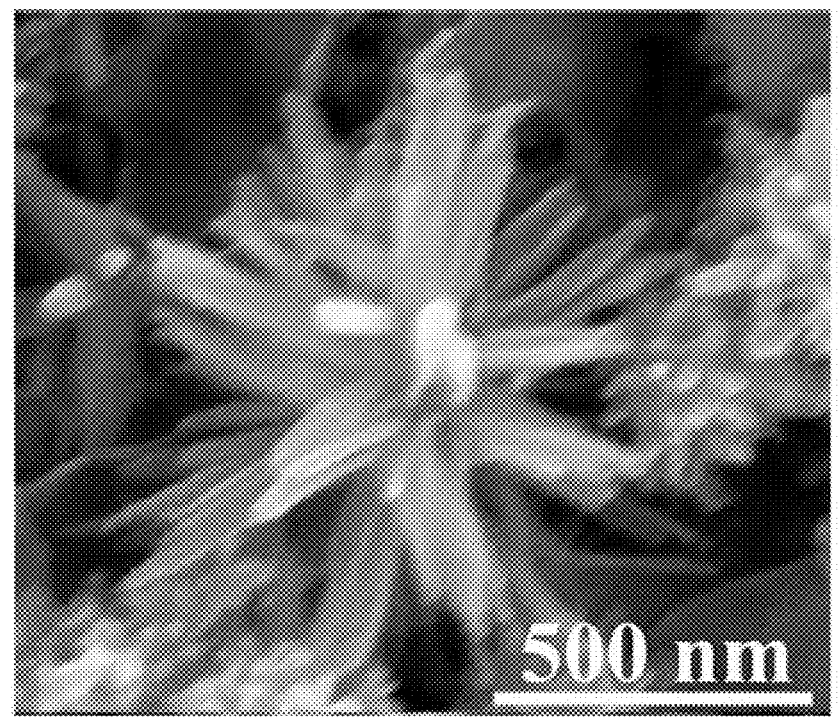
FIG. 27 is a close-up SEM image of a FeSe$_2$ hedgehog particle enabling unambiguous visualization of the nanoscrolls producing the spikes.
Figures 28A, 28B:
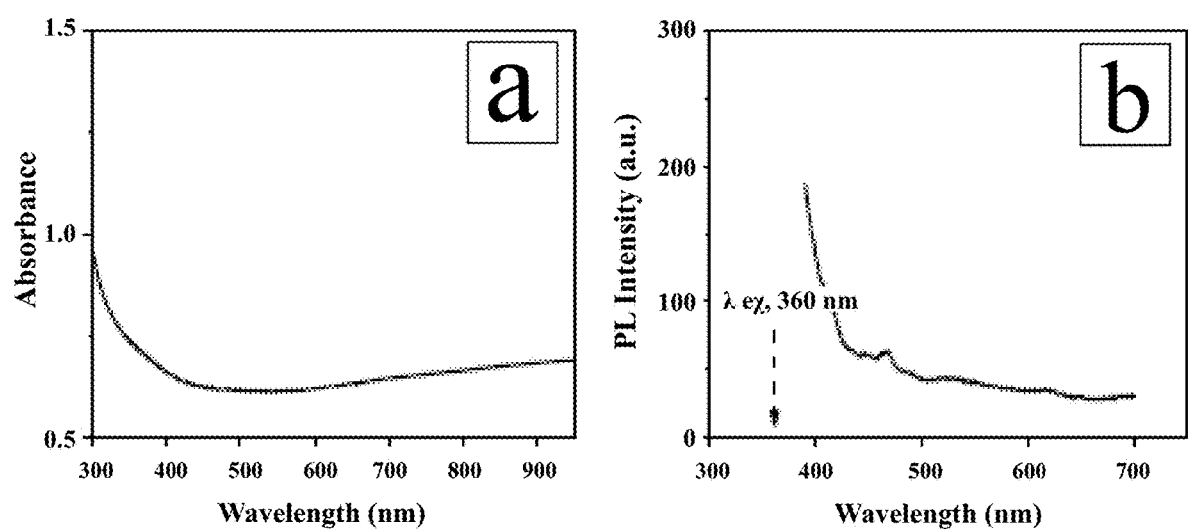
FIGS. 28A-28B show absorption and photoluminescence spectra of the FeSe$_2$ mesoscale hedgehog particles, respectively.

Self-Assembly of $FeSe_2$ Mesoscale Hedgehog Particles. The surface ligands are known to adsorb selectively on specific faces of NPs leading to anisotropy of van der Waals, hydrophobic, and electrostatic (charge-charge, dipole-dipole, and ion-dipole) interactions. Even minor anisotropy of these interactions is known to lead to complex nanoscale structures from NPs. As shown in FIGS. 6 and 26A-26B, the $FeSe_2$ hedgehog particles (about 550 nm in diameter) formed when the amount of DT used in 'solution A' is increased to 1 mL. Each of their branches/rays emanate from a common origin. Unlike previous star-like particles made from solid nanorods, the straight branches are hollow (FIG. 6F). Furthermore, they are scrolled version of the nanosheets presented in FIG. 2. For the larger hedgehogs, the morphology of scrolled $FeSe_2$ sheets could be observed even by SEM (FIG. 27). The dimensions of the nanoscrolls are about 250 nm in length, about 10-15 nm in diameter, and about 2 nm in wall thickness in this example. The EDX spectrum in FIG. 26B reveals the elemental composition of $FeSe_2$ to be Fe:Se:S=1:2.2:0.2, which is similar to that of nanosheets with exception of increased atomic percentage of sulfur which is associated with greater density of DT surface ligand on the surface of mesoscale hedgehogs than on nanosheets. Weak broad-band light emission of mesoscale hedgehogs is observed in 400-500 spectral window (FIGS. 25E-25F and 28A-28B).

Figures 7A, 7B, 7C:
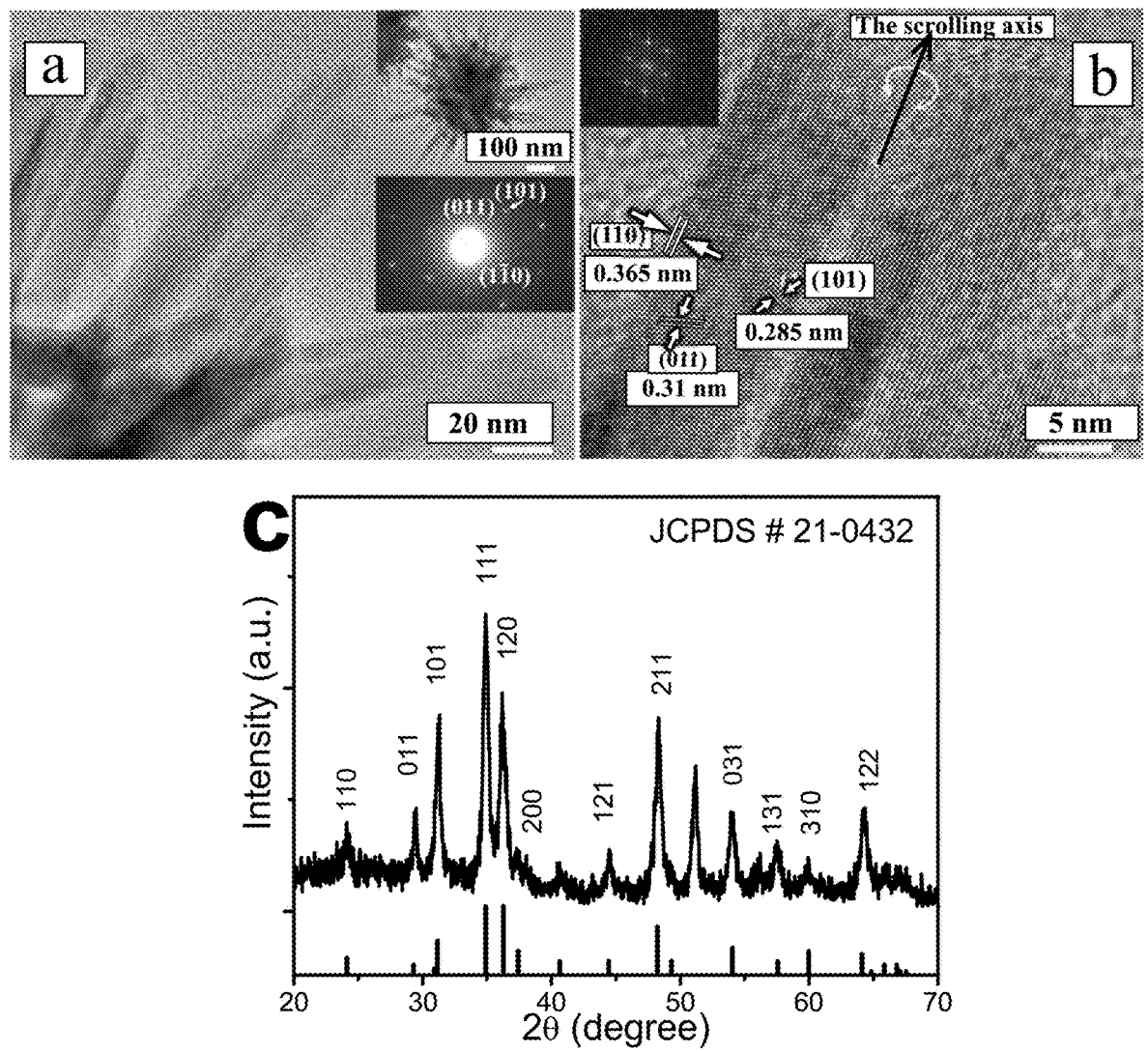

High-resolution TEM in FIGS. 7A-7C confirms single-crystal structure of constituent $FeSe_2$ nanoscrolls. Three sets of orderly aligned lattice fringes are observed, corresponding to the (110), (011), and (101) lattice planes of orthorhombic $FeSe_2$, which suggests that the nanoscrolls are rolled up along the axis that is perpendicular to 111-11 and parallel to (1-10). The powder XRD pattern in FIG. 7C also verifies the orthorhombic phase of $FeSe_2$.

To better understand how the transition from sheets to nanoscrolls and, then, to mesoscale hedgehogs occurs, the intermediate stages of the process are identified. The formation of the mesoscale hedgehog particles occurs within the five minutes at 175° C. To simplify the attribution of the intermediate stages, the reaction is carried out at about 150° C. to slow down the process. The lower temperatures are useful for investigation of the early stages of NP assembly, although higher temperatures are contemplated for more rapid processing in alternative variations. Based on the sequence of microscopy data in FIGS. 8A-8D and 29A-29B, FIGS. 30A-30G, as well as the data in FIGS. 2A-2C, 3A-3C, 4A-4F, the growth process of the $FeSe_2$ hedgehog particles could be divided into five stages: (i) at the earliest time point, small about 2-4 nm $FeSe_2$ NPs are formed (FIGS. 31A-31B); (ii) subsequently, these primary NPs gather into supraparticles forming the cores of the hedgehogs; (iii) next, in the interior of the aggregates, adjacent NPs begin to assemble and fuse with the core; (iv) at the edges of the core the sheets start to grow and roll into the scrolls producing early hedgehogs; and (v) the latter become larger as more primary NPs are integrated to the rolled nanosheets.

Figures 8A, 8B, 8C, 8D, 8E, 8F, 8G, 8H:
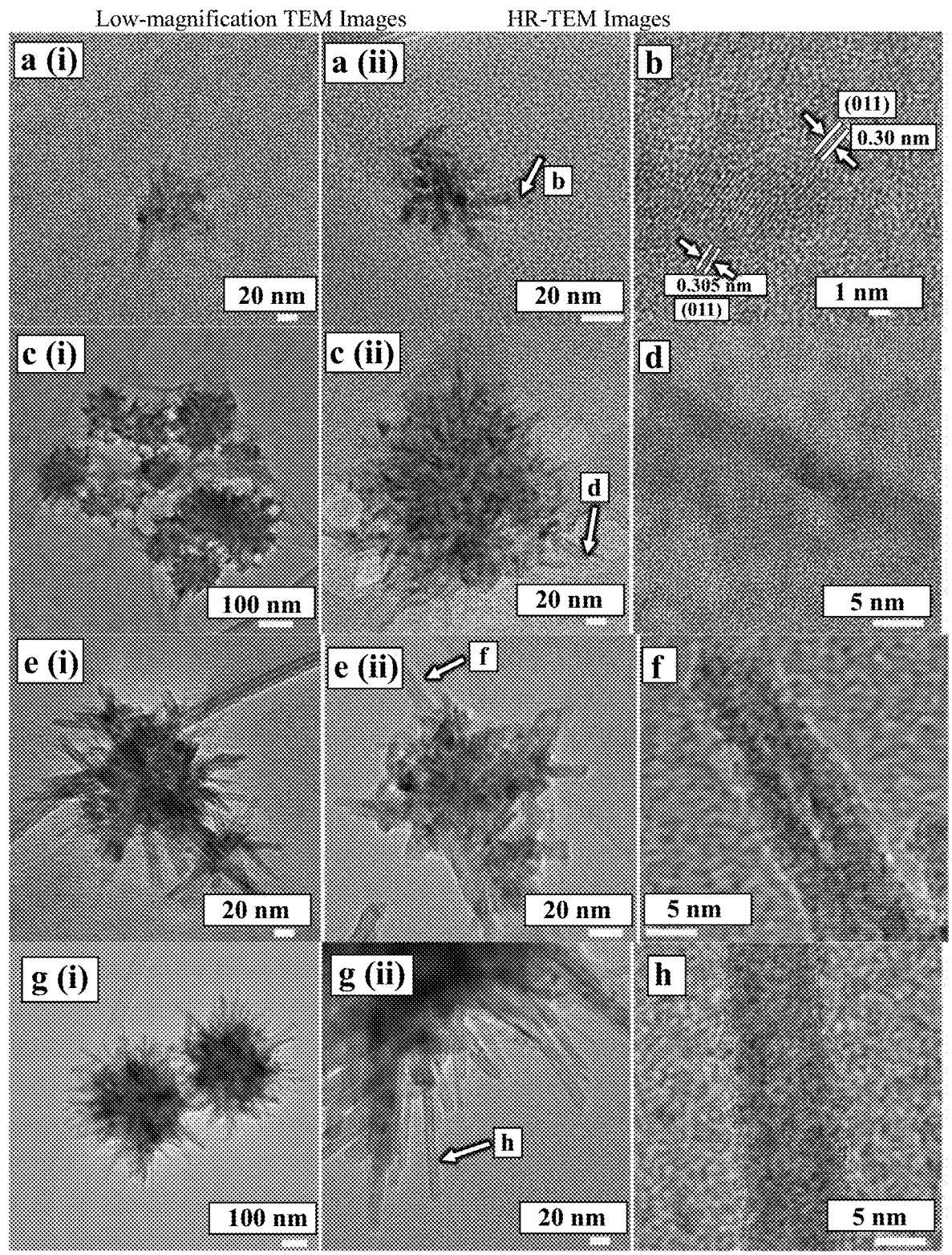
Figure 8I:
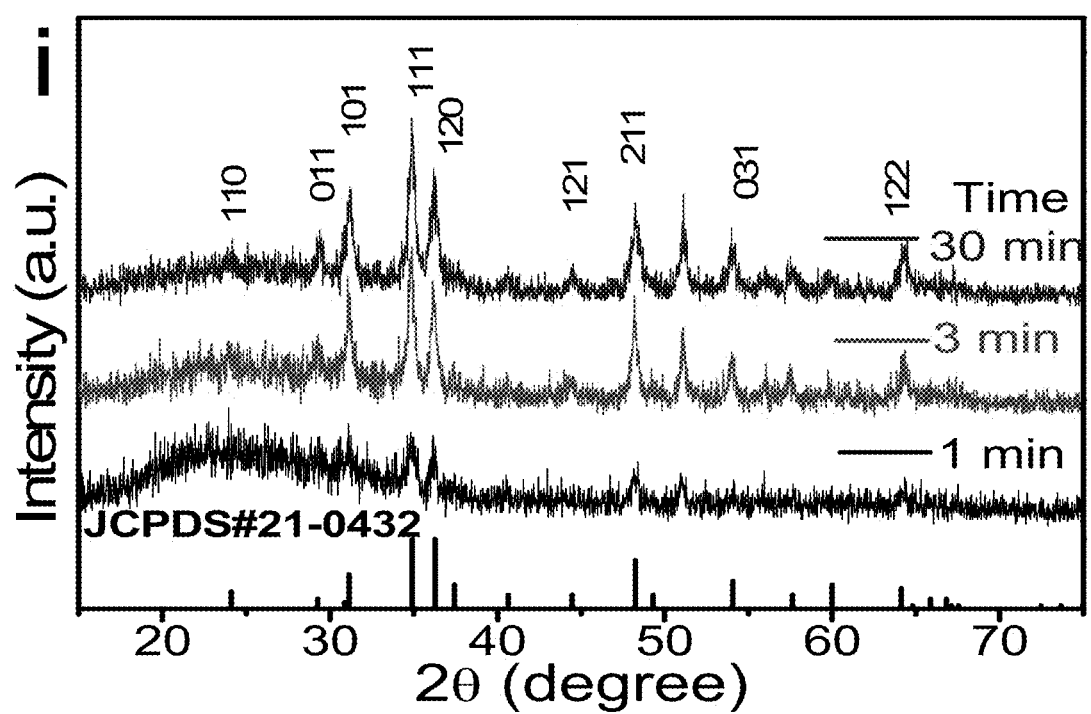
Figures 9A, 9B, 9C, 9D:
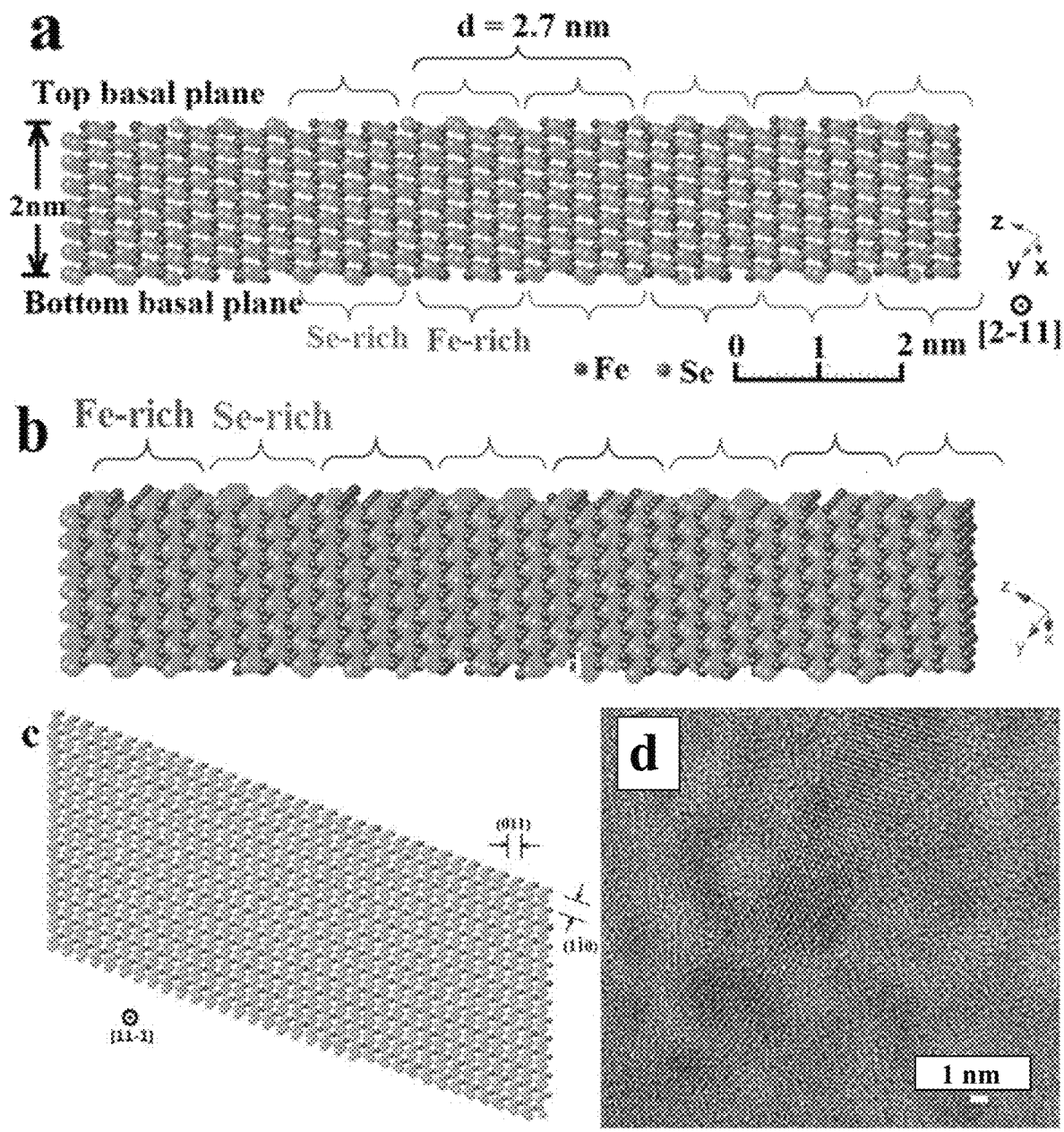

Therefore, the self-assembly of NPs into mesoscale hedgehog particles has stages that are similar to those in the assembly of nanosheets. The wall thickness of nanoscrolls in hedgehogs are approximately 2-3 nm, approximately equal to the size of primary NPs and, thus they can form by edge-to-edge fusion of the primary NPs. The XRD patterns in FIG. 8I also confirm the presence of large monocrystalline domains in the mesoscale hedgehogs.

The mechanism of how and why scrolling occurs versus why complex three-dimensional structures form instead, for instance, random agglomerates, is not fully understood, although not limiting the present disclosure to any particular theories, the speculated root cause is discussed herein. The mesoscale hedgehogs form when the concentration of self-assembly additive DT is increased about tenfold, compared to the concentration for forming nanosheets. Thus, the ligand density on the NPs surface is increased which is affirmed by EDX spectra and the amplitudes of the sulfur peaks in FIGS. 17B and 26B. Higher ligand density on NPs can also be confirmed macroscopically by the formation of a gel upon cooling, whereas for nanosheets preparations, no similar phenomenon is observed with NPs that forms nanosheets (FIG. 32—the photograph appears to show the formation of a gel).

The process of self-organization of NPs to nanosheets is relatively well understood. However, they are not observed to spontaneously roll up in solution, in the absence of external stimuli, for instance capillary forces, or thermal gradient. The increase of DT density on NP surfaces and their spontaneous rolling are believed to likely be related. Given gradient of strain, the thinness of nanosheets can facilitate formation of scrolls. The strain gradient may arise from top/bottom asymmetry of DT distribution on the NPs whose origin is specific to $FeSe_2$ and may not be self-evident (FIGS. 9A-9D).

Figures 10A, 10B, 10C:
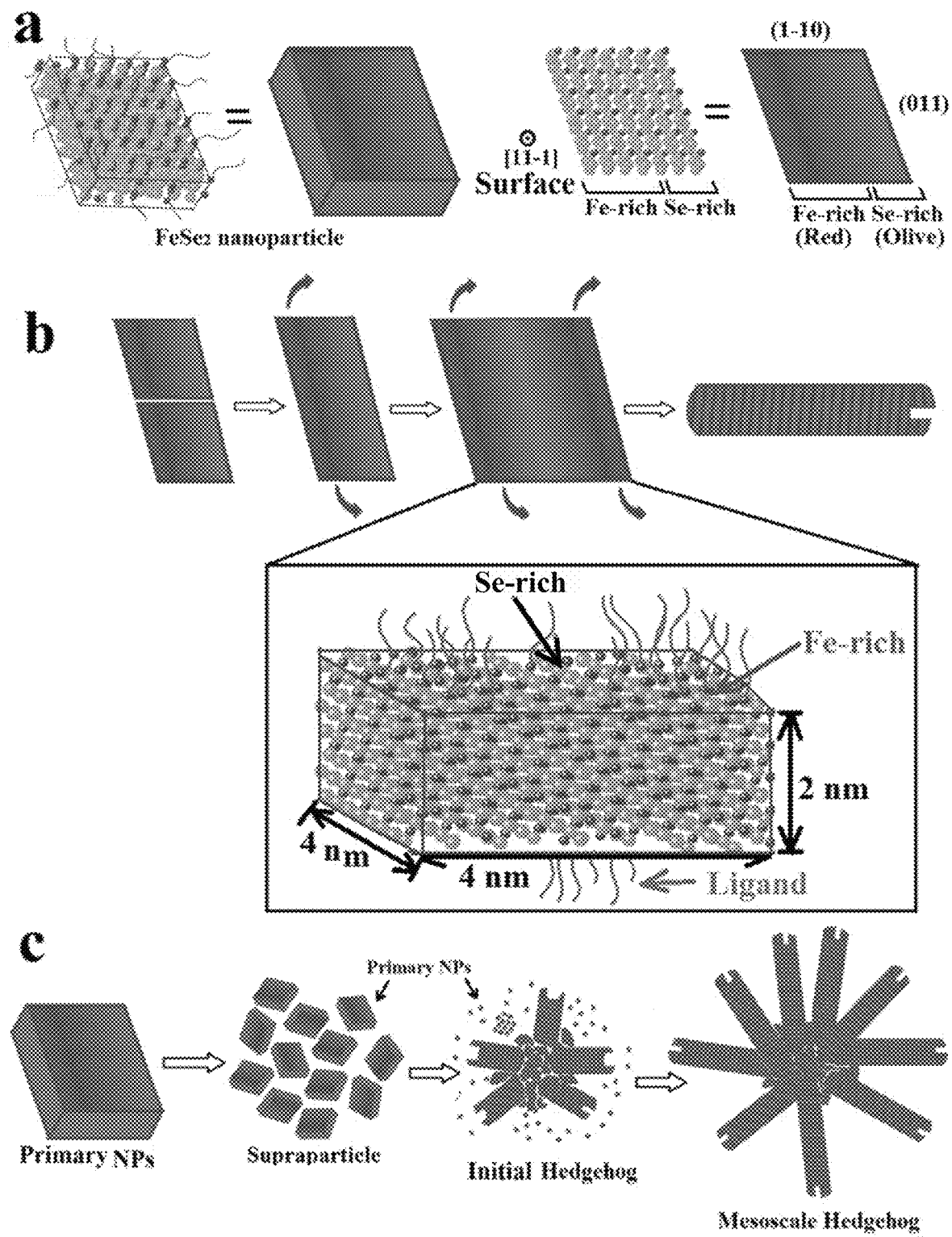

Atomic modeling of the $FeSe_2$ nanosheets with dimensions and facets characteristic for those observed in this example, i.e. length, approximately 250 nm; width, approximately 35 nm; thickness, approximately 2 nm, display asymmetric Se-rich and Fe-rich stripes on both basal planes along the preferential growth direction (FIGS. 9A-9D). The primary $FeSe_2$ NPs have basal planes that cannot accommodate an entire repetitive unit of Se-rich and Fe-rich stripes, since the sizes of the primary NPs (approximately 2 nm) are less than that (approximately 2.7 nm) of the lattice period for this face (FIG. 10A). Furthermore, when such NPs assemble by fusion of their edges, their numbers of Fe-rich stripes remains unequal (FIGS. 10B-10C). These suppositions are supported by the TEM observation in FIGS. 33 and 8B.

Figure 11:
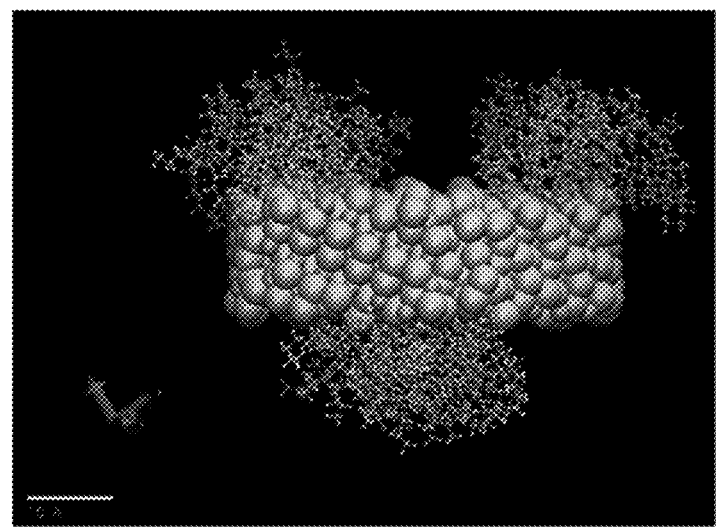
Figures 12A, 12B, 12C, 12D:
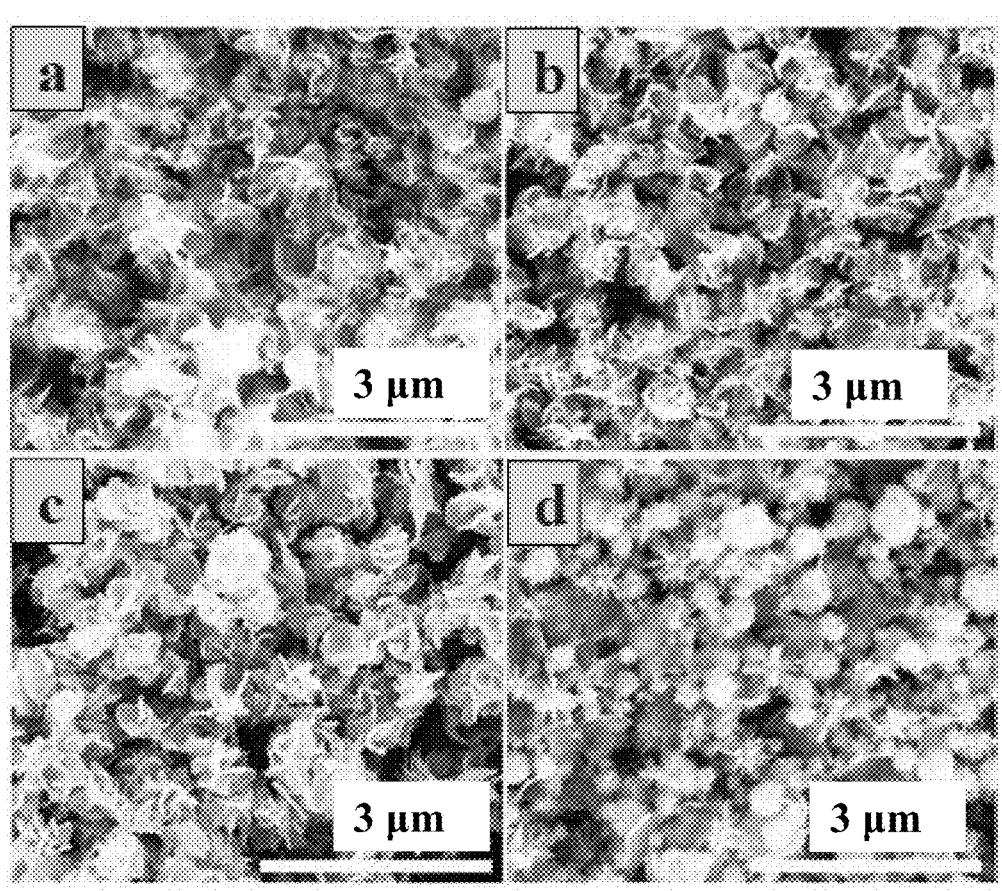
Figure 13:
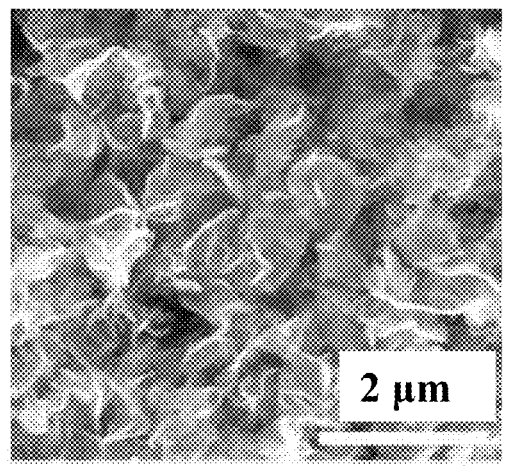
Figures 14A, 14B, 14C:
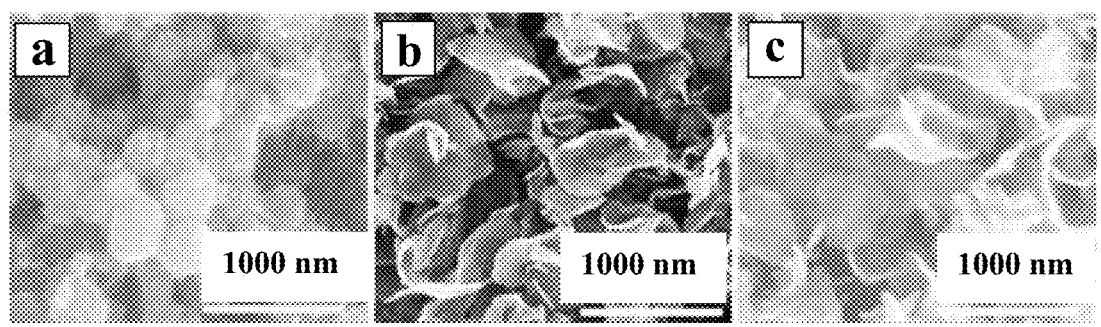
Figures 15A, 15B, 15C:
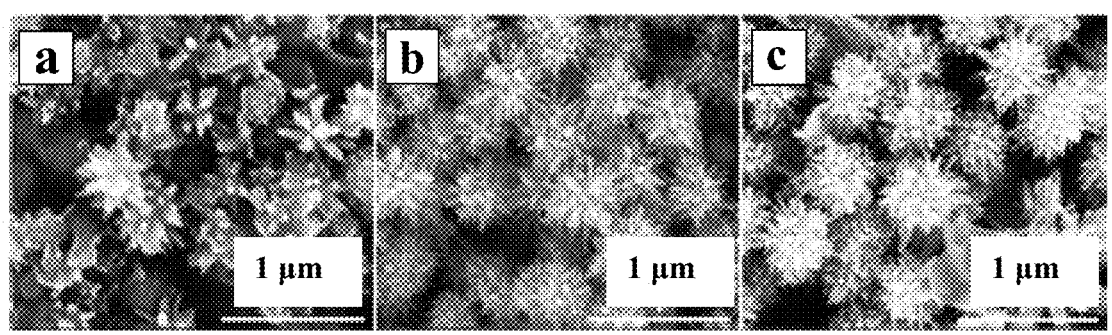
Figures 16A, 16B, 16C, 16D:
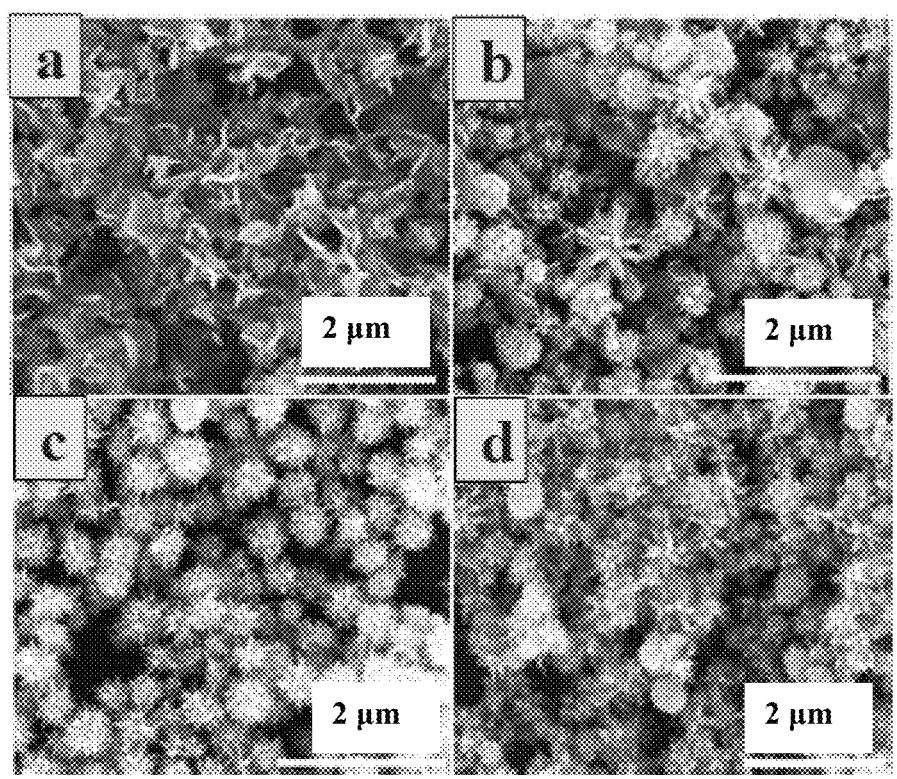

Asymmetry of primary NPs caused by the DT stripes can also be confirmed by atomistic molecular dynamic simulations (FIG. 11). The equilibration of this nanostructure for 20 ns demonstrated that DT ligands produce unequal number of ligand 'clouds' on the top and the bottom basal planes of the primary NPs. This is a unique feature of these primary NPs from orthorhombic $FeSe_2$ related to the limited size of the NPs and its closeness to the periodicity of the exposed plane of $FeSe_2$. Of course, eventually the $FeSe_2$ sheets will be large enough and this anisotropy will disappear as it occurs in nanosheets in FIG. 3A-3C that are flat. If the anisotropy of the primary NPs causes the assembly and lattice fusion in the scrolled configuration, this anisotropy, however, can be kinetically "locked" in a metastable state. It is not an energetically favorable state as would be the flat configuration, but rather a state that is spontaneously produced for this level of thermal energy in the system.

The surface ligand concentration controls the multistage assemblies of primary NPs into nanosheets and further to mesoscale hedgehog particles that can compete in sophistication with biological systems. The spikes of hedgehogs are formed from the scrolled nanosheets that attach to the supraparticle core via one of the ends. The uniformity of mesoscale hedgehogs indicates the self-limitation of their growth. The anisotropy of the primary NPs (about 2-4 nm) is hypothesized to be the key factor for this multistage self-assembly process. The mobility of the edge-atoms of the primary NPs visualized by the atomistic molecular dynamic simulations demonstrate the edge-to edge recrystallization of the primary NPs that can lead to monocrystalline sheets and structurally "locked" thermodynamically metastable structures.

Example 2

The following example studies gold chalcogenides, namely gold thiolates. An affinity between gold and thiols results in a rich chemistry of sulfur-gold bond (S—Au) and leads to hybrid materials. Thiol groups can directly reduce Au(III) to Au(I) without any need for strong reducing reagents, thus forming the homologues of gold-thiolates. Aggregations of polymeric Au-thiolates are suggested to have a lamellar structure, in which each layer has an inorganic gold sulfide (AuS) slab in the center and organic thiol residues arranged on both sides (FIG. 34A). Mixing thiol-containing chiral amino acids with metal ions can possibly break the symmetry in geometry and transfer their chiroptical properties to metal thiolates. Cysteine (Cys), a thiol-group containing amino acid, reacts with gold so strongly that gold circulates in the bloodstream bound to Cys-34 in the protein albumin. Therefore, in this example, nanostructures are prepared by adding Cys to a mixture solution of gold hydrochloride ($HAuCl_4$) and hexadecyltrimethylammonium bromide (CTAB). After purification, the product contains gold, sulfur, nitrogen, carbon and oxygen from x-ray photoelectron spectroscopy (XPS) (FIG. 34B). The atomic concentrations from XPS show equal stoichiometry between gold and Cys. TGA result shows a two-step weight loss: Step I corresponds to the weight loss of organic component of L-Cys residues, assuming only AuS left; Step II corresponds to the weight loss of sulfur, thus only gold left (FIG. 34C). The approximate 63% remaining weight agrees well with calculations from atomic concentrations by XPS (approximately 62%). In Fourier-transform infrared spectroscopy (FTIR) spectra, the absent of peak at 2562 $cm^{-1}$ in Au-Cys, corresponding to the S—H vibrations, indicates the formation of S—Au bond (FIG. 34D). Au-Cys has a strong absorbance band at 362 nm, which is believed to arise from a ligand-to-metal charge transfer (LMCT, S→Au) transition because both Au(I) and Cys are optically transparent in this spectral range (FIG. 34E). Besides, the valence state of gold decreases from +3 to a value between 0 and +1. Therefore, the products are believed to be a compound in which gold and Cys are bonded through Au—S in a 1:1 ratio, thus termed as "Au-Cys," which is a gold thiolate/chalcogenide. Au-Cys has a lamellar structure with a layer thickness of 1.23 nm, according to the (010) diffraction peaks of X-ray diffraction (XRD) spectra (FIG. 34F). The residuals of cysteines are believed to arrange on both sides of the AuS slab (FIG. 34A). These spectral results are consistent with the lamellar structures thoroughly described in literature for Au-alkane-thiolates, with different spacing distance between interlayers due to the difference of incorporated ligands.

Au-Cys are white dispersions in water, revealing strong light scattering probably from their large sizes. Interestingly, they show red photoluminescence under the irradiation of UV light. Gold-thiolates have been demonstrated to exhibit rich luminescence behavior, and the emission is tentatively assigned as derived from triplet states of a LMCT transition that mix with metal-centered states, which are modified by aurophilic (Au . . . Au) interactions. The product of Au-Cys is stable in a wide pH range: the fluorescence is stable in acidic solution up to 5M HCl for 12 hours, while in basic solution of high concentration, the white dispersion transforms to a transparent solution and the fluorescence disappears (FIG. 34G). Although the solution becomes turbid again once as the solution returns to neutral conditions, the fluorescence and morphology are irreversible.

Au-Cys shows superstructures under scanning electron microscope (SEM): Au-L-Cys (FIGS. 35A, 35D) and Au-D-Cys (FIGS. 35B, 35E) are supraparticles (SPs) composed by nanoflakes (NFs), thus forming a hedgehog shaped type particle. The racemic counterpart, Au-DL-Cys (FIGS. 35C, 35F); however, show a SP structure composed by larger NFs in a "Kayak-like" geometry. The impact of chirality on geometry is difficult to tell from the overall appearance. Sonication is applied to see structural details in the inner part of SPs. Amazingly, two levels of helicities are observed in Au-L-Cys (FIG. 35G) or Au-D-Cys (FIG. 35H). In Au-L-Cys, for example, an individual nanoflake is twisted clockwise, showing a right-handed (RH) geometry. This is the primary helicity. When organized together, a counterclockwise arrangement between different nanoflakes arises. This is the secondary helicity and shows a left-handed (LH) geometry. In Au-D-Cys, the two levers of helicities exist as well but in an opposite way. It is notable that by introducing a single molecular chirality, two opposite helicities are obtained at the same time. The helicities would probably arise from the inner layer tensions introduced by chiral cysteines and interlayer arrangements of cysteine residues between connected AuS slabs. Based on a statistic analysis of 100 segments, structural parameters are obtained: the pitch of individual NF (primary helicity) is about 1080 nm; the average thickness of each NF is 14 nm; the average angle between two neighboring NFs is 60. Therefore, the pitch of secondary helicity is estimated to be 840 nm. For the racemic Au-DL-Cys (FIG. 35I), however, flat nanoflakes are overlaid together, without helically ordered arrangements. While not limiting the present disclosure to any particular theory, the dramatic structural differences between Au-L-Cys or Au-D-Cys SPs is probably because the coexistence of L-Cys and D-Cys eliminates tensions and dissymmetry caused by each other, although lamellar structure remains.

The addition of CTAB during synthesis promotes the growth of secondary helicity. Without the assistant of CTAB, "Acorn-like" particles with few secondary helical structures are obtained.

Under UV light, Au-L-Cys and Au-D-Cys SPs show red luminescence, while Au-DL-Cys SPs emit orange-red light with much lower intensity. The mesoscale size enables the observation of SPs by confocal microscopy (FIGS. 36A-36D). Fluorescent hedgehog particles with nanoflakes of Au-L-Cys (FIG. 36B) or Au-D-Cys, and "Kayak-like" microparticles of Au-DL-Cys (FIG. 36D), could be identified. Similar to the previous studies of non-chiral hedgehog particles, it is notable that SPs are well dispersed in aqueous solutions (FIGS. 36A, 36C). Dispersity could be further improved by mild sonication, which would dis-aggregate rather than break SPs. Gold-thiolates are reported to easily aggregate because of the strong interactions between gold and thiol groups. This unusually high dispersability in a wide range of solvents of the hedgehog particles is due to the spikes composed by nanoflakes, Luminescent chiral nanostructures are likely to emit partially circularly polarized light. For SPs prepared from gold and cysteine enantiomers, mirror-imaged CPL signals are obtained (FIG. 36E). Au-L-Cys SPs show a positive peak, indicating the sign of left-handed circularly polarized light. Accordingly, Au-D-Cys SPs show a negative peak, indicating the sign of right-handed circularly polarized light. The anisotropy factor of emissions at the peak of 520 nm reached 0.01, relatively larger than those reported in solution or in solid state. The racemic counterpart of Au-DL-Cys SPs are found to be CPL silent, which agrees well with its symmetric geometry. It is notable that the emission of Au-DL-Cys SPs is much weaker than the enantiomers' counterparts. While not limiting, it is theorized that this is probably due to the non-effective formation of aurophilic bonds. Chiral nanostructures have the ability to rotate the polarization of circularly polarized light, thus to be CD active. CD signals in long wavelength ranges are usually related to the scattering by chiral nanostructures, especially when no absorbance peaks shown in such ranges. For Au-L-Cys SPs, in the range of 650-1350 nm, the sign is positive, indicating a left-handed helicity (FIG. 36F, 36G). It reveals that the secondary helicity not only dominates CPL emissions, but also dominates CD scattering in longer wavelength ranges. As chiral nanostructures show strongest rotation to light with wavelength similar to their pitches, the CD peak at around 835 nm is in good accordance with the average pitch of secondary helicity (840 nm).

Intense sonication with a 750 w tip sonicator for 15 min effectively break downs the SPs into fragments. The primary twisted nanoflakes retain their twisted geometry. It can be immediately observed that after dis-aggregation of supraparticles into single flakes the chiroptical activity after 450 nm disappears (FIGS. 36F, 36I). Their CPL spectra reveals unexpected inversion (FIG. 36H). For example, the handedness of CPL signal of Au-L-Cys SPs flips over—from left-handed before sonication, to right-handed after sonication. Therefore, the reasonable explanation appears to be that in SPs, CPL is dominated by the secondary helicity. Once the secondary helicity is damaged, CPL shows the sign of primary helicity. It is further demonstrated by the SPs prepared without CTAB. Without the effective formation of secondary helicity, the "Acorn-like" SPs possess CPL, but no CPL inversion happens after sonication. CPL sign is always consistent with the primary helicity. It is worth noting that, either before or after sonication, the handedness of CPL emissions are in accordance with the handedness of dominating helicities. In literature, however, consistent or conflicting results have both been reported.

The CPL anisotropy factor after sonication decreases to 0.002, showing that the secondary structures are more effective in determining CPL emissions. Notably, the anisotropy factor of absorbance increases by an order of magnitude in the UV range, while remaining similar within the longer wavelength range and showing signs corresponding to the primary structures (FIG. 36J). The broad peak with a maximum at around 1100 nm agrees well with the average pitch of primary helicity (1180 nm).

CPL emission is suggested to be a reflection of the dissymmetry of the excited state to ground state electronic transition. This kind of emission implies inherently circular polarization. It can also be imparted after the photon emission by the mesoscale of the chiral environment around the photon and asymmetry of absorbing or scattering of left- and right-polarized photons. CPL inversions provide a dynamic and dialectic way to study the mechanism and origin of CPL in Au-Cys SPs. Compared with inherent polarization and absorption; scattering could be easily enhanced by increasing the difference of refractive index between materials and their media. Therefore, the contribution of scattering is investigated by drying Au-Cys SPs onto a glass slide. Interestingly, CPL inversion is observed. It reveals that there are two opposite contributions competing for the final CPL signal. Scattering is one of them. Enhanced scattering overwhelms the other contribution after SPs are dried on glass. The other contribution is believed to be absorption, because inherent polarization is found to be contradicted in explaining CPL inversion happening after drying and after sonication. For example, Au-L-Cys SPs emit left-handed CPL in water. It should arise from the inherent polarization from the drying experiment. If so, CPL inversion should not be expected after sonication treatment. However, this conflicts with the experimental results observed. Therefore, the two opposite contributions appear to be scattering and absorption.

When photons propagate through chiral SPs, they are scattered and absorbed by SPs. Scattering and absorption show the same asymmetric interaction with left- and right-polarized photons. The output of photons after scattering and absorption, however, leads to the detection of opposite polarization. The addition of dyes and CdTe nanoparticles into SPs leads to CPL inversion as well. This inversion further supports the proposed mechanism.

Excited-to-ground state transition in Au-L-Cys and Au-D-Cys SPs have improper rotational axis as a symmetry element with opposite rotational direction for the two "isomers." The emissions from Au-Cys SPs or their fragments are inherently circularly polarized, because scattering of light by chiral nanostructures is less likely to affect the dissymmetry in excited electronic state of matters and circularly polarize incident light. It is notable that the higher hierarchy of helicity dominates the final CPL signals, which has been suggested that dominant chiroptical activity comes from shape chirality rather than chiral atomic arrangements in tellurium nanostructures, which can be used to alter CPL polarity by changing the helical sense of Au-Cys SPs.

Additionally, gold-sulfides offer the possibility to dope the nanosheets and the supraparticles with other elements. When doped with copper (Cu) and silver (Ag) into Au-Cys, the emission peaks shift from red (620 nm) to orange (580 nm) and yellowish green (550 nm), respectively, while the UV-vis absorbance peaks showed a minor change (FIG. 37A). The large Stoke's shift of over 300 nm is a characteristic of gold-thiolates, indicating the main chemical structure retained the same. It is further revealed by XRD spectra of Au/Ag-Cys NFs. The doping of Cu and Ag not only alters the color of the emission, but also changes the morphology dramatically. Au/Cu-Cys shows a suprapartcle structure with a more spherical morphology (FIG. 37B). After sonication, two levels of helicities are found: primary twisted NFs with a pitch of 4 µm, which is larger than Au-Cys SPs, and the secondary arrangement of NFs. The handedness of each level helices is the same as those in Au-Cys SPs. Au/Ag-Cys, however, preferentially forms individually twisted NFs with long pitch lengths of about 10 µm (FIG. 37C), without the observation of spherical structures. Secondary arrangement between NFs could be found, but only in a small proportion.

Both Au/Cu-Cys SPs and Au/Ag-Cys NFs are CPL active, but with smaller anisotropy factors of 0.0016 and 0.005, respectively (FIGS. 37D, 37E). The smaller g factors agree well with the decreased anisotropy observed in their geometry (longer pitches, less arranged NFs), although copper or silver enhanced the fluorescence. After sonication, Au/Cu-Cys SPs reasonably show CPL inversion because of the damage of secondary structure, while Au/Ag-Cys NFs remains the same CPL sign because the effect of secondary structure on CPL was minor before and after sonication. The small blue shift on CPL spectra after sonication may result from shortening of some Au . . . Au or Au . . . M (M=Cu, Ag) chains due to the structural damage. As the pitch lengths of individual NF in Au/Cu-Cys or Au/Ag-Cys are several microns, the primary helicity give rise to the peaks in CD spectra in the range 650-1350 nm.

As the addition of Ag is believed to inhibit the formation of secondary helicity, CPL modulation is realized by altering the Ag/Au ratio (FIG. 37G). For example, by increasing the amount of Ag, CPL signs of Au/Ag-L-Cys gradually change from positive to neutral, to finally negative. An inversion also happens in the long wavelength range (>500 nm) of CD spectra. Morphological transition from spherical SPs to individual long NFs is observed with the increase of Ag component. Besides, the amount of cysteine is found to affect the final CPL signals and morphology as well (FIG. 37H. It is notable that no CD spectra flip over in the range under 400 nm during CPL inversion, indicating that the dissymmetry in the excited state has no necessary relationships with that in the ground state. A two-dimensional graph of the sign of CPL signals could be obtained by changing the amount of silver or cysteine added to a fixed amount of gold salts (FIG. 37F).

Au-Cys SPs represent a superstructure assembled hierarchically from the nanosheets. Variability of the two-dimensional materials structure and composition affords manipulation of CPL spectra and multiple ways of altering wavelength, intensity and handedness with a single material. Self-luminescent superstructures are provided with two-level opposite helicities. Gold-thiolates are representatives for metal-organic compounds. They combine the advantages of broad choices of constituent components and robust structural stabilities, for example, which enables the distortion of structures without collapse, as demonstrated in this example. More intriguingly, chiral or complex superstructures with different components are expected to emerge within this category of materials. Moreover, applications of the CPL active Au-Cys or Au/M-Cys will be promising in asymmetric catalysis, display technologies, and the like, by using these superstructures as catalysts and circularly polarized light sources.

In certain aspects, the hedgehog-shaped nanoscale, mesoscale, or microscale particles may be incorporated into a device selected from the group consisting of: a biomedical device, an electronic device, a photonic device, an optic device, an optoelectronic device, a scatterings device, a luminescent device, a magnetooptic device, an energy storage device, an electronic sensor, a transducer, and combinations thereof. By way of non-limiting example, the hedgehog-shaped microparticles or nanoparticles may be used in biomimetic catalysis, drug delivery, a processor, a motherboard, a memory chip, a solid state-laser, on optical element, a beam steering device, a beam splitter, a diffraction grating, an interferometer, a photodetector, a secondary battery, a structural battery, a supercapacitor, a condensator, a memristor, a magnetooptical memory cell, a hard drive, a current sensor, a voltage sensor, an electroscope, an electron multiplier, a microelectromechanical (MEMS) based sensor, a scattering laser, a chiroptical device, an optical computer device, a neuromorphic computational elements and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A self-assembly method for making a hedgehog-shaped particle, the method comprising:
    combining a metal-containing precursor, a chalcogen-containing precursor, and a self-assembly additive; and
    forming at least one hedgehog-shaped particle via self-assembly by first forming a plurality of platelet-like nanoparticles that assemble together into a nanosheet, wherein the nanosheet rolls into a hollow structure that defines a needle to form one of a plurality of needles connected to and substantially orthogonal to a surface of a core region formed of a first material, wherein the plurality of needles comprises a second material, wherein at least one of the first material or the second material comprises a metal and a chalcogen.

2. The self-assembly method of claim 1, wherein the nanosheet comprises a single crystal morphology.

3. The self-assembly method of claim 1, wherein the combining further comprises forming a first liquid by combining the metal-containing precursor with a first portion of the self-assembly additive and heating the first liquid; and
    forming a second liquid comprising the chalcogen-containing precursor and a second portion of the self-assembly additive; and
    injecting the second liquid into the first liquid to form the at least one hedgehog-shaped nanoscale, mesoscale, or microscale particle.

4. The self-assembly method of claim 3, wherein the first liquid is heated to greater than or equal to about 175° C.

5. The self-assembly method of claim 1, wherein the metal-containing precursor is an iron-containing precursor or a gold-containing precursor.

6. The self-assembly method of claim 5, wherein the iron-containing precursor comprises iron chloride ($FeCl_3$) and the chalcogen-containing precursor comprises selenium (Se).

7. The self-assembly method of claim 5, wherein the gold-containing precursor comprises gold hydrochloride ($HAuCl_4$) and the chalcogen-containing precursor comprises sulfur (S).

8. The self-assembly method of claim 1, wherein at least one of the first material or the second material comprises iron diselenide ($FeSe_2$).

9. The self-assembly method of claim 1, wherein at least one of the first material or the second material comprises a gold thiolate.

10. The self-assembly method of claim 1, wherein the self-assembly additive is selected from the group consisting of: dodecanethiol (DT), oleylamine (OLA), hexadecyltrimethylammonium bromide (CTAB), and combinations thereof.

11. The self-assembly method of claim 1, wherein the combining further comprises a metal dopant.

12. The self-assembly method of claim 1, wherein the metal is selected from the group consisting of: iron (Fe), gold (Au), nickel (Ni), molybdenum (Mo), niobium (Nb), technetium (Tc), tungsten (W), tantalum (Ta), chromium (Cr), manganese (Mn), copper (Cu), vanadium (V), titanium (Ti), zirconium (Zr), hafnium (Hf), ruthenium (Ru), osmium (Os), zinc (Zn), rhenium (Re), and combinations thereof and combinations thereof; and
    the chalcogen is selected from the group consisting of selenium, sulfur, and combinations thereof.

13. The self-assembly method of claim 1, wherein the at least one hedgehog-shaped particle comprises a plurality of hedgehog-shapes particles having an average particle size diameter of greater than or equal to about 50 nm to less or equal to about 15 μm.

14. The self-assembly method of claim 1, wherein an average length of each respective needle of the plurality of needles is greater than or equal to about 5 nm to less or equal to about 5 μm, an average diameter of the respective needle of the plurality of needles is greater than or equal to about greater than or equal to about 1 nm to less or equal to about 500 nm, and an average wall thickness of the respective needle of the plurality of needles is greater than or equal to about 0.5 nm and less than or equal to about 100 nm.

15. The self-assembly method of claim 1, wherein the at least one hedgehog-shaped particle comprises a plurality of hedgehog-shapes particles having an average diameter of the core region of greater than or equal to about 30 nm to less or equal to about 10 μm.

16. A self-assembly method for making a hedgehog-shaped particle, the method comprising:
    combining a metal-containing precursor, a chalcogen-containing precursor, and a self-assembly additive selected from the group consisting of: dodecanethiol (DT), oleylamine (OLA), hexadecyltrimethylammonium bromide (CTAB), and combinations thereof, wherein the metal-containing precursor comprises iron chloride ($FeCl_3$) and the chalcogen-containing precursor contains selenium (Se) or the metal-containing precursor comprises gold hydrochloride ($HAuCl_4$) and the chalcogen-containing precursor contains sulfur (S); and
    forming at least one hedgehog-shaped particle via self-assembly by first forming a plurality of platelet-like nanoparticles, wherein a portion of the platelet-like nanoparticles defines a core region and further wherein a portion of the platelet-like nanoparticles assembles together into a nanosheet that rolls into a hollow structure and defines a needle to form one of a plurality of needles connected to and substantially orthogonal to a surface of the core region, wherein the core region and the plurality of needles comprises either iron diselenide ($FeSe_2$) or gold thiolate.

17. The self-assembly method of claim 16, wherein the nanosheet comprises a single crystal morphology.

18. The self-assembly method of claim 16, wherein the combining further comprises forming a first liquid by combining the metal-containing precursor with a first portion of the self-assembly additive and heating the first liquid; and
    forming a second liquid comprising the chalcogen-containing precursor and a second portion of the self-assembly additive; and
    injecting the second liquid into the first liquid to form the at least one hedgehog-shaped nanoscale, mesoscale, or microscale particle.

19. The self-assembly method of claim 18, wherein the first liquid is heated to greater than or equal to about 175° C.

20. The self-assembly method of claim 16, wherein the iron-containing precursor comprises iron chloride ($FeCl_3$) and the chalcogen-containing precursor comprises selenium (Se).

21. The self-assembly method of claim 16, wherein the gold-containing precursor comprises gold hydrochloride ($HAuCl_4$), the chalcogen-containing precursor comprises sulfur (S), the self-assembly additive is selected from the group consisting of: dodecanethiol (DT), oleylamine (OLA), and combinations thereof, and the first material and the second material comprises iron diselenide ($FeSe_2$).

22. The self-assembly method of claim 16, wherein the metal-containing precursor comprises gold hydrochloride ($HAuCl_4$), the chalcogen-containing precursor contains sulfur (S), the self-assembly additive comprises hexadecyltrimethylammonium bromide (CTAB) and the first material and the second material comprises a gold thiolate.

23. The self-assembly method of claim 16, wherein the combining further comprises a metal dopant.

* * * * *

UNITED STATES PATENT AND TRADEMARK OFFICE
CERTIFICATE OF CORRECTION

PATENT NO. : 11,407,031 B2
APPLICATION NO. : 16/651841
DATED : August 9, 2022
INVENTOR(S) : Nicholas A. Kotov et al.

It is certified that error appears in the above-identified patent and that said Letters Patent is hereby corrected as shown below:

On the Title Page

At page 2, Column 1, Item (57) Abstract, Line number 6, delete "(FeSe2)." and insert --(FeSe$_2$).--.

At page 2, Column 1, Item (57) Abstract, Line number 9, delete "FeSe2" and insert --FeSe$_2$--.

At page 2, Column 1, Other Publications, Line number 9, delete "FeS2" and insert --FeS$_2$--.

At page 2, Column 2, Other Publications, Line number 1, delete "FeSe2" and insert --FeSe$_2$--.

At page 2, Column 2, Other Publications, Line number 2, delete "applicatiosn" and insert --applications--.

At page 2, Column 2, Other Publications, Line number 16, delete "FeSe2" and insert --FeSe$_2$--.

At page 2, Column 2, Other Publications, Line number 17, delete "optial" and insert --optical--.

At page 2, Column 2, Other Publications, Line number 20, delete "FeSe2" and insert --FeSe$_2$--.

At page 2, Column 2, Other Publications, Line numbers 25-26, delete "pompon-llke/chip-llke FeSe2" and insert --pompon-like/chip-like FeSe$_2$--.

In the Claims

At Column 28, Claim number 12, Line numbers 2-3, delete "combinations thereof and combinations thereof;" and insert --combinations thereof;--.

Signed and Sealed this
Fifteenth Day of November, 2022

Katherine Kelly Vidal
*Director of the United States Patent and Trademark Office*